US006751439B2

(12) United States Patent
Tice et al.

(10) Patent No.: US 6,751,439 B2
(45) Date of Patent: Jun. 15, 2004

(54) METHOD AND SYSTEM FOR TEACHING MUSIC

(75) Inventors: Deanna L. Tice, Vancouver (CA); Susan L. Douglas, Fredericton (CA); Andrew L. Parsons, Fredericton (CA); Stuart D. McClune, Fredericton (CA); Alain J. P. Lussier, Oromocto (CA); Ian Jonathan Perkins, Fredericton (CA); Timothy M. Nachtigall, Fredericton (CA); Michael L. Munro, New Maryland (CA); Trevor C. Sawler, Douglas (CA); Michael J. Savoy, Grand Bay-Westfield (CA)

(73) Assignee: Great West Music (1987) Ltd., Richmond (CA)

( * ) Notice: Subject to any disclaimer, the term of this patent is extended or adjusted under 35 U.S.C. 154(b) by 86 days.

(21) Appl. No.: 09/861,633

(22) Filed: May 22, 2001

(65) Prior Publication Data

US 2002/0004191 A1 Jan. 10, 2002

Related U.S. Application Data

(60) Provisional application No. 60/206,236, filed on May 23, 2000.

(51) Int. Cl.[7] .................................................. G09B 3/00
(52) U.S. Cl. ................... 434/350; 434/307 R; 434/365; 84/477 R
(58) Field of Search .......................... 434/227–233, 434/307 R–309, 350, 365; 84/470 R, 477 R, 478, 609, 615

(56) References Cited

U.S. PATENT DOCUMENTS

| 4,694,723 A | 9/1987 | Shinohara et al. |
| 5,270,475 A | 12/1993 | Weiss et al. |

(List continued on next page.)

FOREIGN PATENT DOCUMENTS

| EP | 0 837 436 A | 4/1998 |
| EP | 0 933 749 A | 8/1999 |
| EP | 0 935 234 A | 8/1999 |
| JP | 05119692 | 5/1993 |
| WO | WO 99 39316 A | 8/1999 |

OTHER PUBLICATIONS

Lassauniere A et al, "A new music technology system to teach music", Euromicro Conference, 1999, Sep. 8, 1999.

(List continued on next page.)

*Primary Examiner*—Joe H. Cheng
(74) *Attorney, Agent, or Firm*—Bereskin & Parr; Isis E. Caulder

(57) ABSTRACT

An interactive on-line music training system for teaching music to students comprises a Student Station, a Teacher Station, and an Administrative Web Server connected over a communications network. The Student Station includes a computer which is integrated with a MIDI device (e.g. MIDI keyboard). The Administrative Web Server maintains a database for storing data related to the Student's performance. The Student uses the MIDI device to interact with the music course. As the Student traverses the music course, lessons and activities as well as the applicable MIDI files are downloaded from the Administrative Web Server to the Student Station's computer. The Student's responses to exercises are stored as a MIDI file on the student computer. Upon completion of a lesson, an activity is presented to the Student. When the Student responds, the original MIDI file is compared to the MIDI file created by the Student and an evaluation is made using evaluation routines which are resident, and executed, on the Student's computer. The Student's performance in response to drills is evaluated based on a number of criterion, including timing, pitch and, where applicable, expression. The results of the lesson evaluation and corresponding student MIDI file are uploaded to the Administrative Web Server for storage. Lesson evaluations and the MIDI files created by students, along with various other student based performance information may be reviewed by a teacher, who can access them from the Administrative Web Server.

14 Claims, 48 Drawing Sheets

U.S. PATENT DOCUMENTS

| | | | |
|---|---|---|---|
| 5,585,583 | A | 12/1996 | Owen |
| 5,746,605 | A | 5/1998 | Kennedy |
| 5,952,597 | A | 9/1999 | Weinstock et al. |
| 5,955,692 | A | 9/1999 | Hayashi |
| 6,025,550 | A | 2/2000 | Kato |
| 6,072,113 | A * | 6/2000 | Tohgi et al. .............. 84/470 R |
| 6,084,168 | A * | 7/2000 | Sitrick ...................... 84/477 R |
| 6,281,422 | B1 * | 8/2001 | Kawamura .................... 84/615 |
| 2001/0036620 | A1 * | 11/2001 | Peer et al. .............. 434/307 R |
| 2002/0004191 | A1 * | 1/2002 | Tice et al. .................. 434/350 |

OTHER PUBLICATIONS

Online Document from the University of New Mexico–The Piano Education Page, http://www.unm.edu/~loritaf/pnosftr.html, Title: Piano and Software Reviews, Created: Mar. 1996, Last Updated: Jun. 2001.

Online Document from the University of New Mexico–The Piano Education Page, http://www.unm.edu/~loritaf/pnoalpno.html, Title: Review of Alfred Adult Piano Course for Windows, Part 1, Created: Sep. 1997, Last Updated: Nov. 2000.

Online Document from the University of New Mexico–The Piano Education Page, http://www.unm.edu/~loritaf/pnoaurar.html Title: Review of Auralia, Created Mar. 1999, Last Updated: Jul. 1999.

Online Document from the University of New Mexico–The Piano Education Page, http://www.unm.edu/~loritaf/pnodiskb.html. Title: Review of Discovering Keyboards Created: Aug. 1997, Last Updated: Nov. 2000.

Online Document from the University of New Mexico–The Piano Education Page, http://www.unm.edu/~loritaf/pnoddonr.html, Title: Review of Dolphin Don's Music School, Created: Oct 1997, Last Updated: Nov. 2000.

Online Document from the University of New Mexico–The Piano Education Page, http://www.unm.edu/~loritaf/pnoezpno.html, Title:Review of EZPNO, Created: Sep. 1997, Last Updated: Jan. 1999.

Online Document from the University of New Mexico–The Piano Education Page, http://www.unm.edu/~loritaf/pnofanr.html, Title:Review of Fanfare!, Created: Sep 1998, Last Updated: Jan. 1999.

Online Document from the University of New Mexico–The Piano Education Page, http://www.unm.edu/~loritaf/pnohmusr.html, Title:Review of History of Music—Romanticism to Contemporary, Created: Jan. 2000, Last Updated: Feb. 2000.

Online Document from the University of New Mexico–The Piano Education Page, http://www.unm.edu/~loritaf/pnointrr.html, Title: Review of Introduction to Classical Music, Created: Sep. 1997, Last Updated: Sep. 2000.

Online Document from the University of New Mexico–The Piano Education Page, http://www.unm.edu/~loritaf/pnojadvr.html, Title: Review of Julliard Music Adventure, Created; Jul. 1996, Last Updated: Apr. 2000.

Online Document from the University of New Mexico–The Piano Education Page, http://www.unm.edu/~loritaf/pnopnokidpr.html, Title: Review of Kids Piano Discovery, Created: Jan. 1998, Last Updated: Jun. 2001.

Online Document from the University of New Mexico–The Piano Education Page, http://www.unm.edu/~loritaf/pnolambr.html, Title: Review of Lamb Chop Loves Music, Created: Sep. 1996, Last Updated: Jan. 1999.

Online Document from the University of New Mexico–The Piano Education Page, http://www.unm.edu/~loritaf/pnolrnpr.html, Title: Review of Learn Piano, Created: Mar. 1998, Last Updated: Nov. 2000.

Online Document from the University of New Mexico–The Piano Education Page, http://www.unm.edu/~loritaf/pnotoonr.html, Title: Review of Lenny's Music Toons, Created: Mar. 1996, Last Updated: Jun. 1999.

Online Document from the University of New Mexico–The Piano Education Page, http://www.unm.edu/~loritaf/pnomsaur.html, Title: Review of MiDisaurus, Created: Nov. 1999, Last Updated: Jun. 2001.

Online Document from the University of New Mexico–The Piano Education Page, http://www.unm.edu/~loritaf/pnomuslr.html, Title: Review of MiBAC Music Lessons, Created: Jul. 1996, Last Updated: Jan. 1999.

Online Document from the University of New Mexico–The Piano Education Page, http://www.unm.edu/~loritaf/pnomacer.html, Title: Review of Music Ace, Last Updated: Jan. 1999.

Online Document from the University of New Mexico–The Piano Education Page, http://www.unm.edu/~loritaf/pnomboxr.html, Title: Review of The Musicbox—A Personal Ear Trainer, Created: Nov. 1996, Last Updated: Jan. 1999.

Online Document from the University of New Mexico–The Piano Education Page, http://www.unm.edu/~loritaf/pnomustr.html, Title: Review of A Musical Tutorial, Created: Jan. 1999, Last Updated: Jan. 1999.

Online Document from the University of New Mexico–The Piano Education Page, http://www.unm.edu/~loritaf/pnoscanr.html, Title: Review of MusicScan, Created: Sep. 1998, Last Updated: Jan. 1999.

Online Document from the University of New Mexico–The Piano Education Page, http://www.unm.edu/~loritaf/pnomtimr.html, Title: Review of MusicTime Deluxe, Created: Oct. 1996, Last Updated: Jan. 2000.

Online Document from GVOX, http://www.notationstation.net/info/main, Titled: GVOX and McGraw–Hill Co–Develop A New Interactive Music Learning Experience, Posted: Mar. 2000.

Online Document from the University of New Mexico–The Piano Education Page, http://www.unm.edu/~loritaf/pnombasr.html, Title: Review of Musicianship Basics, Created: Sep. 1997, Last Updated: Jan. 1999.

Online Document from the University of New Mexico–The Piano Education Page, http://www.unm.edu/~loritaf/pnopbjr.html, Title: Review of PBJ Basic of Keyboard Theory, Created: Oct. 1998, Last Updated: Dec. 1999.

Online Document from the University of New Mexico–The Piano Education Page, http://www.unm.edu/~loritaf/pnopnstr.html, Title: Review of The Pianist, Created: Jan. 1998, Last Updated: Nov. 2000.

Online Document from the University of New Mexico–The Piano Education Page, http://www.unm.edu/~loritaf/pnopcptr.html, Title: Review of PC Piano Teacher, Created: Dec. 1996, Last Updated: Jan. 1999.

Online Document from the University of New Mexico–The Piano Education Page, http://www.unm.edu/~loritaf/pnoprofr.html, Title: Review of Piano Professor, Created: Jul. 1996, Last Updated: Dec. 2000.

Online Document from the University of New Mexico–The Piano Education Page, http://www.unm.edu/~loritaf/pnosuitr.html, Title: Review of Piano Suite, Created: Nov. 1999, Last Updated: Jul. 2001.

Online Document from the University of New Mexico–The Piano Education Page, http://www.unm.edu/~loritaf/pnoplayr.html, Title: Review of Play Piano, Created: Jul. 1996, Last Updated: Oct. 2000.

Online Document from the University of New Mexico–The Piano Education Page, http://www.unm.edu/~loritaf/pnopicor.html, Title: Review of The Musical World of Professor Piccolo, Created: Sep 1997, Last Updated: Feb. 2000.

Online Document from the University of New Mexico–The Piano Education Page, http://www.unm.edu/~loritaf/pnortutr.html, Title: Review of Rhythm Tutor, Created: Jun. 1998, Last Updated: Feb. 2000.

Online Document from the University of New Mexico–The Piano Education Page, http://www.unm.edu/~loritaf/pnosscor.html, Title: Review of SmartScore, Created: Feb. 2000, Last Updated: Feb. 2000.

Online Document from the University of New Mexico–The Piano Education Page, http://www.unm.edu/~loritaf/pnoteorr.html, Title: Review of Teoria, Created: Aug. 1998, Last Updated: Jan. 1999.

Online Document from the University of New Mexico–The Piano Education Page, http://www.unm.edu/~loritaf/pnotsigr.html, Title: Review of Time Signature, Created: Nov. 1998, Last Updated: Jan. 2001.

Online Document from the University of New Mexico–The Piano Education Page, http://www.unm.edu/~loritaf/pnotuner.html, Title: Review of Tunes for Windows, Created: Sep. 1997, Last Updated: Jan. 1999.

Online Document from ER Technologies, http://www.ertechsoft.com/pages/course.html, Titled: Music Analytica Courseware, Printed: Aug. 2001.

Online Document from The Nanny Group, http://www.pianonanny.com, Titled: Piano on the Net, Printed: Aug. 2001.

Online Document from The Piano Lab, http://www.pianolabs.com, Printed: Aug. 2001, Title: What is The Piano Lab?.

Online Document from Online Conservatory, http://www.onlineconservatory.com, Overview, How It Works, and School Profile: MyPianoLessons.com, Printed: Aug. 2001.

Online Document from Mr. Land's Opus, http://www.musicplay.com, Titled: Virtual Music School, Printed: Aug. 2001.

Online Document from Yahoo!Geocities, http://www.geocities.com/vienna/studio/6746/index. Titled: Online Piano Lessons, Printed Aug. 2001.

Online Document from Lessons4You, http://www.lessons4you.com/piano/, Titled: Piano Lessons, Printed: Aug. 2001.

Online Document from Creative, http://www.americas.creative.com/, Titled: Creative Labs, Printed: Aug. 2001.

* cited by examiner

Table of Contents

Beginner Music - Level One

Lesson

Activity

Student Portfolio: Mr. First May
Student Number: 00000027

To the right is a quick
Breakdown of the time and
number of accesses by:
Mr. First May m1u1 - Tritone Module 1 Unit 1

Browse May's completed activities

| COMPLETED ACTIVITIES ▼ |

Total # Accesses
11
Total Time:
27 Min(s) 15 Sec(s)

| Highest # Accesses: |
| 4 |
| Lowest # Accesses: |
| 0 |

—134b
—133

Longest Time spent on a Page(s):
12 Min(s) 22 Sec(s)
Shortest Time spent on a Page(s):
0 Min(s) 0 Sec(s)

| Page #: | Page name: | # Accesses: | Time: | First Visit: | Last Visit: | Mark (%:): |
|---|---|---|---|---|---|---|
| 01-01 | Let's Begin: [L] The Music Room | 0 | 0 Min(s) 0 Sec(s) | | | |
| 01-02 | Let's Begin: [L] Right Hand & Left Hand | 0 | 0 Min(s) 0 Sec(s) | | | |
| 01-03 | Let's Begin: [A] Identify the Song Part | 0 | 0 Min(s) 0 Sec(s) | | | |
| 01-04 | Let's Begin: [L] Finger Numbers | 0 | 0 Min(s) 0 Sec(s) | | | |
| 01-05 | Let's Begin: [A] 10 Beautiful Rings | 0 | 0 Min(s) 0 Sec(s) | | | |
| 01-06 | Let's Begin: [L] Sitting at your Instrmn | 0 | 0 Min(s) 0 Sec(s) | | | |
| 01-07 | Let's Begin: [A] Right or Wrong | 0 | 0 Min(s) 0 Sec(s) | | | 86 |
| 02-01 | High, Middle, Low: [L] High, Mid, Low | 0 | 0 Min(s) 0 Sec(s) | | | |
| 02-02 | High, Middle, Low [A] Pick the Pitch | 0 | 0 Min(s) 0 Sec(s) | | | 14 |
| 02-03 | High, Middle, Low [A] Instrument Pitch | 0 | 0 Min(s) 0 Sec(s) | | | |
| 03-01 | Keyboard Geography: [L] The Black Keys | 0 | 0 Min(s) 0 Sec(s) | | | |
| 03-02 | Keyboard Geography: [A] Groups 2 Blck Ky | 0 | 0 Min(s) 0 Sec(s) | | | |
| 03-03 | Keyboard Geography: [A] Groups 3 Blck Ky | 0 | 0 Min(s) 0 Sec(s) | | | |
| 02-04 | Keyboard Geography: [A] Musical Mural | 0 | 0 Min(s) 0 Sec(s) | | | |
| 03-05 | Keyboard Geography: [L] Musical Alphabet | 0 | 0 Min(s) 0 Sec(s) | | | |
| 03-06 | Keyboard Geography: [A] Musical Alphabet | 0 | 0 Min(s) 0 Sec(s) | | | |
| 03-07 | Keyboard Geography: [A] Color the Balloo | 0 | 0 Min(s) 0 Sec(s) | | | |
| 03-08 | Keyboard Geography: [L] 5 Finger Positio | 0 | 0 Min(s) 0 Sec(s) | | | |
| 03-09 | Keyboard Geography: [L] Middle C | 0 | 0 Min(s) 0 Sec(s) | | | |
| 03-10 | Keyboard Geography: [A] Monkey See | 0 | 0 Min(s) 0 Sec(s) | | | |
| 04-01 | Note Reading: [L] Line and Space Notes | 0 | 0 Min(s) 0 Sec(s) | | | |

"LOGO"

The Keyboard Song

135

Mark: A+

|     | Pitch | Timing | Dynamics |
|-----|-------|--------|----------|
| Right | A++ | A+ | NA |
| Left | NA | NA | NA |

136

Tritone MIDI Filetype Codes For Text Events

| | | | |
|---|---|---|---|
| disp = | treb | display | treble clef-teacher |
| | trebx | | treble clef-dummy Track 7 MIDI CH 13 |
| | rhyt | | rhythm clef-teacher treble |
| | rhytx | | rhythm clef-dummy treble Track 7 MIDI CH 13 |
| | bass | | bass clef-teacher |
| | bassx | | bass clef-dummy Track 7 MIDI CH 13 |
| | rhyb | | rhythm clef-teacher bass |
| | rhybx | | rhythm clef-dummy bass Track 7 MIDI CH 13 |
| | treb | | treble clef-teacher |
| | trebx | | treble clef-dummy Track 7 MIDI CH 13 |
| | rhyt | | rhythm clef-teacher treble |
| | rhytx | | rhythm clef-dummy treble Track 7 MIDI CH 13 |
| | gnd | | grand staff-teacher |
| | gndbx | | grand staff-dummy bass Track 7 MIDI CH 13 |
| | gndx | | grand staff-dummy treble Track 7 MIDI CH 13 |
| | none | | no display-listen only |
| flash = | treb | flashing notes | treble clef-teacher/dummy/rhythm |
| | bass | | bass clef-teacher/dummy/rhythm |
| | gnd | | grand staff-teacher/dummy/rhythm |
| | none | | no flash |
| noeval = | pit | do not evaluate for | pitch |
| | tim | | timing |
| | vol | | volume |
| | pit.tim | | pitch and timing |
| | pit.vol | | pitch and volume |
| | tim.vol | | timing and volume |
| | pit.tim.vol | | all parameters |
| | none | | evaluate all parameters |
| evalpart = | treb | evaluation of | student treble clef against teacher treble clef |
| | trebx | | student treble clef against dummy Track 7 MIDI CH 13 and displayed as a treble clef |
| | rhyt | | student treble clef against teacher treble clef displayed as a rhythm clef |
| | rhytx | | student treble clef against dummy Track 7 MIDI CH 13 treble clef displayed as a rhythm clef |
| | bass | | student bass clef against teacher bass clef |
| | bassx | | student bass clef against dummy Track 7 MIDI CH 13 bass clef |
| | rhyb | | student bass clef against teacher bass clef displayed as a rhythm clef |
| | rhybx | | student bass clef against dummy Track 7 MIDI CH 13 bass clef displayed as a rhythm clef |
| | gnd | | student treble and bass clef against teacher treble and bass clef |
| | gndtx | | student treble and bass clef against dummy Track 7 MIDI CH 13 treble clef and teacher bass clef |
| | gndbx | | student treble and bass clef against teacher treble clef and dummy Track 7 MIDI CH 13 bass clef |
| | none | | do not send for evaluation |
| original = | yes | original composition | prompt to save on CD and to input title |
| | no | | not an original composition |
| teacher = | "*" | CourseWatch title | save student recording in CourseWatch using * as the title |
| | none | | do not save in CourseWatch |
| solo = | "*" | CD solos | limit recording to 3 times-save best of 3 in CourseWatch using * as the title |
| | none | | do not limit recordings |
| exam = | "*" | final exam | limit recording to 1 time-save in CourseWatch using * as the title |
| | none | | do not limit recordings |
| title = | "*" | title of song | words in side quotes to appear as title on bottom left of performance view & top of score view |
| composer = | "*" | composer info | words in side quotes to appear on bottom right of performance view & top right of score view-include "Music By" when applicable |
| copyright = | "*" | copyright info line 1 | "Copyright © 2000 by Tritone Corporation" |
| copyright2 = | "*" | copyright info line 2 | "International Copyright Secured All Rights Reserved" |

FIG. 8A

Tritone MIDI Filetype Codes For Text Events

| | | | |
|---|---|---|---|
| order = | play | order of use | play only after clicks "Press Play to start this exercise" message at beginning |
| | playtwo | | play twice only after clicks "Press Play to start this exercise" message at beginning |
| | rec | | record only after clicks-1 time only "Press Play to start this exercise" message at beginning - "Please close the Sequencer to continue your lesson." message at end |
| | play_rec | | clicks, plays, clicks, record-automatic-1 time only "Press Play to start this exercise" message at beginning - "Please close the Sequencer to continue your lesson." message at end |
| | play_rec_loadnext | | clicks, plays, clicks, record-automatic-1 time only, load the next file in the list-"Press Play to start this exercise" message at beginning "Click on the Performance View button to load the next song" message after record |
| | playtwo_rec_loadnext | | clicks, plays, clicks, play-automatic-1 time only, click record automatic-1 time only, load the next file in the list-"Press Play to start this exercise" message at beginning "Click on the Performance View button to load the next song" message after record |
| | play_rec_sendavg | | clicks, plays, clicks, rec-automatic-1 time only, average score for the recorded songs to send the CourseWatch "Press Play to start this exercise" message at beginning - "Please close the Sequencer to continue your lesson." message at end |
| | playtwo_rec_sendavg | | clicks, plays, clicks, play-automatic-1 time only, click rec - automatic -1 time only, send average score for the recorded songs to send CourseWatch "Press Play to start this exercise" message at beginning - "Please close the Sequencer to continue your lesson." message at end |
| | rec_loadnext | | clicks, rec-1 time only, load the next file in the list "Press Record to start this exercise" message at beginning "Click on the Performance View button to load the next song" message after record |
| | rec_sendavg | | clicks, rec-1 time only, Sends the average score for the recorded songs to CourseWatch "Press Record to start this exercise" message at beginning - "Please close the Sequencer to continue your lesson." message at end |
| | play_loadnext | | clicks, plays,1 time only, load the next file in the list "Press Play to start this exercise" message at beginning "Click on the Performance View button to load the next song" message after play |
| | none | | student has full control over play and record functions |
| click = | 0 | count-in click | none |
| | 1 | | 1 measure |
| | 2 | | 2 measure |
| | $0 | | none - student cannot change manully |
| | $1 | | 1 measure - student cannot change manully |
| | $2 | | 2 measure - student cannot change manully |
| tempo = | yes | set tempo | student has full control over tempo - inital given by MIDI |
| | no | | student cannot change inital tempo given by MIDI |
| mute = | treb | mute track | treble clef - teacher |
| | bass | | bass clef - teacher |
| | treb,bass | | treble and bass clef - teacher |
| | none | | no mutes are set |
| pickup = | "*" | pick-up notes | allow for pick-up notes at the beginning of the song - not to have rests appear before them and not to be included in measure numbering scheme where * = the position number (1 - 8) of the first note to be displayed in the first measure |
| | no | | do not allow for pick-up notes |

FIG. 8B

Tritone MIDI Filetype Codes For Text Events

| | | | |
|---|---|---|---|
| chord = | • | chord symbols in text | C, F, G,(G7),_ (space), N (N. C.) |
| fingtreb = | • | fingering over treble staff | 1, 2, 3, 4, 5, _ (space) |
| fingbass = | • | fingering over bass staff | 1, 2, 3, 4, 5, _ (space) |
| dynam = | • | dynamic markings | p, P(mp), f, F(mf), C (start of Crescendo), |
| | | | c (end of Crescendo), D (start of Crescendo), |
| | | | d (end of Crescendo) |
| repeat = | • | repeat signs | open, end1, end2, close | chord, fingtreb, fingbass, dynam, repeat follow a placement code comma (,) represents a bar line.
no characters between commas mean nothing is to be placed in that measure.
a single character means the symbol is to be placed on beat 1 of the measure.
2 characters places 1 symbol on beat one, the other on beat 3.
4 (or 3) characters places each character on each beat of the measure in order.
M*: jumps to measure number "*" and places the sign that follows "*".
underscore (_) is a blank placeholder to place other characters within the measure.

FIG. 8C

```
Song
 |
 +- Array of Tracks
     |
     +- Teacher Left
     +- Teacher Right
     +- Student Left
     +- Student Right
         |
         +- Vector of Measures
             |
             +- Measure 1
             +- Measure 2
             +- Measure 3
             +- Measure 4...
                 |
                 +- Vector of Notes
                     |
                     +- Note 1
                     +- Note 2
                     +- Note 3
                     +- Note 4...
```

FIG. 25a

```
Song
 |
 +- Array of Evaluations
     |
     +- Pitch Left
     +- Pitch Right
     +- Timing Left
     +- Timing Right
     +- Expression Left
     +- Expression Right
         |
         +- Vector of Marks
             |
             +- Marks for Measure 1
             +- Marks for Measure 2
             +- Marks for Measure 3
             +- Marks for Measure 4...
                 |
                 +- Array of Positions
                     |
                     +- Position 1
                     +- Position 2
                     +- Position 3
                     +- Position 4
                     +- Position 5
                     +- Position 6
                     +- Position 7
                     +- Position 8  → (Right or Wrong)
```

FIG. 25b

The teacher plays: 1150

The student plays: 1155

Pitch Score = 12/16
Timing Score = 7/16
Expression Score = 14/16
Overall Score = 11/16
— 1100

FIG. 29A

Note Evaluation

| Eigth (.5) | Quarter (1) | Dotted Quarter (1.5) | Half (2) | | Dotted Half (3) | | Whole (4) |
|---|---|---|---|---|---|---|---|
| 0 to .55 | .55 to 1.3 | 1.3 to 1.6 | 1.6 to 2.6 | | 2.5 to 3.2 | | 3.2 to 4.0 |
| | | | | | | | |

FIG. 30

METHOD AND SYSTEM FOR TEACHING MUSIC

This application claims priority from U.S. Provisional Patent Application No. 60/206,236 filed May 23, 2000.

FIELD OF THE INVENTION

This invention relates to the field of computer based music education, and more particularly to the provision of interactive music teaching tools over a communications network.

BACKGROUND OF THE INVENTION

Learning to play an instrument is a complex and challenging task. Many music students find that it is relatively daunting to learn a sufficient level of instrumentation techniques in order to master even relatively simple musical works. That is, to develop proficiency in playing a musical instrument requires dedication, many hours of practise, and the application of proper playing techniques and methods.

There are a wide variety of teaching methods that are currently used to train music students. These include music books, audio tapes, CD ROMs, and video tapes. While each of these offers certain advantages, each is also limited in the quality of instruction or the manner in which the information is presented. While educating or training a person with the aid of a computer can be effective, many computer based music education products are very stark, linear and somewhat boring The reason for the failure of many of these music teaching products is that music is a socially interactive activity that requires hands on encouragement from a teacher or mentor to make the process meaningful.

Also, many computer based music training programs only provide a series of lessons which are considered "self contained" and which form a horizontal series of single works that do not lead to a specific goal. The lessons in the series are only conceptually related in that the lessons are geared towards some common objective such as hand exercises or timing exercises. The student is expected to perform each lesson and move to the next lesson. In such training, there is little continuity between lessons besides their shared difficulty level or objective. As a result, students do not generally specifically apply what is learned in one lesson to the next, and there is only the most general transference of skill from one lesson to the next.

Several commercially available CD-ROM based music training systems attempt to provide a teacher or mentor function within the program. For example, U.S. Pat. No. 5,585,583 to Owen discloses a CD-ROM based musical instruction system that provides both audio and visual instruction materials. The student may choose from the lessons and decide whether or not to view an expert play a piece before practicing. The student may also control the tempo of the lesson. The instrument of the student is connected to the computer containing the CD-ROM. The student may view components of the lesson in the form of musical notes, tablature and video images detailing fingering. This teaching system has a limited measure of interactivity and may not be sufficiently engaging to appeal to a wide audience. Further this system does not provide strong teaching or mentor guidance to the user on the basis of the user's performance in the program.

U.S. Pat. No. 5,952,597 to Weinstock et al. discloses an automatic score tracking system. The score tracking system is used to track a performance by an individual performer to a recorded arrangement. The system is flexible, and may be programmed to accept variances from the recorded arrangement, for example changes in tempo or volume. Thus, the score tracking system may be programmed to allow for some degree of creative expression. This teaching system also has a limited measure of interactivity and may not be sufficiently engaging to appeal to a wide audience. Further, while this system assists the user in developing performance techniques, it does not provide strong teaching or mentor guidance to the user on the basis of the user's performance in the program.

Accordingly, there is a long felt need in field of computer based music education to provide better training tools and methodology for interactive teaching to assist a wide range of students in building high level skills necessary to play musical works, to provide a substantial amount of teaching and mentor guidance to students based on their historical performance in the program, and to provide teachers with improved supervisory capabilities and functionality to help students learn more effectively.

SUMMARY OF THE PRESENT INVENTION

In one aspect the invention provides a computer based music teaching system for training a student to play a musical instrument, said teaching system comprising:

(a) a music input device to accept input from the student and to generate a student data file;

(b) a database coupled to said music input device and adapted to store a lesson data file; and (c) processing means for comparing said student data file with said lesson data file and providing an evaluation thereof.

In another aspect the invention provides a method of teaching a student how to play a music input device coupled to a computer connected to a communications network, said method comprising the steps of:

(a) transmitting a lesson data file to the computer over the communications network;

(b) displaying the lesson data file to the student;

(c) obtaining a student data file from the student in response; and (d) evaluating said student data file by comparing said student data file with said lesson data file.

Further objects and advantages of the invention will become apparent from the following description.

BRIEF DESCRIPTION OF THE DRAWINGS

For a better understanding of the present invention and to show more clearly how it may be carried into effect, reference will now be made, by way of example, to the accompanying drawings, which show a preferred embodiment of the present invention and in which:

FIGS. 6F and 6G are sample screens illustrating the various menu screens that would be provided to a Teacher traversing the music teaching system of FIG. 1;

FIG. 7 is a tree diagram illustrating the types of activities that Student of the music teaching system of FIG. 1 would be provided with;

FIGS. 8A, 8B and 8C are tables of the Text Event MIDI file type codes utilized by the EVALUATION SEQUENCER program of the music teaching system of FIG. 1;

FIG. 25A is a schematic representation of the general data structure of the Student and Teacher Tracks utilized by the music teaching system of FIG. 1;

FIG. 25B is a schematic representation of the general data structure of the marking vectors which are used to evaluate the Student Track against the Teaching Track within the music teaching system of FIG. 1;

FIGS. 29A, 29B, 29C, 29D and 29E are diagrams illustrating a sample Teacher Track and a Student Song and the pitch, timing, and expression evaluation scores of the sample Song in respect of the Teacher Track as determined by the EVALUATION SEQUENCER program of the music teaching system of FIG. 1; and FIG. 30 is a schematic diagram illustrating the preferred method of classifying notes that are played by a Student for the music teaching system of FIG. 1.

DESCRIPTION OF THE PREFERRED EMBODIMENT

Figure 1:
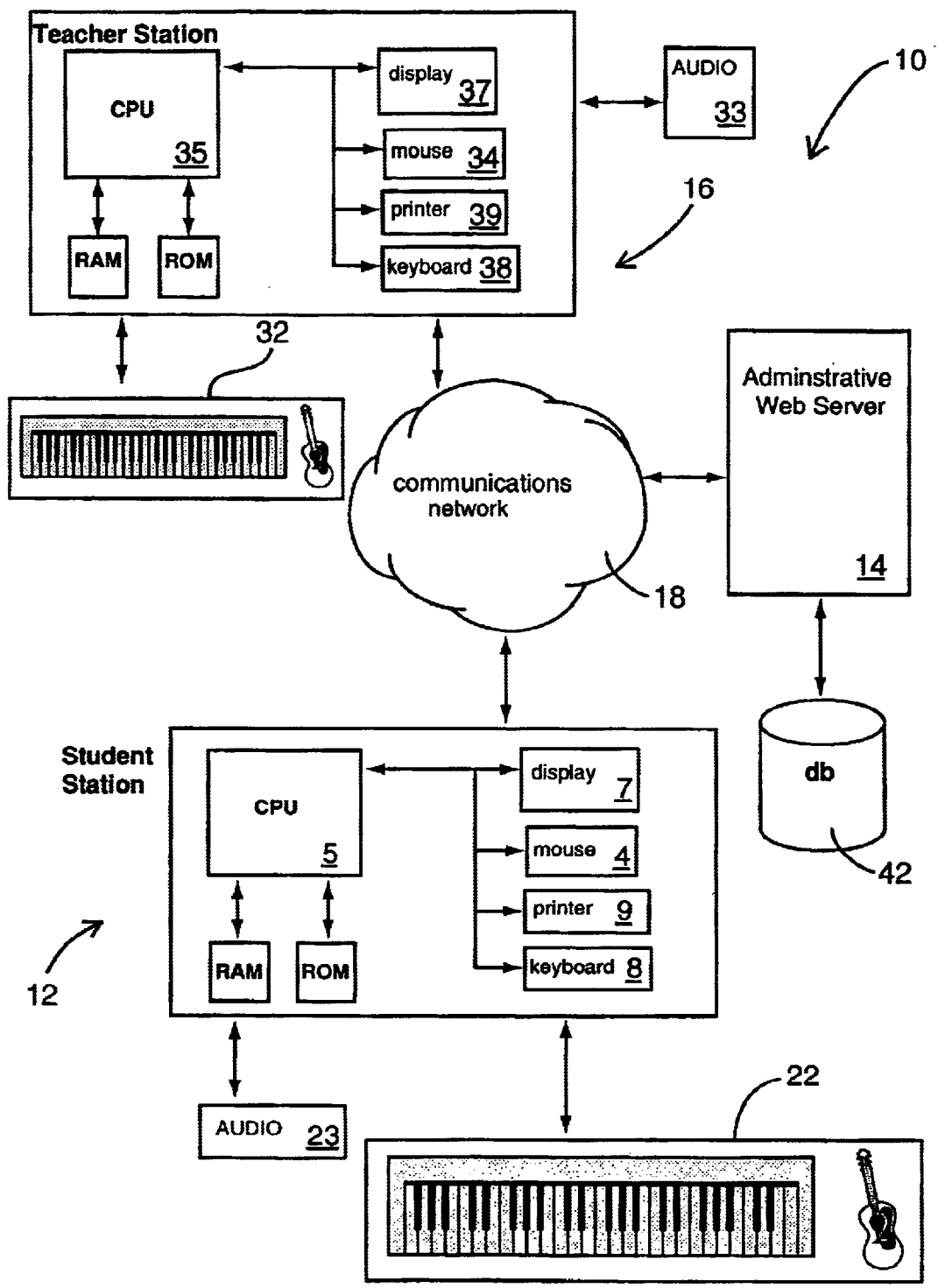
FIG. 1 is a block diagram of the general system architecture of a preferred embodiment of the music teaching system of the present invention.

Reference is first made to FIG. 1 which shows a general system architecture for an internet-based MIDI compatible music training system 10 made in accordance with a preferred embodiment of the invention. Music training system 10 includes a Student Station 12, an Administrative Web Server 14, a Teacher Station 16 and a communications network 18 (e.g. the Internet) to connect Student station 12, Teacher station 16 and Administrative Web Server 14, as shown. In the specification and claims the term "MUSIC COURSE" will be used to identify the software required to implement the music training system 10. Portions of the MUSIC COURSE program of the present invention are resident on, and are designed to run on, Student Station 12, Administrative Web Server 14, and Teacher Station 16.

Student Station 12 includes a computer 20, a MIDI based device 22 (e.g. a MIDI keyboard as shown) and an audio subsystem 23. Computer 20 is preferably a conventional personal computer having a central processing unit (CPU) 5, display 7, keyboard 8, a printer 9, and a user interface 4 such as a point and click device (e.g. mouse). Also, CPU 5 includes a MIDI connection cable (e.g. at the joystick port) for connecting to MIDI device 22. Computer 20 can be realized by any computing system employing operating system (OS) software (e.g. the Windows 98 and Windows 2000 operating systems) which supports USB and MIDI standards, which supports an Internet browser program (e.g. Netscape Navigator, Microsoft Internet Explorer) and which includes an Internet networking software that supports the TCP/IP networking protocol (required by HTTP, FTP and the like). Preferably, computer 20 includes a 300 MHz Pentium processor, approximately 64 MB RAM, and approximately 20 MB of free disk space. Finally, computer 20 should support Java Runtime Environment 1.3 or higher.

MIDI device 22 can be any general MIDI (GM) compatible instrument which generates general MIDI signals as an output for internal use in music training system 10. For purposes of the following discussion MIDI device 22 will be assumed to be MIDI compatible keyboard (e.g. a 61 key keyboard with general MIDI and MIDI to computer connection). As is conventionally known, music may be described with data representing the pitch of each note, the volume level of each note, and the sound character of each note and general MIDI represents a particular standard of such presentation.

In MIDI, the input and output data is transmitted and received via "channels". In order for MIDI data to transfer correctly from MIDI device 22 to Student Station 12, the MIDI channels on each device must correspond to each other. Also, all MIDI communication is achieved through multibyte "messages" consisting of one status byte followed by one or two data bytes. Messages are divided into two main categories, namely channel and system. Channel messages contain a 4-bit number in the status byte that addresses the message specifically to 1 of 16 channels. These messages are intended for any units in a system whose channel number matches the channel number encoded in the status byte. System messages are not encoded with channel numbers.

Many of the features of MUSIC COURSE are options that are encrypted in the source MIDI file as text events. A text event is a MIDI meta event (i.e. "chords"=C, . . . , F,C where "chords" is the type of event and "C, . . . , F,C" is the data—in this case this text event says to place a C chord symbol in the first measure, a F symbol in the fourth, and a C symbol in the fifth). This allows the creator of the MIDI data file to dictate the performance, display and evaluation parameters for MUSIC COURSE, as well as the information to be stored in the database associated with Administrative Web Sever 16 for each MIDI data file, as will be described.

Finally, audio subsystem 23 may be part of computer 20 (such as the sound card and associated speakers) or a standalone device and is controlled by computer 20 to provide playback of the various pre-programmed musical songs and the Student's songs. Preferably, audio subsystem 23 would be a sound card and speaker system compatible with general MIDI support (e.g. Creative Labs Sound Blaster 16) and include a pair of headphones.

Administrative Web Server 14 is coupled to a database 42 which holds administrative information relating to Student course participation and evaluations as well as MUSIC COURSE lessons and activities and MIDI song data (i.e. both original and Student produced). Administrative Web Server 14 is a general Web server (i.e. a Linux Kernel 2.0+ or Windows 95/98/NT supporting platform). Administrative Web Server 14 is used to run a commercially available teaching data management software program hereinafter referred to as database administrator. Specifically, database administrator allows Teachers to quickly gather, analysis, and organize information about various Students (and their associated performance in the MUSIC COURSE program) that are participating within music training system 10.

Teacher Station 16 consists of a computer 30 adapted to be connected to Administrative Web Server 14 over communications network 18, for example, using Internet networking software that supports TCP/IP networking protocol, as well as a MIDI based device 32 (e.g. a MIDI keyboard as shown) and an audio subsystem 33. As in the case of Student Station 12, computer 30 is preferably a conventional personal computer having a central processing unit (CPU) 35, display 37, keyboard 38, a printer 39, and a user interface 34 such as a point and click device (e.g. mouse).

As before, computer 30 can be realized by any computing system employing operating system (OS) software (e.g. the Windows 98 and Windows 2000 operating systems) which supports USB and MIDI standards, which supports an Internet browser program (e.g. Netscape Navigator, Microsoft Internet Explorer) and which includes an Internet networking software that supports the TCP/IP networking protocol (required by HTTP, FTP and the like). It should be understood that a Teacher does not require the MIDI device 32 for proper supervision and management of Students within the MUSIC COURSE program (i.e. supervision can be entirely accomplished using a Web browser connection), although these additional devices allow for enhanced instruction.

Accordingly, computer 20 of Student Station 12 receives and transmits data to and from server 14 through communication network 18. The present invention is described in the context of piano/keyboard training but is applicable to other types of music training including training for a string, woodwind, brass and percussion instruments. Correspondingly, MIDI device 22 is preferably a keyboard, but it should be understood that any type of MIDI instrumental device (e.g. MIDI guitar, MIDI rhythm pad, etc.) may be used in association with the present invention. Further, it should be understood that a plurality of MIDI instrumental devices could be used in combination within the present invention. In all of these cases the MUSIC COURSE program would have to be amended to include the appropriate tabulatures, as is conventionally known.

Also, the preferred embodiment of the present invention utilizes the Internet as communication network 18, since the Internet provides a low-cost efficient manner of distributing information required to implement the present invention. However, those skilled in the art will recognize that any communication network 18 (e.g. LANs or intranets) utilizing any communication protocol may be used to practice the present invention.

Figure 2:
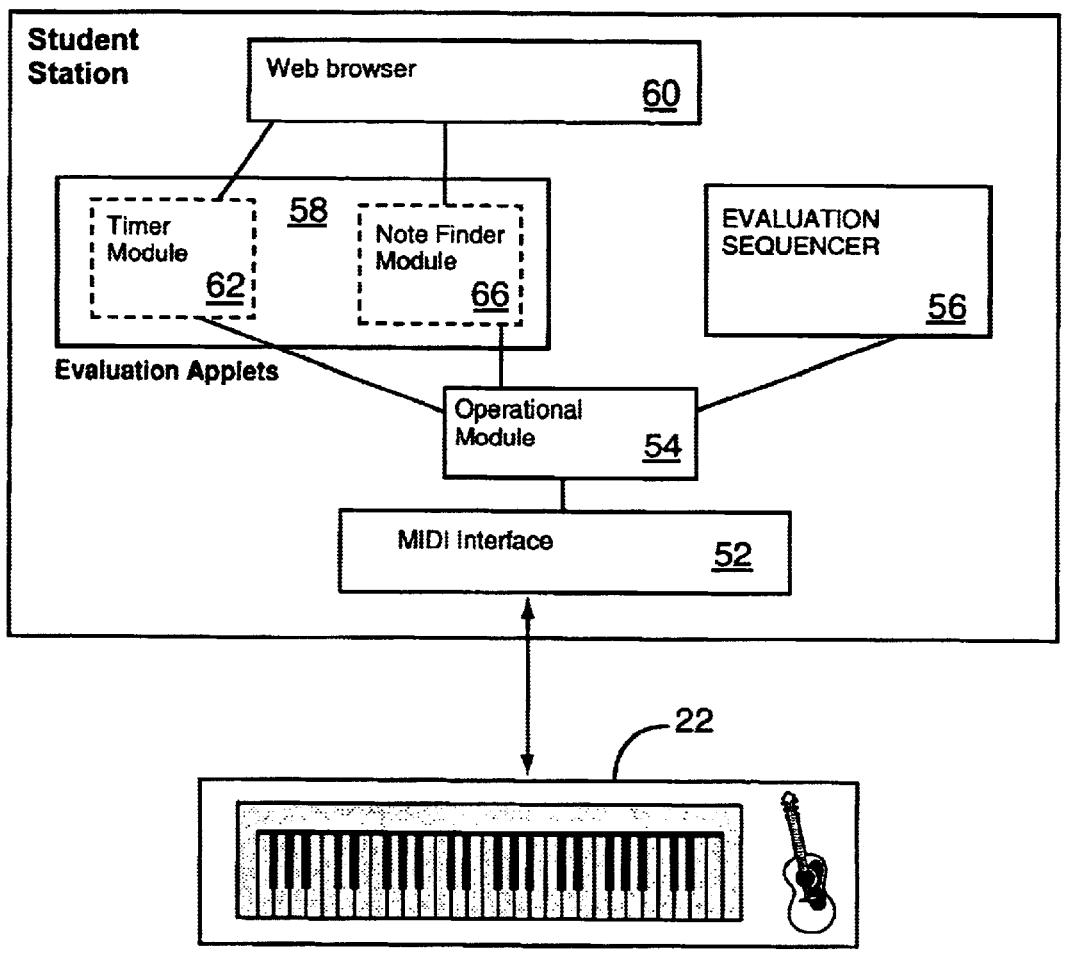
FIG. 2 is a more detailed block diagram of the Student Station of FIG. 1.

FIG. 2 shows a functional block diagram illustrating the relationship of various software modules which are resident within, or are downloaded into the RAM of computer 20 of Student Station 12 during the course of operation. Specifically, a MIDI Interface Module 52 is provided to permit MIDI device 22 to communicate via the data bus of computer 20 and interfaces with operational module 54. Operational Module 54 is used to generally operate and coordinate the various software modules residing on Student Station 12. Two EVALUATION APPLETS 58 and an EVALUATION SEQUENCER program 56 are controlled by Operational Module 54 and are used to run the MUSIC COURSE of the present invention.

Operational module 54 can be implemented using a commercially available Web based multimedia program such as Shockwave Player™ Version 8.0 (by Macromedia of San Franciso, Calif.). Using Shockwave Player Director™, it is possible to create appropriate multimedia "Question" and "Answer" menus which are also capable of conducting limited (i.e. simple) evaluations of small amounts of timing or note data. MIDI interface module 52 is supported by a physical hardware interface (not shown) which can include a RS-232 line driver either alone, or in connection with a pair of MIDI jacks, as is conventionally known.

EVALUATION APPLETS 58 consist of a Timer Module 62 and a Note Finder Module 66. Timer Module 62 and Note Finder Module 66 are Java applets which are resident on Administrative Web Server 14 and are downloaded into the RAM of the Student's computer 20 when needed (i.e. they are shown in dotted outline in FIG. 2). Specifically, when the Student imitates the operation of an activity of MUSIC COURSE, CPU 5 will effect the download of EVALUATION APPLETS 58 from Administrative Web Server 16 over communications network 18 for storage in the RAM of computer 20 of Student Station 12. The Timer Module 62 is used for rhythm reading activities within the MUSIC COURSE program and the Note Finder Module 66 is used for note reading activities within the MUSIC COURSE program. Generally, these applets are used to interface with Operational Module 54 to provide evaluation of the Student's performance for minor activity testing (which are also downloaded to computer 20 of Student Station 12), as will be further described.

EVALUATION SEQUENCER program 56 is a MIDI sequencer program that is permanently resident on computer 20 of Student Station 12. When EVALUATION SEQUENCER is called from within the MUSIC COURSE, EVALUATION SEQUENCER program 56 is opened and is directed to download a specific MIDI file from Administrative Web Server 14. The MIDI file is loaded into the RAM of computer 20 (i.e. is not downloaded to the hard drive of computer 20). Also MIDI data is send from MIDI device 22 through MIDI Interface 52 and recorded into EVALUATION SEQUENCER program 56 for evaluation with the original MIDI data file that was previously downloaded. The evaluation results are displayed within EVALUATION SEQUENCER program 56 on the display 7 of computer 20 and the marks (i.e. letter grade and MIDI data generated by the Student) is sent over communications network 18 to Administrative Server 14 for storage. The Student's song can then be played back by the Teacher at Teacher Station 16 through a Web browser located on computer 30 of Teacher Station 16.

Figure 3:
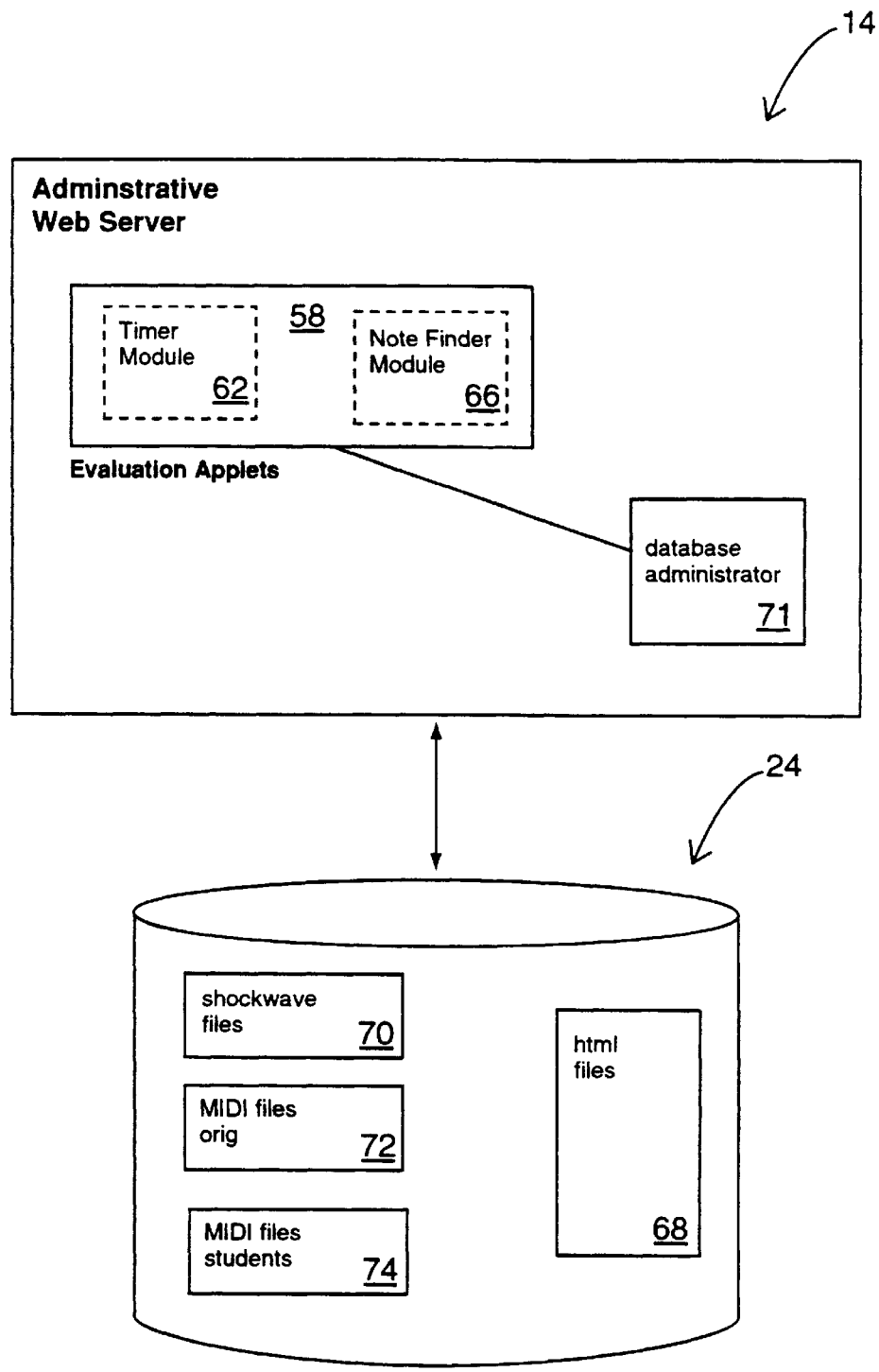
FIG. 3 is a more detailed block diagram of the Administrative Web Server of FIG. 1.

FIG. 3 shows a functional block diagram illustrating the relationship of various software modules which are resident within Administrative Web Server 16. Specifically, the database administrator program 71 is used to coordinate the activities of the various EVALUATION APPLETS 58 as well as to provide the access to the html files 68, Shockwave™ files 70, MIDI files (originals) 72 and MIDI files (student recorded) 74 stored on the database 42. It should be noted that EVALUATION APPLETS 58 are resident on Administrative Web Server 16 where they can be downloaded to individual Students' computers. Standard MIDI format files with various text events are utilized.

Figure 4:
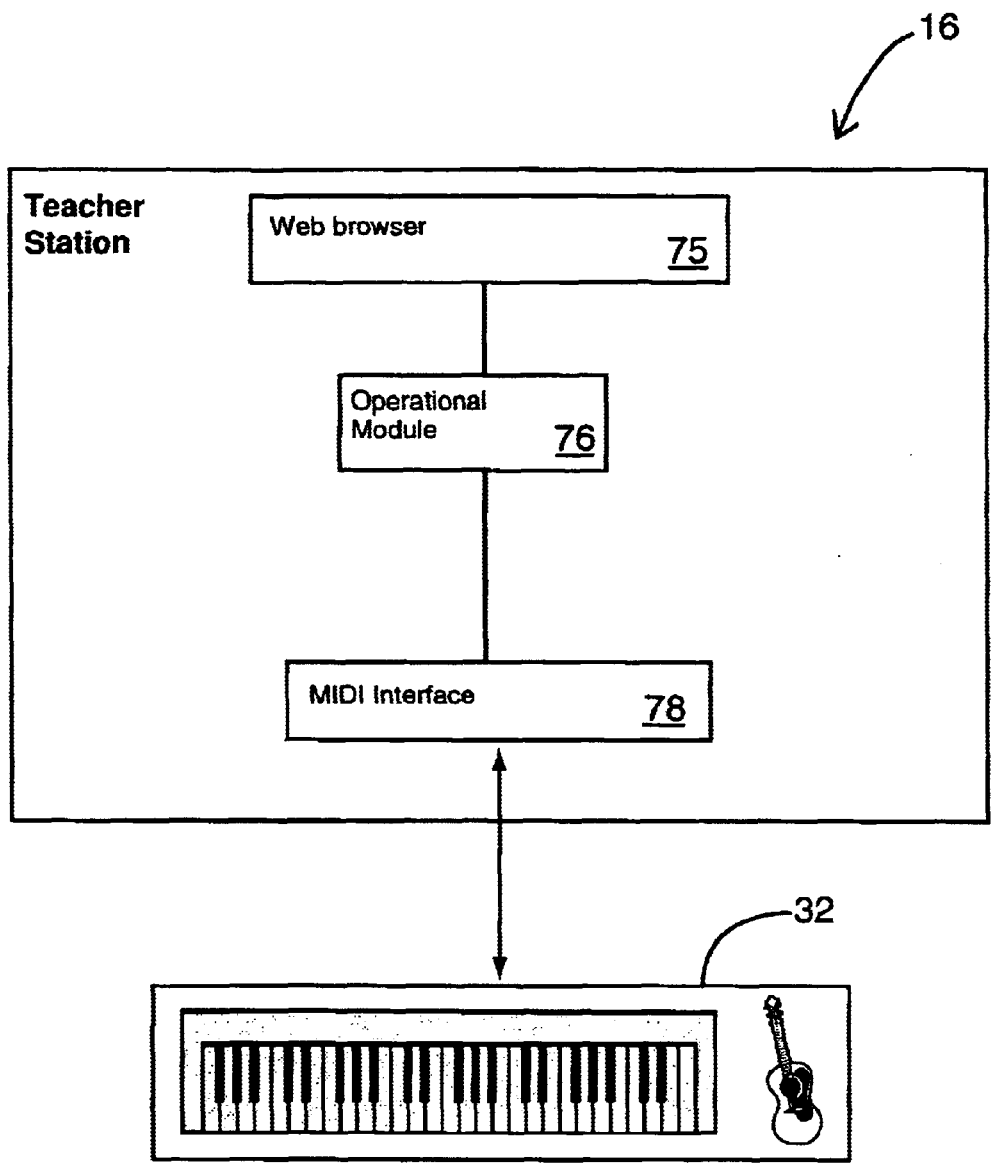
FIG. 4 is a more detailed block diagram of the Teaching Station of FIG. 1.

FIG. 4 shows a functional block diagram illustrating the relationship of various software modules which are resident within Teacher station 14. Specifically, a Web browser 75 is coupled to an operational module 76. In the case where a MIDI device 32 is utilized, a MIDI interface module 78 (much like the one used within Student Station 12) is used to interface MIDI device 32 within MUSIC COURSE.

Once the Student has pointed Web browser 60 at the MUSIC COURSE Web site and downloaded EVALUATION APPLETS program 58 into RAM of computer 20, Operational Module 54 coordinates the activities of the MIDI Interface Module 52, Timer Module 57 and Note Finder Module 58 as well as the EVALUATION SEQUENCER program 56 (when needed).

Figure 5A:
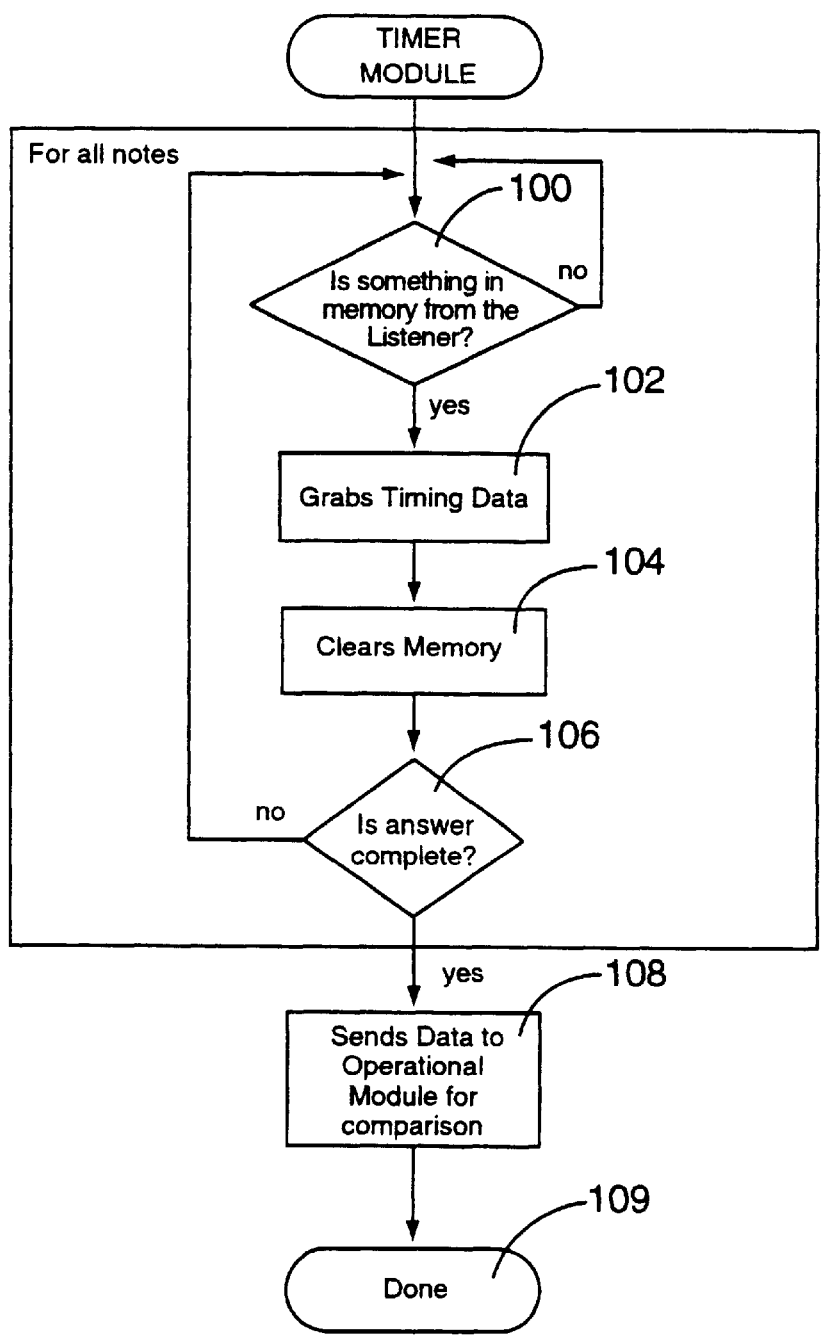
FIG. 5A is a flow chart showing the steps executed by the Timer Module on the Administrative Web Server of FIG. 3.

FIG. 5A snows a flowchart of process steps which are executed by CPU 5 of Student station 12 in association with the Timer Module 62 of EVALUATION APPLETS 58. Generally, the Timer Module 62 is used to capture the Student's rhythmic input and provide it to Operational Module 54 (i.e. the Shockwave™ file) which will evaluate it against a pre-stored solution. When the Student clicks on the appropriate icon within a Shockwave™ file, the Timing applet is automatically loaded by the Web page of the Student's computer 20. The applet is designed to interface with Operational Module 54 as well as with the MIDI Interface 52.

When the Student gets to an activity Web page within MUSIC COURSE, the appropriate Shockwave™ data file is downloaded from the Administrative Web Server 14 to the Student's computer 20. The Student is then provided with a first exercise "Question" of the activity by Operational Module 54 (i.e. the Shockwave™ file) and the Student is prompted to play an "Answer" on their MIDI device 22. As the Student plays an "Answer" on MIDI device 22, Timer Module 62 cycles back and forth to a corresponding "timer" listener routine (e.g. an application which is resident within ROM of the computer 20 and is associated with the Timer Module 62) to check whether any timing data has been placed in memory (at 100). If so, then Timer Module 62 grabs the data (at 102), clears the memory (at 104). It then determines whether the "Answer" is complete (at 106) and if so, sends the data to Operational Module 54 (i.e. the Shockwave™ file) for comparison (at 108). If not, it continues to poll the "timer" listener for more data. Once data has been sent to Operational Module 54, Timer Module 62 returns (at 109). It should be noted that Timer Module 62 traps the entire "Answer" at once and sends it to Operational Module 54 for comparison.

After the entire Student "Answer" has been compared to the "Question", Operational Module 54 (i.e. the Shockwave file) provides visual and auditory cues to tell the Student whether the timing of the notes played was right or wrong. Operational Module 54 then loads the next exercise "Question" in the activity. This repeats until the Student has completed all the exercises in the activity. After the entire activity is completed, Operational Module 54 displays a final mark and displays (and plays) a reward response to the Student. The final mark of the activity is also sent to Administrative Web Server 14 for storage in database 42.

Figure 5B:
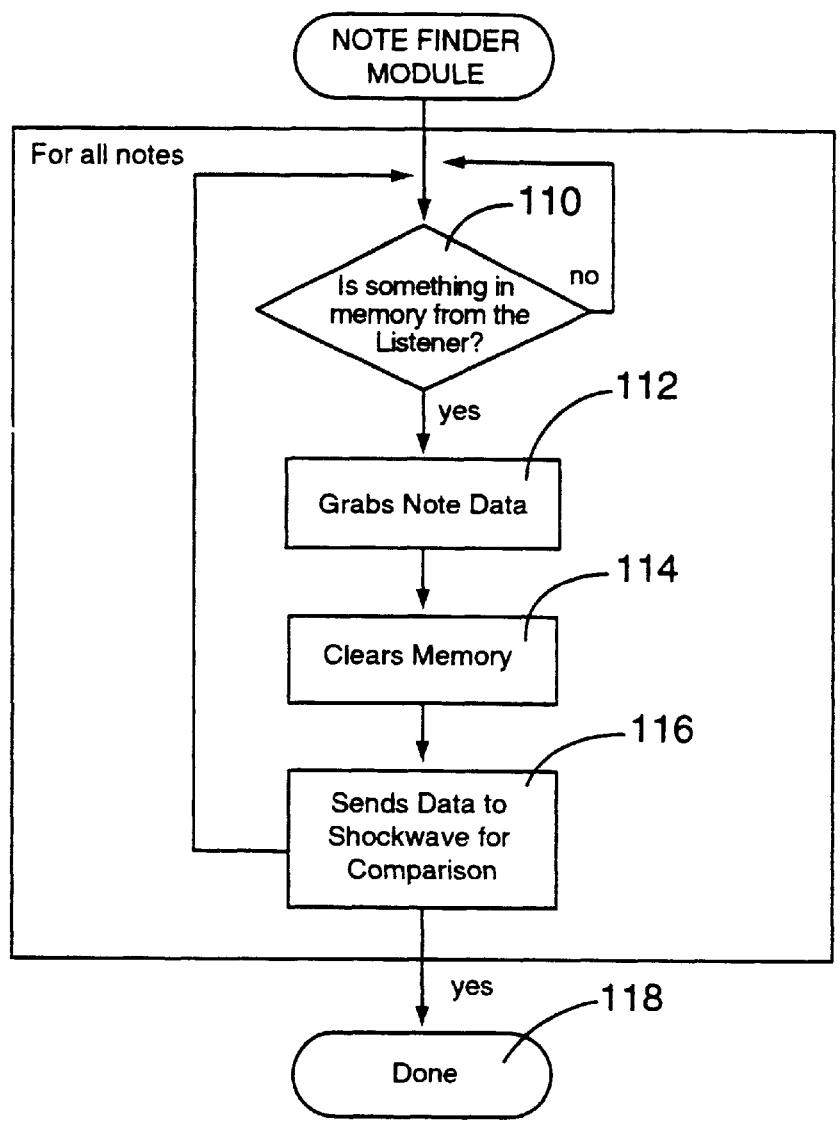
FIG. 5B is a flow chart showing the steps executed by the Note Finder Module on the Administrative Web Server of FIG. 3.

FIG. 5B shows a flowchart of process steps which are executed by CPU 5 of Student station 12 in association with the Note Finder Module 66 of EVALUATION APPLETS 58. Generally, the Note Finder Module 66 is used to capture the Student's melodic input (notes only) and evaluate it against a pre-stored solution. When the Student clicks on the appropriate icon from within Operational Module 54 (i.e. a Shockwave™ file), the Note Finder Module applet is downloaded into the RAM of the Student's computer 20. The applet is designed to interface with the Operational Module 54 (i.e. the Shockwave™ file) as well as with the MIDI Interface 52.

For each note played by Student on MIDI device 22, Note Finder Module 66 cycles back and forth to a corresponding "note finder" listener routine (e.g. an application which is resident within ROM of the computer 20 that is associated with Note Finder Module 66) to check whether any note data has been placed in memory (at 110). If so, then Note Finder Module 66 grabs the data (at 112), clears the memory (at 114), and sends the note data back to Operational Module 52 (i.e. the Shockwave™ file) for comparison (at 116) with correct note sequences. This cycle continues until all the notes in the Student's "Answer" have been sent to the operational module 52 for comparison with the exercise "Question" and the Note Finder Module 66 returns (at 118).

As before, after the entire Student "Answer" has been compared to the "Question", Operational Module 54 (i.e. the Shockwave file) provides visual and auditory cues to tell the Student whether the notes played were right or wrong. Operational Module 54 then loads the next exercise "Question" in the activity. This repeats until the Student has completed all the exercises in the activity. After the entire activity is completed, Operational Module 54 displays a final mark and displays a reward response to the Student. The final mark of the activity is also sent to Administrative Web Server 14 for storage in database 42. The Administrative Web Server 14 will calculate and display the mark of the last try of the activity.

Figure 6A:
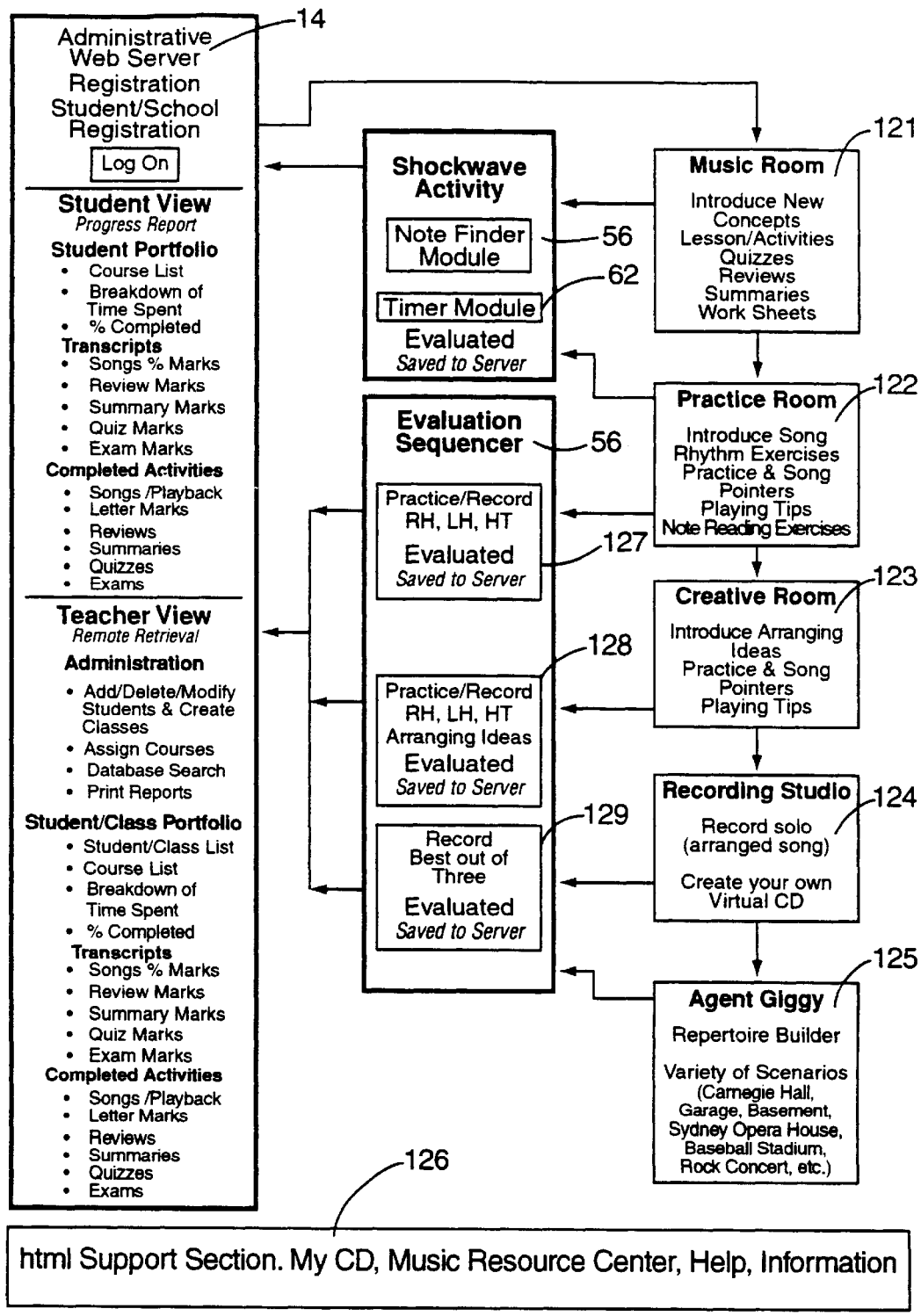
FIG. 6A is a block diagram of the overall structure of the MUSIC COURSE program which is executed by the music teaching system of FIG. 1.

FIG. 6A shows a conceptual block diagram which illustrates the general functionality of the MUSIC COURSE, as well as the Timer Module 62 and Note Finder Module 66 applets (i.e. the EVALUATION APPLETS) and the EVALUATION SEQUENCER 56. MUSIC COURSE provides the Student with a number of lessons and activities covering such elements as theory, improvisation, music history, arranging, sight reading and ear training. These lessons and activities can take place in several "virtual environments", e.g. the Music Room 121, the Practice Room 122, the Creative Room 123, the Recording Studio 124, and Agent Giggy's Office 125. The general types of lessons and activities taught are listed within these various "virtual environments".

Generally, if the activity is a simple exercise (i.e. short timing or note playing test), the EVALUATION APPLETS are used to evaluate the Student's performance. If the activity requires the functionality of the EVALUATION SEQUENCER then the EVALUATION SEQUENCER is called (i.e. from within the ROM of the Student's computer) for further evaluation capability. For example, Timer Module 62 and Note Finder Module 66 (i.e. the EVALUATION APPLETS 58) are used in association with the Music Room 121 and the Practice Room 122. That is, these "virtual environments" contain simple "Question" and "Answer" sequences which can be handled by the EVALUATION APPLETS 58 (i.e. do not require the assistance of the EVALUATION SEQUENCER 56 to be executed). Further, the Practice Room 122, the Creative Room 123, the Recording Studio 124 and Agent Giggy 125 all utilize the EVALUATION SEQUENCER 56 (i.e. contain some activities which require the use of the sequencer).

The Music Room 121 is the beginner environment where basic musical techniques and concepts are introduced to the Student. The Student will only be allowed to be evaluated in the Practice Room 122 when they have reached the point of recording an entire song segment with either their Right Hand, Left Hand or Hands Together. When the Student is in the Practice Room 122, the Student is provided with lessons on rhythm, note reading, pointers and playing tips and can record their performance and have the computer give a graphical evaluation of their performance. Specifically, the Student can choose to hear the RH or the LH part play along with them as they record their RH or LH performance (i.e. they can engage the EVALUATION SEQUENCER 56 for the functions shown in 127). They will also see a graphical guidance system for the RH or LH.

In the Creative Room 123, the Student is given arranging ideas to apply to their song. After they have done an exercise or gone through a drill to reinforce these arranging ideas, they are prompted to open EVALUATION SEQUENCER 56 and practice the song with the arranging ideas they have learned (i.e. as indicated at 128). Once the Student can play the arranging ideas and feels comfortable with their evaluation results in the Creative Room 123, the Student may proceed to the Recording Studio 124 to record their song onto a "virtual CD". The "Virtual CD" feature means that the songs are collected on one file to be accessed, viewed and listened to from one html page.

In the Recording Studio 124, the Student may record their Solo Performance. They have three tries to record their song and the EVALUATION SEQUENCER 56 will pick the best out of three (as indicated at 129) and send it to the Administrative Web Server 14. This recording is stored for future playback and for Teacher assessment. After the song has been sent to Administrative Web Server 14, the Student is given a lesson and activity which has booked them for a "gig" in one of a variety of settings (e.g. garage, basement, baseball stadium, etc.) That is, the Student is given a special scenario where they can play their song and the EVALUATION SEQUENCER 56 is used to play the MIDI file within a specific visual environment.

Administrative Web Server 14 is shown alongside the various functions which it offers to Students and Teachers Specifically, Students may register within it and are from then on provided with a student number and password combination. The Student may review the course list, a breakdown of time spent on a particular lesson or activity as well as the percentage completed of each part of the course. Also, the Student may review their transcripts for the various exercises and their overall standing in the MUSIC COURSE. Finally, Students may also review (i.e. view and playback) completed songs, letter marks, and course reviews, summaries, quizzes and exams.

The Administrative Web Server 14 provides the Teacher with a variety of administrative functions including the ability to add, modify and delete students, the ability to assign a course to students, suspend a student from a course, create classes, to conduct searches and to print reports. Teachers may also view the student/class list, the course list, a breakdown of time spent and percentage completed statistics. This allows the Teacher to monitor and organize activities and student performance results. Also, Teachers may view transcripts of individual students or aggregation reports thereof. Finally, the Teacher may also have access to completed activities, such as songs, letter marks, reviews and summaries and quizzes.

Finally, MUSIC COURSE provides Students and Teachers with additional functionality including the My CD Player feature (which allows a Student to play recordings from their own "virtual CD"), Music Resource Center, Help and Information. The Music Resource Center is a Web based site which provides centralized information for Teachers, Students, and Parents to visit and research many topics relating to music, music education, the teaching of the online music course, extracurricular activities, and help files.

Figures 6B, 6E:
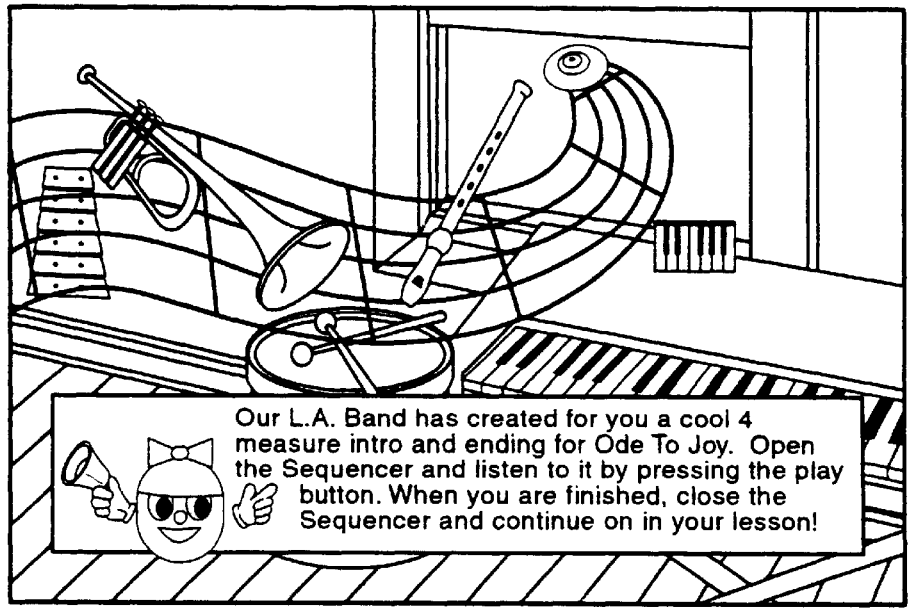
FIGS. 6B to 6E are sample screens illustrating the various menu screens that would be provided to a Student traversing the music teaching system of FIG. 1.

FIG. 6B shows a sample pull-down menu which the Student may use to navigate around the MUSIC COURSE. The MUSIC COURSE is structured to have Modules, within which are Units. Within Units are Chapters and within Chapters are Pages. Displayed in window 130 is a fist of lessons and activities for Unit One of Module One of the course it should be noted that it is recommended that Students traverse the lessons (for example the "Let's Begin Right Hand and Left Hand" lesson 129) and activities (for example the "Let's Begin: Identify the Song Parts activity 131) in the order in which they are presented so that they have a chance to view the lessons before trying the associated activities.

Figure 6C:
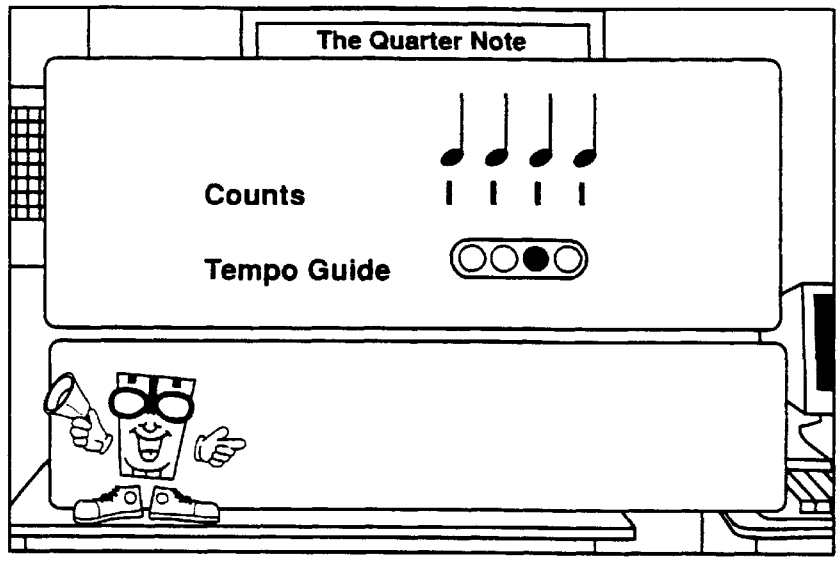

FIG. 6C shows a sample lesson screen of the MUSIC COURSE. The lessons provide the Student with information using colour animation and music (all played through the Shockwave Player™). Also, the Student is provided with voice-over instructions.

Figure 6D:
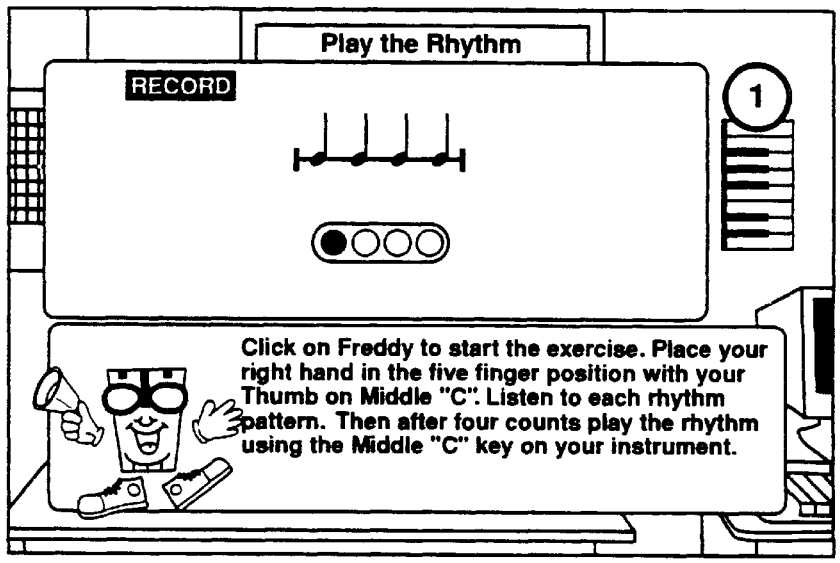

FIG. 6D shows a sample activity screen of the MUSIC COURSE. The activity screens provide the Student with the opportunity to test smaller scale tests (i.e. the EVALUATION APPLETS are used to evaluate the success of the Student) or to use the EVALUATION SEQUENCER to practice longer MIDI songs.

FIG. 6E shows a sample activity screen which would be shown to the Student and which specifically requires the Student to use the EVALUATION SEQUENCER. The Student is prompted to open the "sequencer" (e.g. denoted by the short keyboard) and to listen to MIDI songs and to play MIDI songs in response.

FIG. 6F shows a sample report which would be shown to a Teacher for a particular student (Mr. May First). The Teacher can use the scroll menu 133 to select an appropriate completed activities (i.e. a played song) of a particular Student. The Teacher can also see how many times the Student accessed the various lessons and activities, the longest and shortest time spent on a page as well as the Student's marks (if applicable) on each lesson and activity.

Figure 6G:
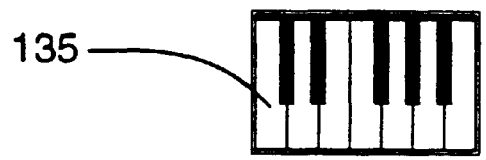

FIG. 6G shows another sample report which would be shown to a Teacher for a particular student. The MIDI file in FIG. 6G is represented by a MIDI icon 135 that activates a MIDI player allowing the Teacher to "play" the MIDI song back. The Teacher can also review the marks that were accorded to the Student's MIDI song as shown in area 136. Specifically, it should be noted that not all the evaluation measures (i.e. pitch, timing, dynamics) are necessarily marked for each activity.

EVALUATION SEQUENCER 56 is adapted to process MIDI files. There are 16 general MIDI channels on which events can be located. A track is a collection of MIDI events, as is conventionally Known. The MIDI files utilized by EVALUATION SEQUENCER 56 have the following MIDI Track Assignments:

| Track Number | MIDI Channel | Contents |
|---|---|---|
| Track 1 | Conductor | No MIDI Channel Assignment used for tempo, time signature, text event management |
| Track 2 | MIDI Channel 11 | Teacher's left hand (LH) File Display |
| Track 3 | MIDI Channel 12 | Teacher's right hand (RH) File Display |
| Track 4 | MIDI Channel 3–10 | Accompaniment includes all additional musical arrangement tracks including drums, etc. |
| Track 5 | MIDI Channel 1 | Student left hand (LH) recording track |
| Track 6 | MIDI Channel 2 | Student right hand (RH) recording track |
| Track 7 | MIDI Channel 13 | X track for special musical applications |

Figure 7:
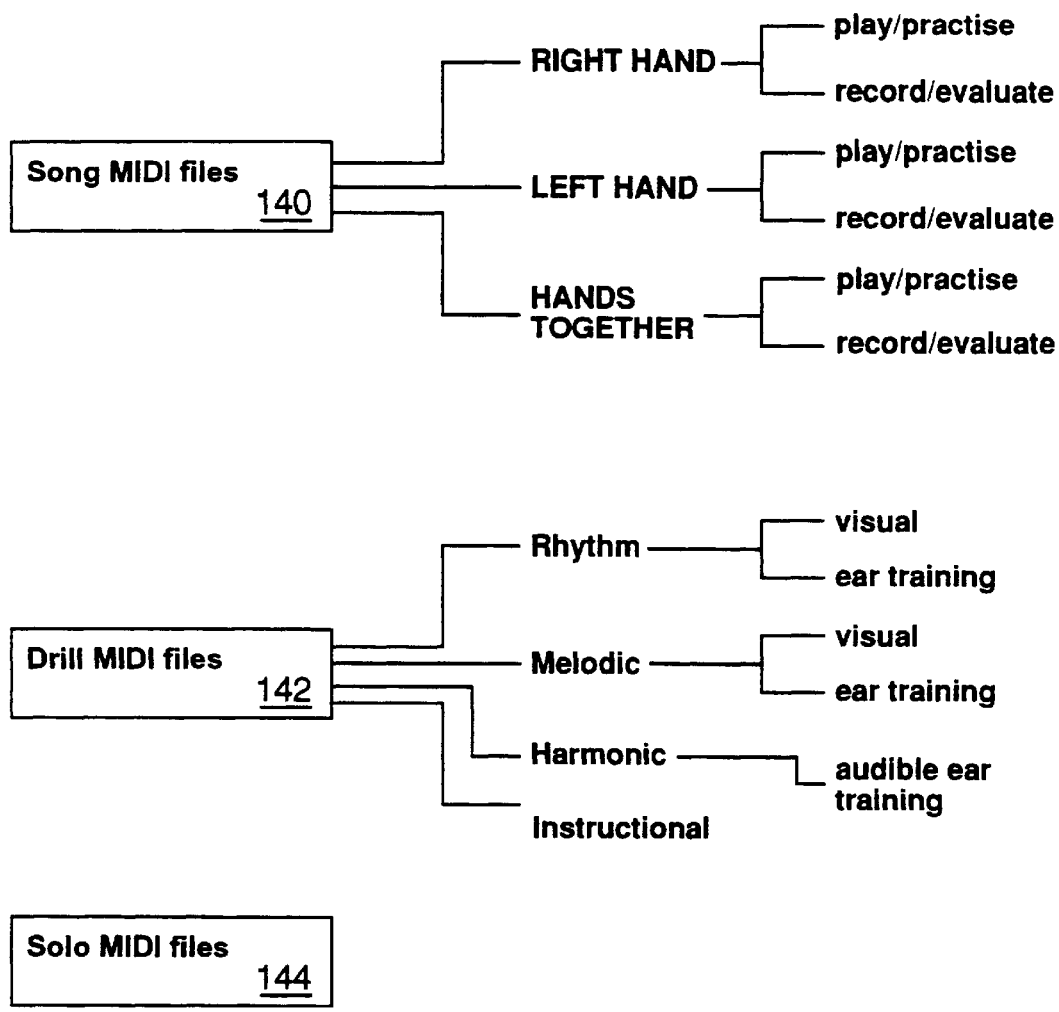

FIG. 7 shows a tree diagram of the three different MIDI file types utilized by MUSIC COURSE. There are song MIDI files 140, drill MIDI files 142, and solo MIDI files 144.

Song MIDI files 140 are used to help the Student practice different concepts introduced by MUSIC COURSE and are used to evaluate the Student's performance on timing, note accuracy, and where applicable, expression. There are three versions of song MIDI files, namely Right Hand, Left Hand, and Hands Together.

In the case of a Right Hand exercise, Student will record the Right Hand on Track 6 to be compared to the original MIDI file on Track 3 (Teacher's Right Hand). Only the RH is displayed with or without chord symbols. The RH notes should flash. This is used to practice the RH (melody) of a song.

In the case of a Left Hand exercise, Student will record the Left Hand on Track 5 to be compared to the original MIDI file on Track 2 (Teacher's Left Hand). Only the LH is displayed with or without chord symbols. The LH notes should flash. This is used to practice the LH (melody) of a song.

In the Hands Together exercise, both Right Hand and Left Hand are displayed with and without chord symbols (Grand Staff/Lead Sheet). Both Right Hand and Left Hand notes flash. This is used to practice the RH and LH parts of a song. The file displays both the RH (Track 3) and LH (Track 2) notation either in Grand Staff notation (with or without chord symbols) or in Lead Sheet notation. Chord symbols will be entered in a text event Track area that is defined as Track 1 with no MIDI Channel (where all MIDI text events shown in FIGS. 8A, 8B and 8C are located). Chord symbols are defined within a certain area of the score and their positions are coded within the MIDI file (colour letter). The rest of the song files tracks (bass, accompaniments, and drums) will be heard but not displayed. These tracks will be merged and assigned Track 4 MIDI channels 3 to 10. In the record/evaluate mode Students will record RH on Track 6 and LH on Track 6 to be compared to for evaluation with the original MIDI file on Track 3 (Teacher's RH) and Track 2 (Teacher's Left Hand).

Drill MIDI files 142 are used to reinforce a concept, for quizzes and tests and for exams. The evaluation process will be used for all three scenarios except only the evaluation results will be shown immediately (i.e. to reinforce a concept). Generally, the Student is able to listen to the example and then record. For sight reading however, the Student cannot hear the song first. With drill MIDI files, the Student only has one chance to record their performance before it is evaluated and the results sent to Administrative Web Server 14.

There are four main types of drill exercises which are employed by EVALUATION SEQUENCER 66 namely Rhythm, Melodic, Harmonic and Instructional.

The Rhythm type exercises evaluate the Student's performance on timing. The evaluation is in the form of a letter grade for each exercise and an average of the exercise marks is stored on the Administrative Web Server 14. Rhythm can be evaluated using Visual (sight reading) means, that is the rhythm drill file can be displayed in rhythm notation. Percussion on Channel 10 would also be included. Students look over the example and record their performance on Track 6 to be compared for evaluation with the original MIDI file on Track 3. Alternatively, rhythm can be evaluated using Ear Training, i.e. where the rhythm drill file is not displayed but only heard as a rhythm track Track 3). This drill MIDI file will also include percussion on Channel 10.

The Melodic type of drill MIDI file is used to evaluate the Student's performance on timing and note accuracy (or pitch). Evaluation results are given in graphical form with a letter grade. An average of the marks will be stored to Administrative Web Server 14. In the Visual type (i.e. sight reading) the drill MIDI file is displayed in Lead Sheet notation (Track 2 or 3). Students look over the example (they are not allowed to hear it) and record their performance on Track 5 or 6 with the aid of the metronome and the performance is compared with the original MIDI file on Track 2 or 3. The Audible type (i.e. no display) requires that the drill MIDI file be heard only. Percussion is also included from Channel 10. Students will listen to the example twice and then record their performance on Track 5 or 6 to be compared for evaluation with the original MIDI file on Track 2 or 3. This is for ear training so the student should not see the example before or while recording it. There will be examples for just the RH (treble clef and just the LH (bass clef) in single staff notation.

The Harmonic type of drill MIDI file is used to evaluate the Student's performance on timing and note accuracy. This is in audible format (i.e. ear training). The evaluation is graphical in nature and provides a letter grade. The drill MIDI file will only be heard (not displayed) from Track 2 and will include percussion from Channel 10. Students will listen to the example twice and then record their performance on Track 5 to be compared for evaluation with the original MIDI file on Track 2. An average of the marks must be stored on the Administrative Web Server 14. The important aspect here is that it is intended for ear training so the Student should not see the example before or while recording.

The Instructional type of drill MIDI file is used to instruct the Student to perform (record) a particular exercise. The student will record the exercise on either Track 5 or 6 to be compared for evaluation with the original MIDI file on either Track 2 and/or 3. An example of an instructional type of question would be: "play and record a C scale with your right hand in quarter notes".

The solo MIDI files 144 are used to evaluate a Student's "solo" performance on the basis of timing, note accuracy, and where applicable, expression. This type of MIDI file is only used within the Recording Studio 124. An evaluation is provided in a letter grade format which represents an overall score. As discussed above, for the solo MIDI file recording, the Student will be given three chances to record their arrangement and EVALUATION SEQUENCER 56 will pick the best out the three to send to the Administrative Web Server 14 for their mark.

FIGS. 8A, 8B and 8C are tables of the various MIDI text events which are utilized by MUSIC COURSE. Many of the features of EVALUATION SEQUENCER 56 are options that are encrypted in the source MIDI file as text events. This allows for the MIDI file to contain information relating to performance, display and evaluation parameters, as well as which information is to be stored within database 42. For example, chords are one of the options that are encrypted in the source MIDI file as a text event (stored on Track 1). This track, is not assigned a MIDI channel because it is handling MIDI text events and not MIDI data.

FIGS. 9A to 9I show sample screens featuring various input buttons which are utilized by the Student to operate the EVALUATION SEQUENCER software 56 within the MUSIC COURSE. Specifically, the ZOOM IN 500, the ZOOM OUT 502, PERFORMANCE VIEW 504, SCORE VIEW 506, MEASURE SELECT 508, MIXER 510, RECORD 512, STOP 514, PLAY 516, TEMPO SLIDER 518, PANIC 520 and SCROLL DISPLAY 522 buttons are all shown. Also, four indicator lights 524 comprises a first red light followed by three green lights. Indicator lights 524 can be toggled to either flash in accordance with the tempo of the MIDI song being played or to digitally display the bar number and beat within a bar.

Figure 9A:
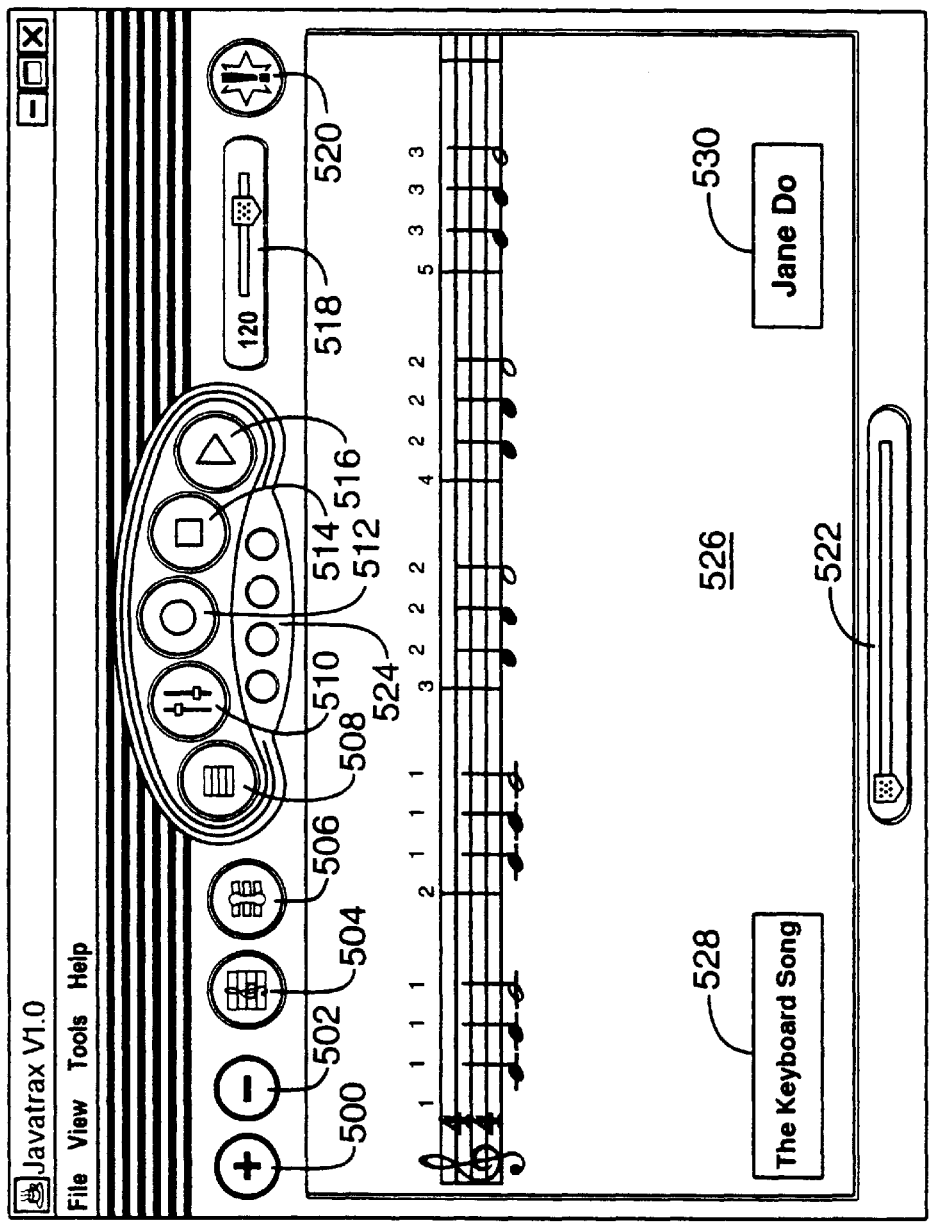
FIGS. 9A to 9I are sample screens illustrating the various menu screens that would be provided to a Student traversing the music teaching system of FIG. 1.
Figure 9B:
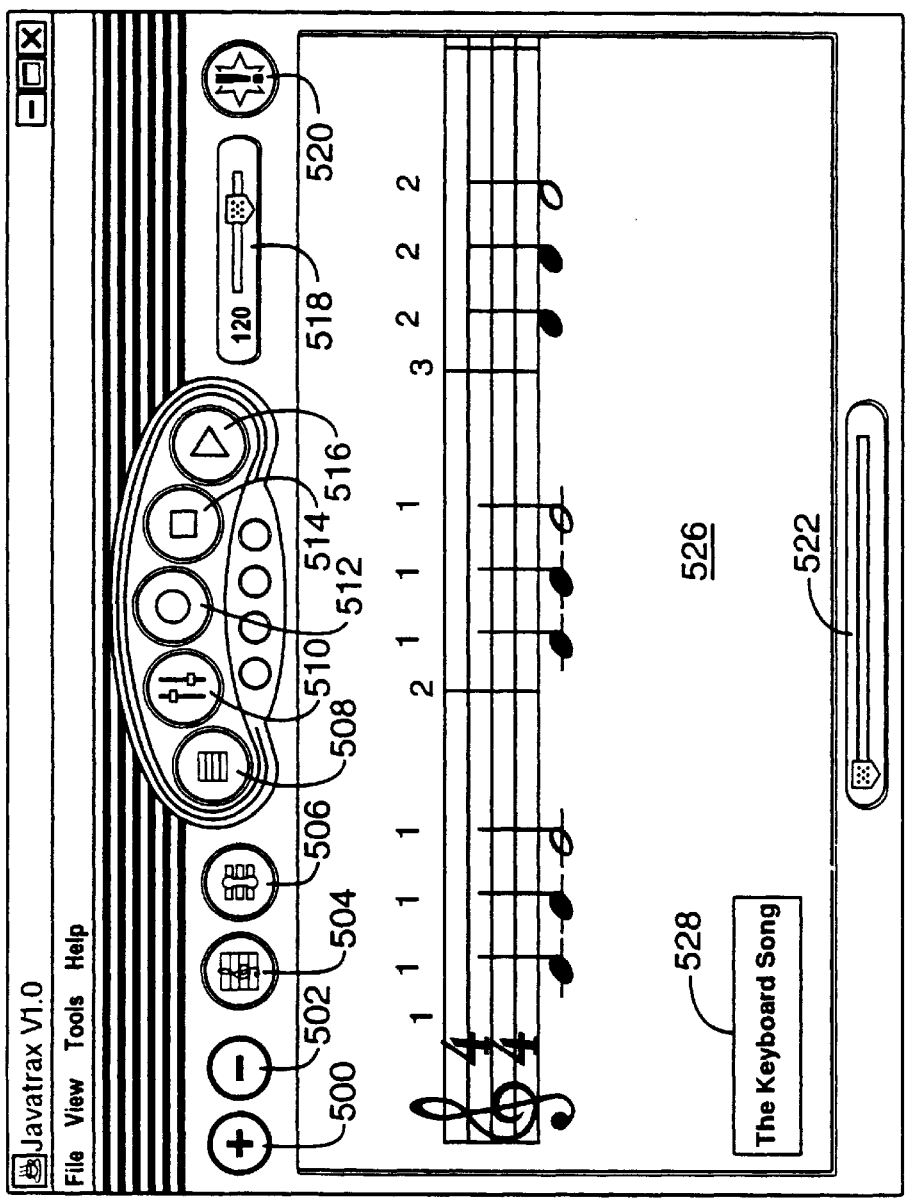
Figure 9C:
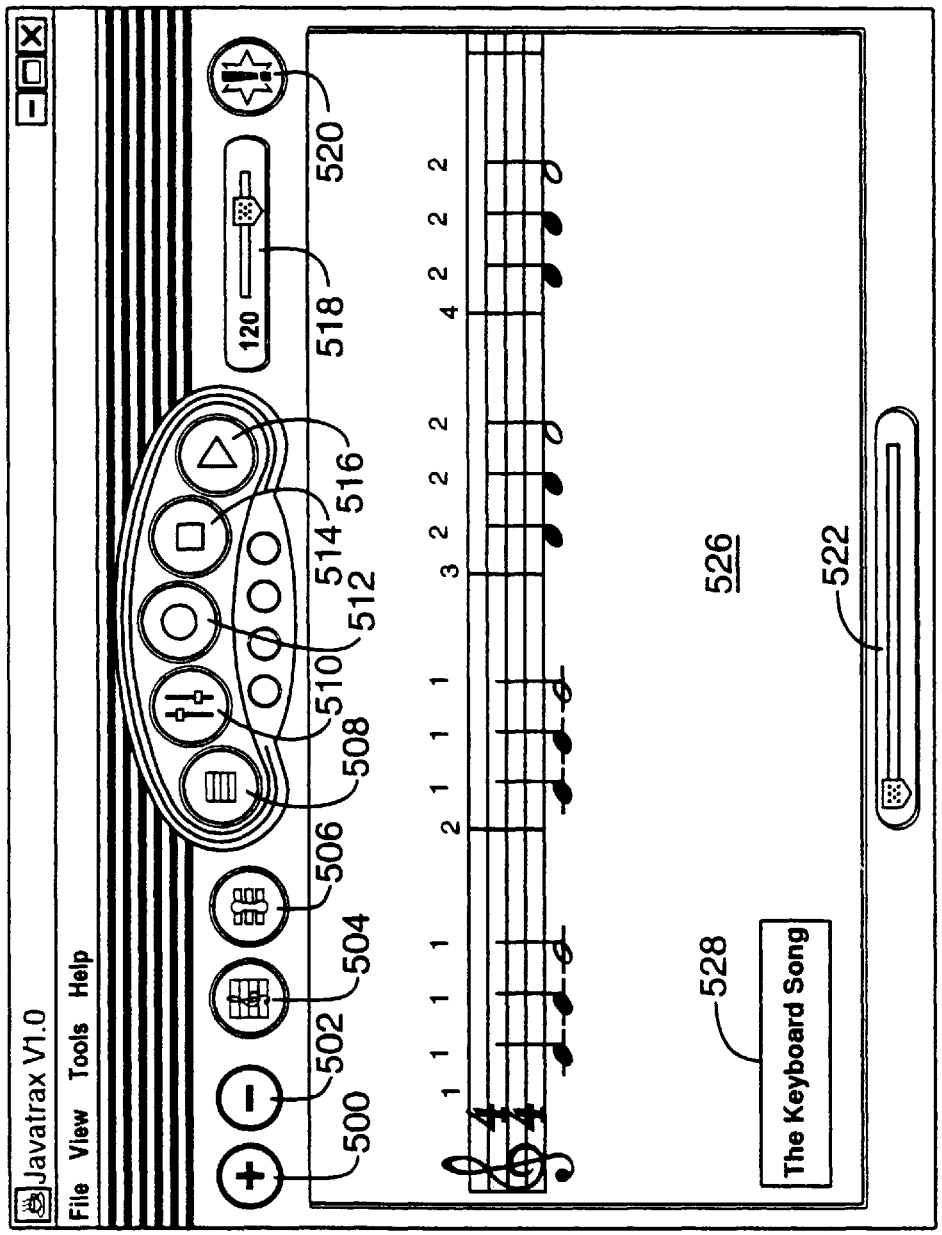
Figure 9D:
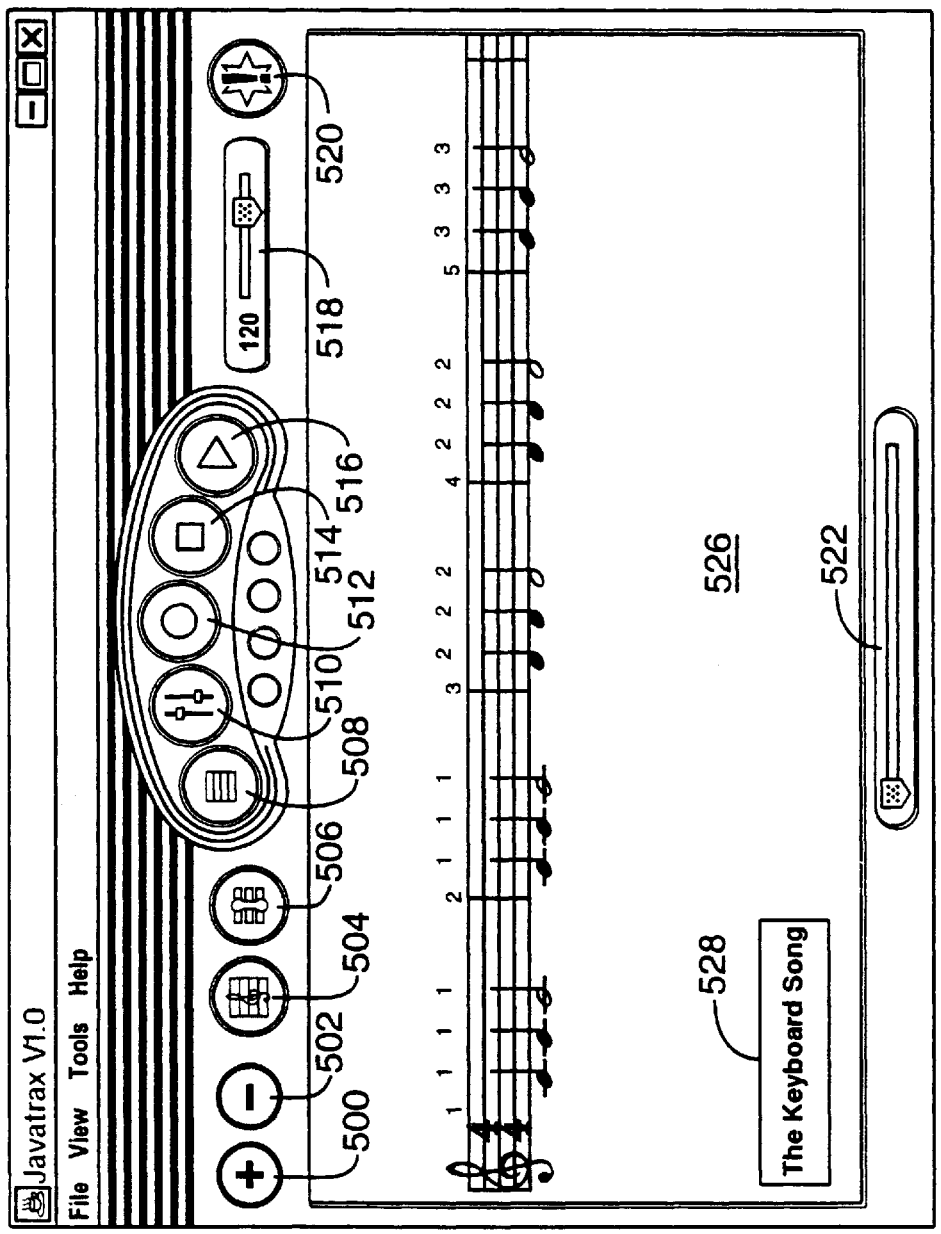
Figure 9E:
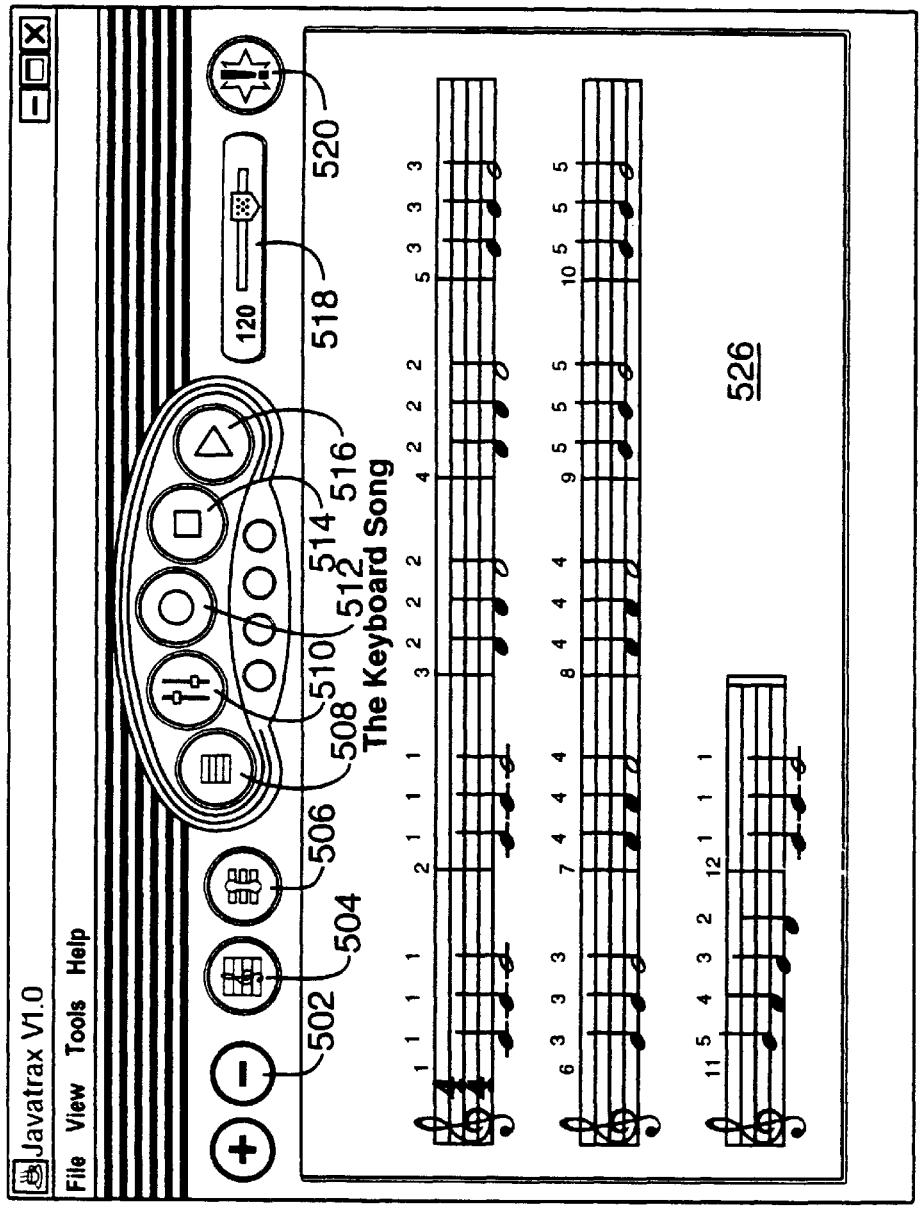

The ZOOM IN button 500 and ZOOM OUT button 502 are used to control the level of detail (i.e. the number of measures) shown in the main screen area 526. For example, FIG. 9B shows the result of pressing the ZOOM IN button 500 from the screen shown in FIG. 9A. Also, FIG. 9C shows the result of pressing the ZOOM OUT button 502 from the screen shown in FIG. 9A. The Student can use the PERFORMANCE VIEW button 504 to provide a single clef, if only one hand is being played or recorded (or a double clef if both hands are involved) as shown in FIG. 9D. The PERFORMANCE VIEW button 504 is also used to clear the evaluation display. Alternatively, the Student can use the SCORE VIEW button 506 to provide a view of the entire score as shown in FIG. 9E.

Figure 9F:
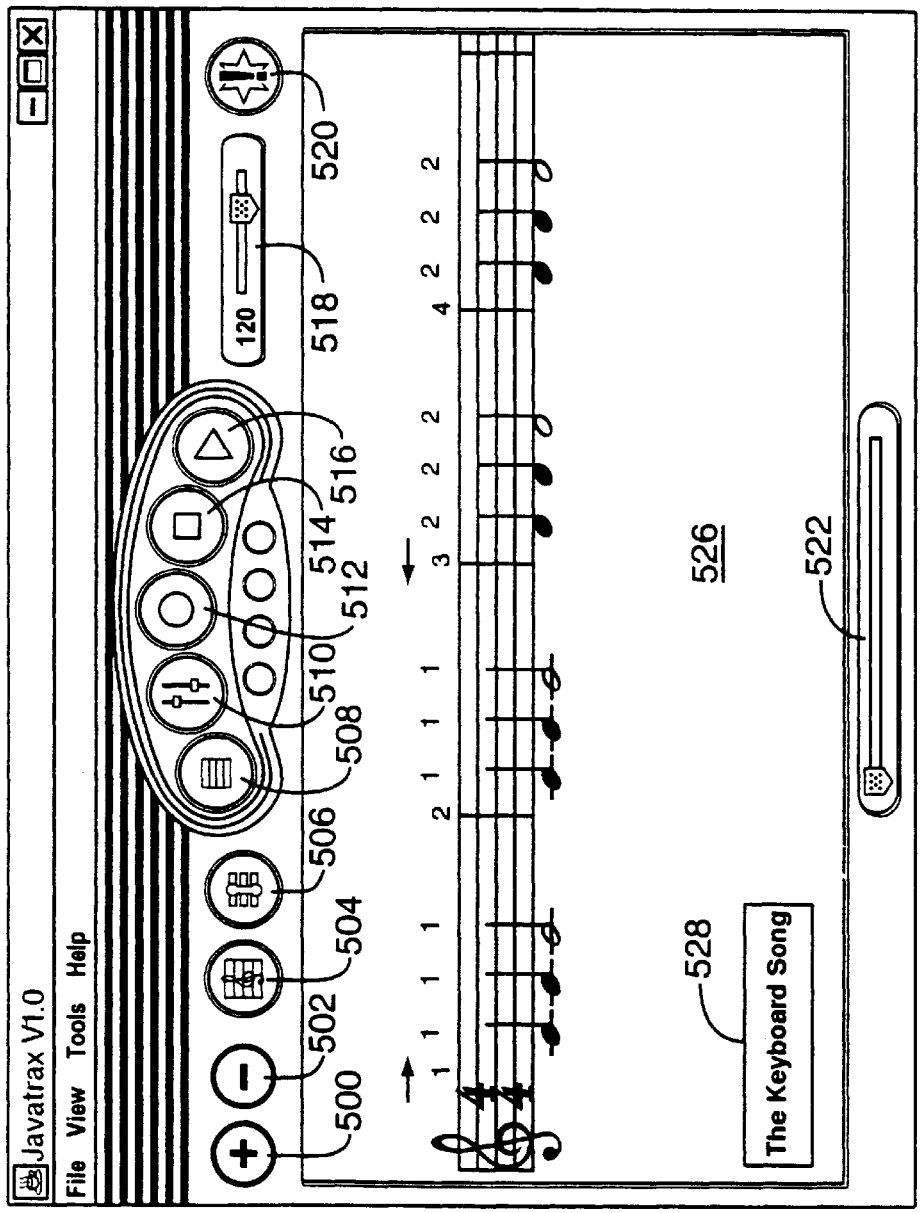
Figure 9G:
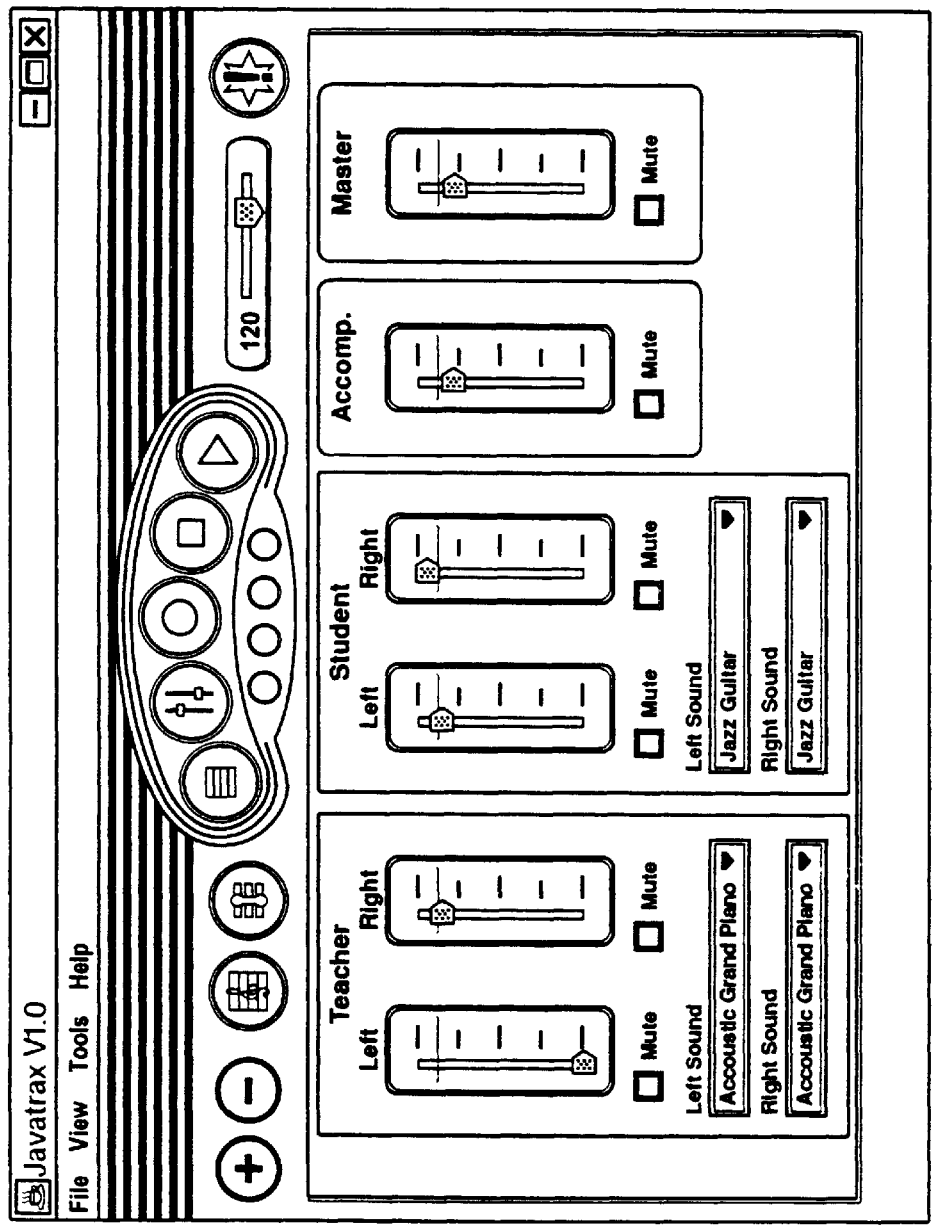
Figure 9H:
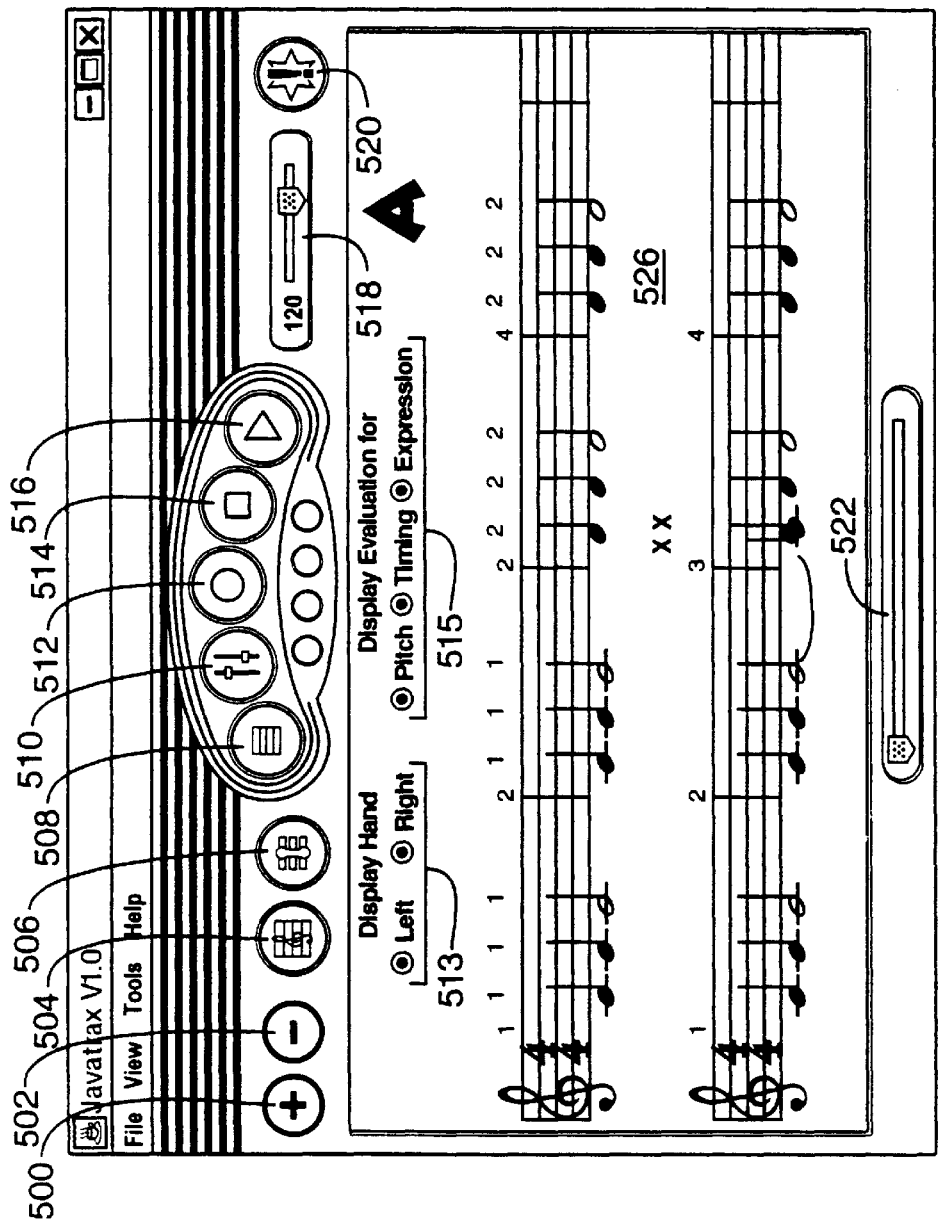

By pressing the MEASURE SELECT button 508, the Student can select the measure(s) that he or she would like to play and/or record. Specifically, FIG. 9F shows an example of how the selected measures would be indicated by arrows. Finally, FIG. 9G shows the mixer screen (including standard mixer functionality) which can be called by the Student by pressing the MIXER button 510.

Figure 9I:
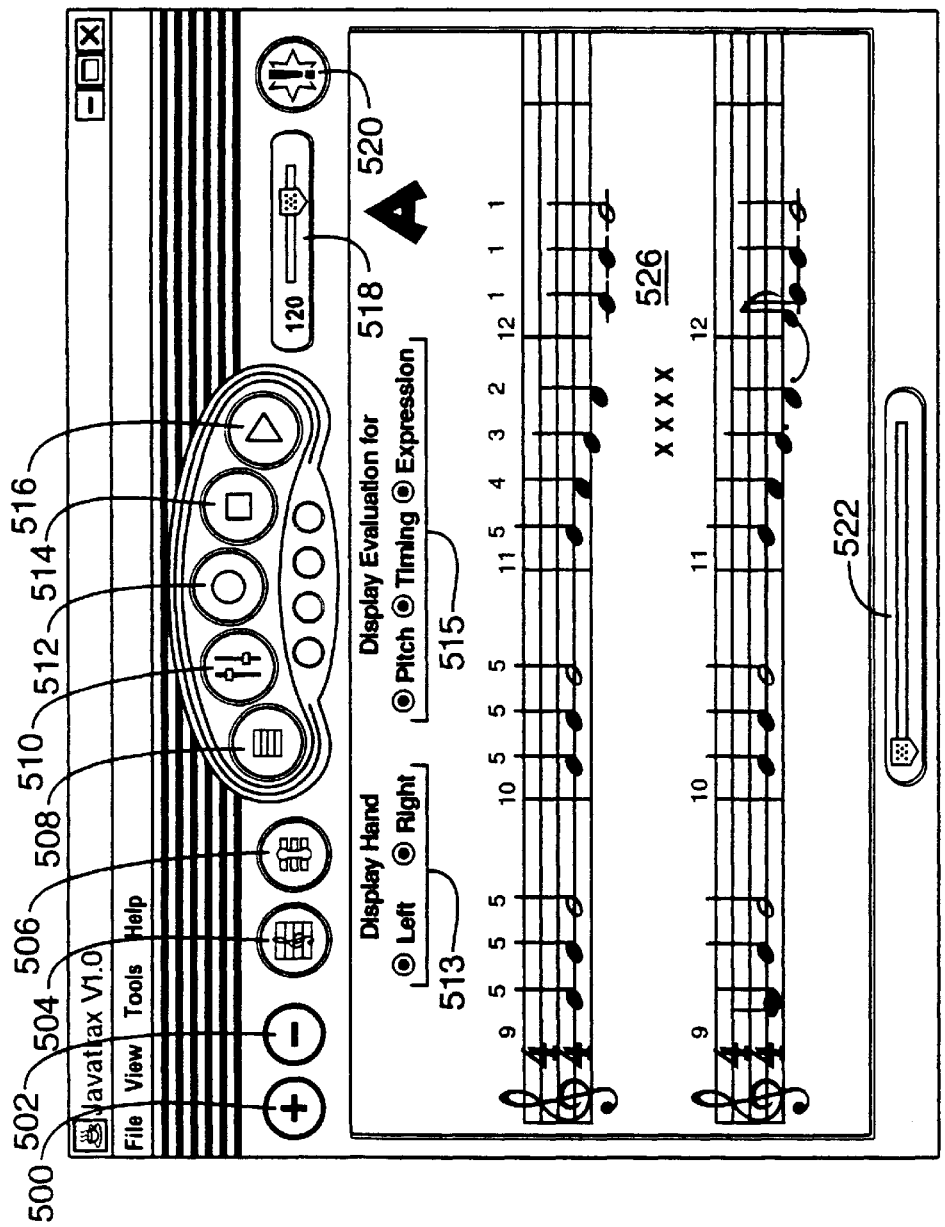

Referring back to FIG. 9A, the RECORD button 512 is used by the Student to set EVALUATION SEQUENCER 56 in record mode. When recording is completed, evaluation automatically occurs and a screen that displays the Student's performance, a letter grade mark, and errors in timing, notes, and expression (if applicable) is generated as shown in FIGS. 9K and 9I. As shown at 513 the Display Hand can be either LH or RH or BT (i.e. both "Left" and "Right" buttons will show). At 515, the "Display Evaluation for Pitch, Timing or Expression" provides letter grade marks for the overall mark. The result screens feature the Teacher trace on the top and the Student Track on the bottom. Either the Right Hand or the Left Hand are displayed. Errors are indicated with a graphic of an X for each of the three marking schemes: Timing, Pitch, and Expression.

Referring again to FIG. 9A, the STOP button 514 is used by the Student to stop the play of a MIDI song which resets the EVALUATION SEQUENCER 56 to the first measure and to stop the record of a MIDI song which displays an evaluation. The student clicks on the Performance Score to clear the evaluation display and resets the EVALUATION SEQUENCER 56 to the first measure. The PLAY button 516 is used by the Student to set EVALUATION SEQUENCER 56 in play mode. The PANIC button 520 allows the Student to initialize the EVALUATION SEQUENCER 56 in the event that a MIDI note either sticks or freezes.

The TEMPO SLIDER button 518 allows the Student to change the tempo of a song being played and the SCROLL DISPLAY button 522 button allows the Student to display, and have sounded, various portions of a song. Also, there is a SONG TITLE field 528 located in the bottom left corner of the main screen area 526 which is used to display the name of the song and a COMPOSER field 530 located in the bottom right corner of the main screen area 526 for displaying the name of the composer.

The following table lists the items which are shown on a pull-down menu for EVALUATION SEQUENCER 56. They include routine functions, such as PRINT and EXIT as well as features such as METRONOME and COUNT IN:

| Menu Title | Pull Down Option |
| --- | --- |
| File | Print |
|  | Print Preview |
|  | Exit |
| View | Performance |
|  | Score |
|  | Mixer |
|  | Select |
| Tools | Count-in -- None, One Bar, Two Bars |
|  | Metronome -- On/Off |
|  | Tempo Lights |
|  | Timer |
|  | Hot Keys -- On/Off |
| Help | Content & Index |
|  | About |

Figure 10:
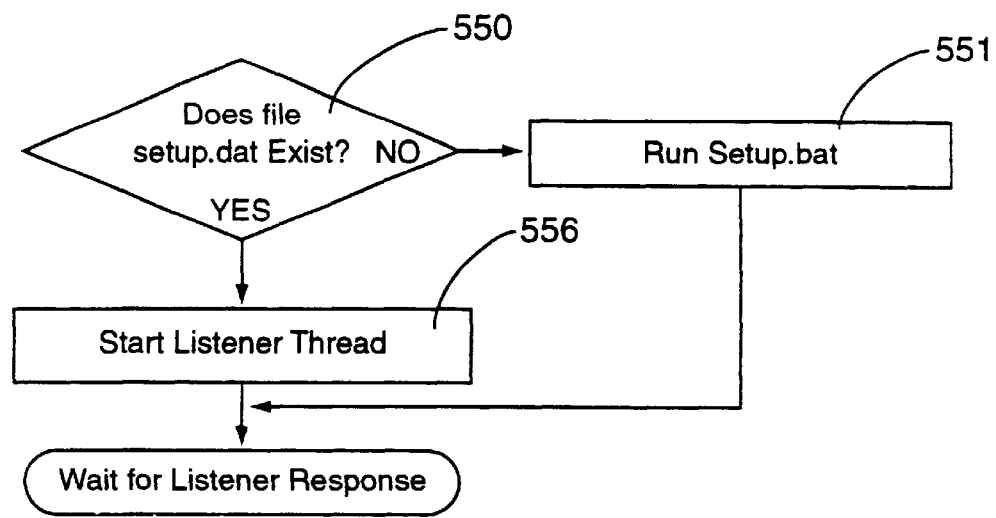
FIGS. 10 to 24 are flowcharts of the process steps of the various general operation routines comprising the EVALUATION SEQUENCER program of the music teaching system of FIG. 1.
Figure 11:
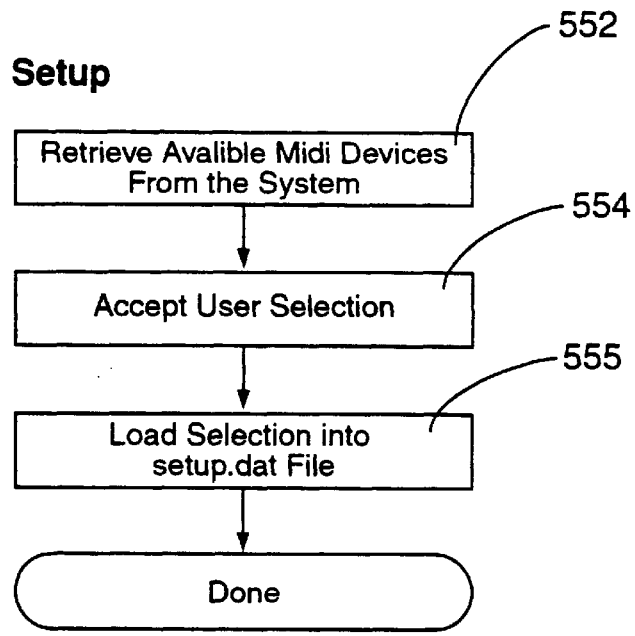

FIGS. 10 and 11 show the START and SETUP routines. The START routine is executed when the Student invokes the EVALUATION SEQUENCER 56 from within the MUSIC COURSE menu system by clicking on the START JAVATRAX icon in the start menu or by clicking on the course icon on the desktop. The START routine first checks to see whether a setup file (i.e. setup.dat) currently exists in the EVALUATION SEQUENCER 56 application directory folder (at 550). If not, then the routine calls the SETUP routine (at 551) retrieves the available input and output MIDI ports of Student Station and lists them for Student selection (at 552). When the Student selects the appropriate input and output MIDI ports (at 554), the selections are entered into a new setup file (i.e. setup.dat) (at 555).

Figure 12:
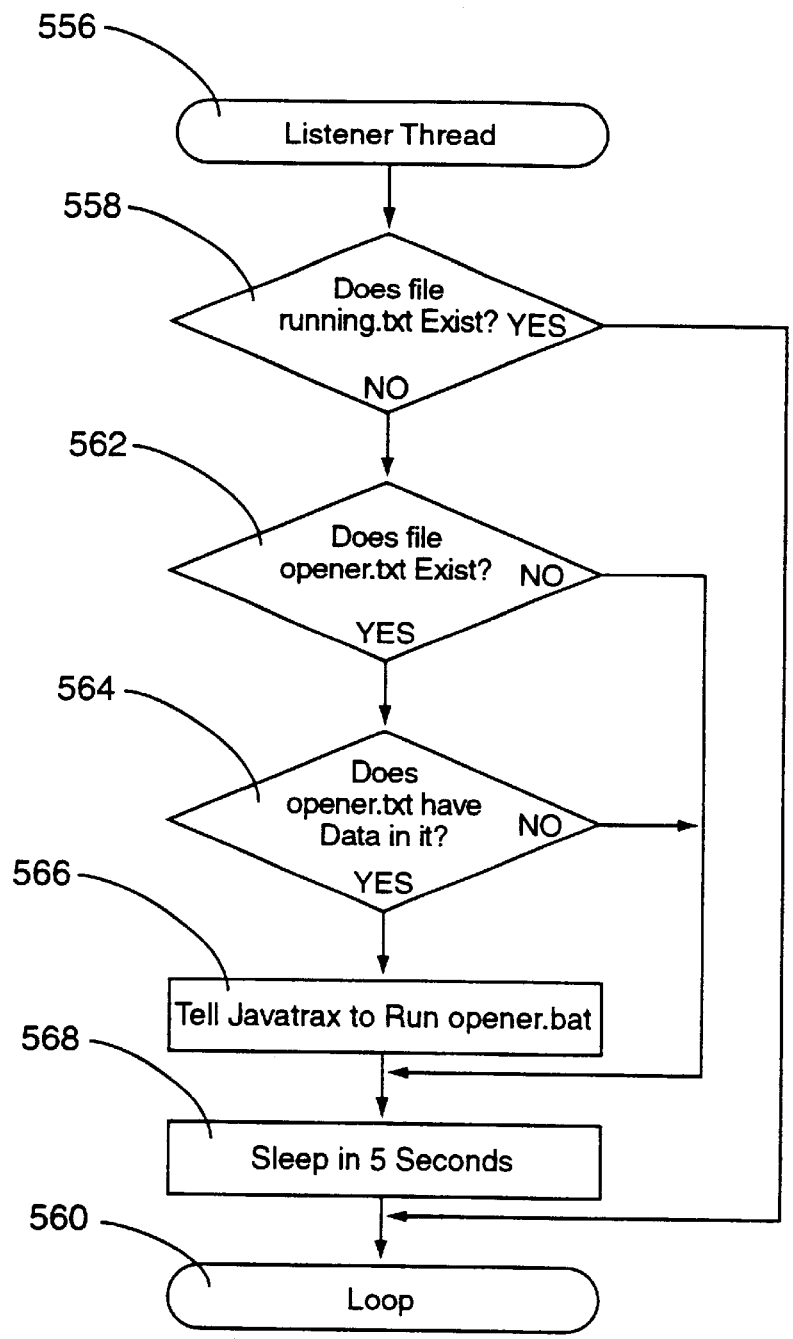
Figure 13:
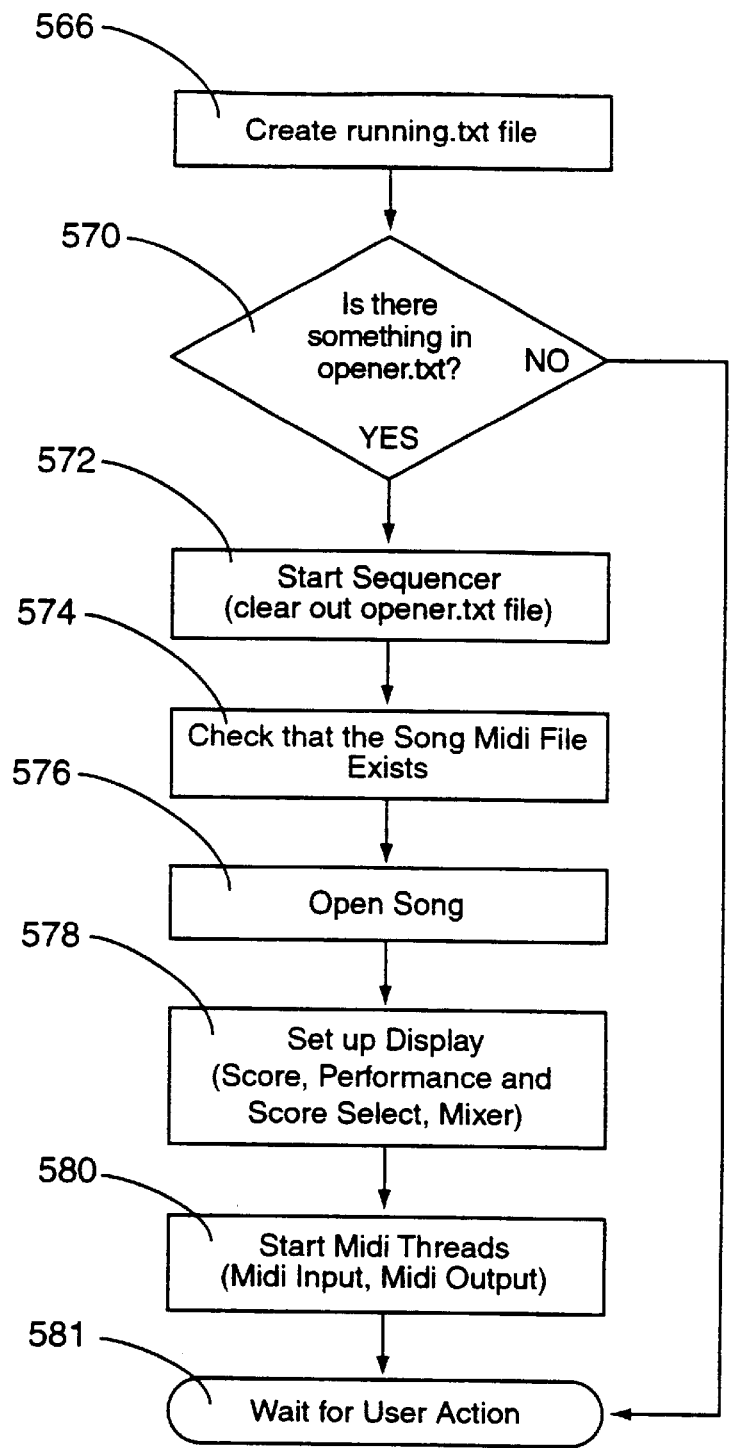

If the setup file is in the EVALUATION SEQUENCER 56 application directory folder then the LISTENER THREAD routine is started (at 556) shown in FIG. 12. It is checked whether the EVALUATION SEQUENCER 56 is already running by checking for the presence of an appropriate file (i.e. running.txt) in the preferences folder (at 558). If so, then checking continues (i.e. listening) (at 560). If not, then it is checked whether a file (i.e. opener.txt) exists (at 562) in the preferences file and if so whether it contains any information (at 564). If the opener.txt file contains information, then CPU 5 executes (at 566) the OPENER routine (FIG. 13). If not, then CPU 5 waits for 5 seconds (at 568) before checking again (at 560) to see whether the opener.txt file exists.

FIG. 13 shows the OPENER routine which is the front end of the sequencer and first rechecks to see if there is something in the file opener.txt (at 570). If not, then it simply waits for the Student's action (at 572). If so, then it retrieves the information from the opener.txt file and creates a URL from which it can download the MIDI song file into memory. This routine also sets up the MIDIport using the preferences chosen by the user in the SETUP routine. Then the sequencer is started (at 574). This routine is the front end program for most of the operations performed by the overall MUSIC COURSE program. It contains the code to operate the display and performance features of the MUSIC COURSE program. These include: printing, print previewing, displaying score and performance views, displaying the mixer, zooming in performance view, turning sound on/off for the metronome, changing the display of the tempo guide, turning on/off and selecting measures in performance view, changing the count-in of a song, recording/playing/stopping a song, and displaying help and company information for the program.

Figure 14:
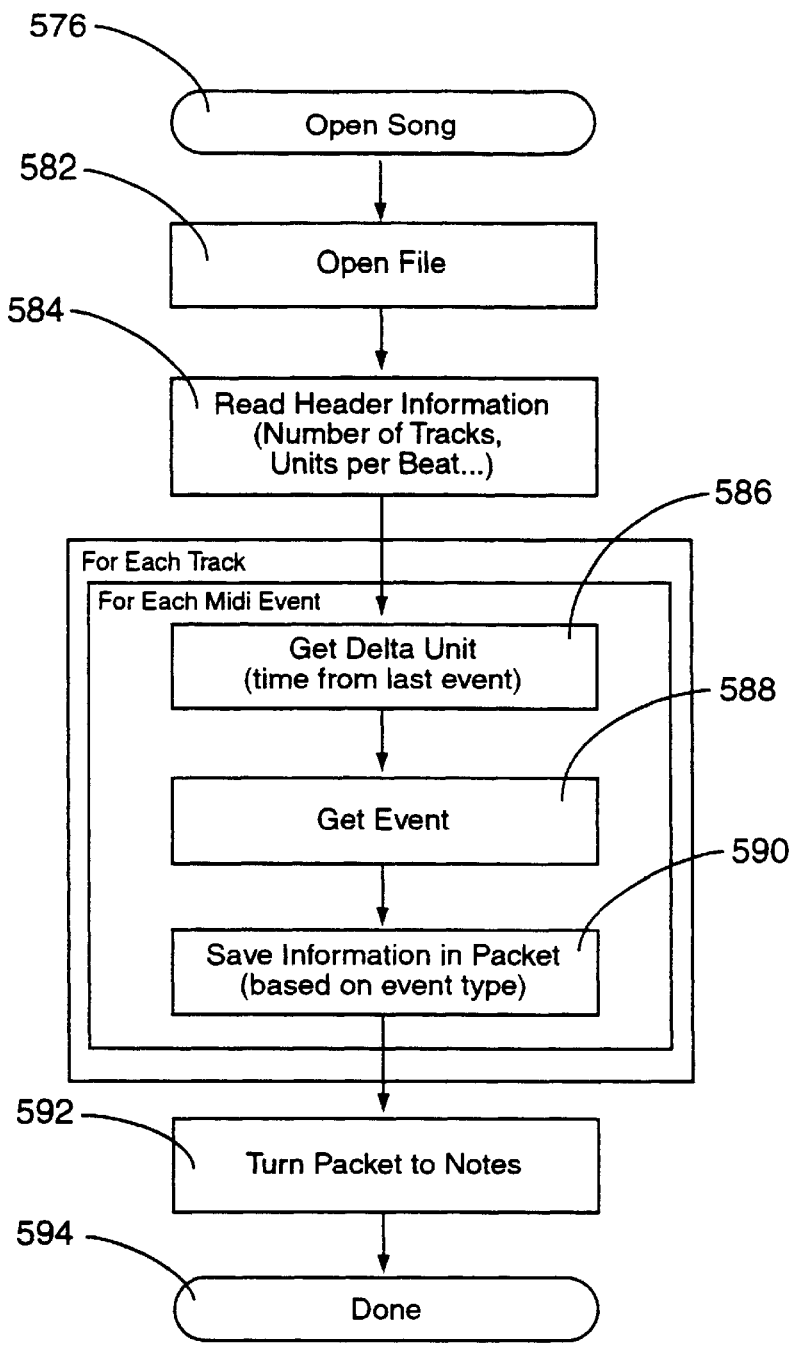

The sequencer checks to see that the song MIDI file exists (at 576) and executes the OPEN SONG routine (at 576) (as shown in FIG. 14) CPU 5 then generates various screen display graphics after receiving the song information (e.g. Score, Performance and Score Select, Mixer, etc.) for the specific MIDI song file downloaded from Administrative Web Server (at 578) and starts the MIDI INPUT and MIDI PLAYER routines (at 580) to control playing and recording. After everything has been displayed, process 566 then waits for the Student's interaction with the graphically displayed screen (at 572).

Figure 16:
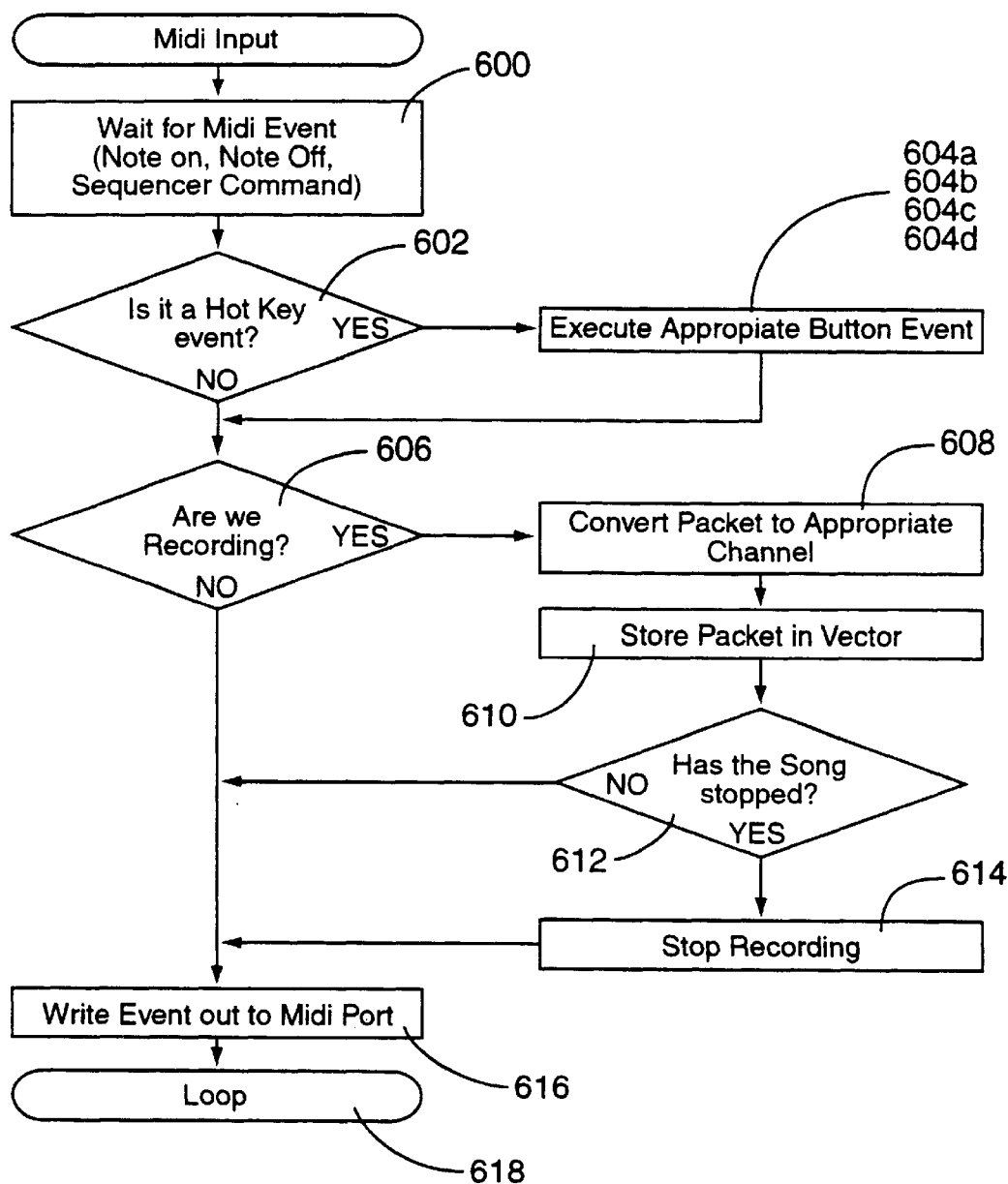

FIG. 14 shows the OPEN SONG routine 576 which is executed from within the OPENER routine 566 discussed above (i.e. when a song is first received by MUSIC COURSE). A MIDI song file is opened (at 582) and the header information is read (at 584) for the MIDI song file. CPU 5 checks that the song is of proper format for a MIDI file. For each element in each track of the song, the delta unit is obtained (i.e. the time between events) (at 586) and the corresponding Event (at 588). These events are then saved separately as packets. These events can be either Meta Events which includes MIDI text events (i.e. from FIGS. 8A, 8B, and 8C such as chords, fingering, dynamic marks, titles, composers, oddities, time signature, and tempo etc.) or a normal event (e.g. note on/off events, volume and instrument settings). The data packets are then converted and saved as notes in a vector (i.e. based on the event type) (at 590). Once all tracks and all MIDI events have been processed, the TURN PACKETS TO NOTES routine is then executed (at 592) (as shown in FIG. 16). Once everything has been displayed, user interaction is awaited and in particular, two threads are set up to control PLAYING and RECORDING, as will be described.

Figure 15:
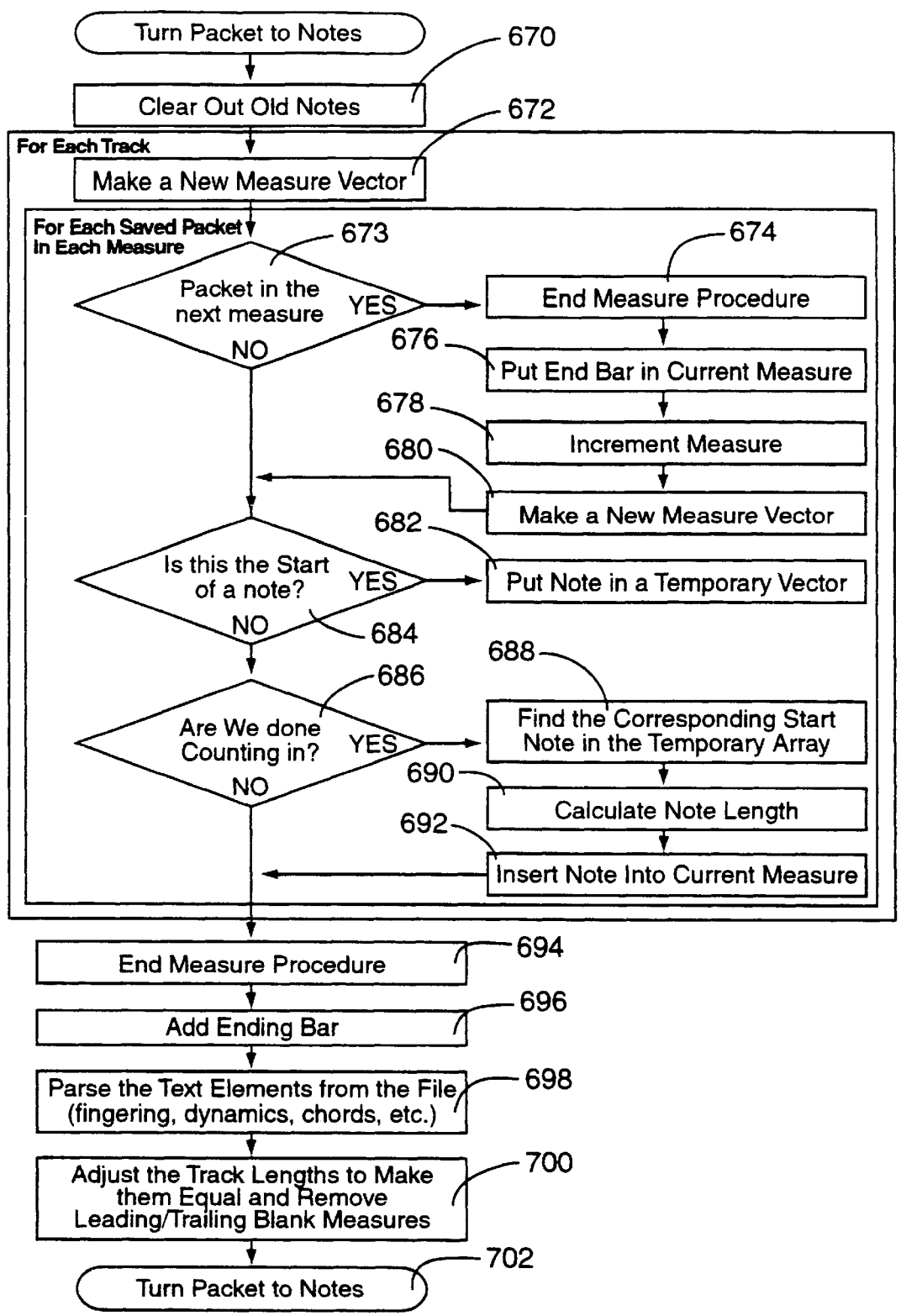

FIG. 15 shows me executable steps of the TURN PACKETS TO NOTES routine which is called from either within the OPEN SONG routine or the END RECORDING routine. First the old notes are cleared out of the note register (at 670). For each track of the song, (i.e. within for loop 671) a new measure vector is created (at 672). For each MIDI event (i.e. within for loop 669), it is determined if the packet is in the next measure (at 673). If so, then the END MEASURE routine is called (at 674), the end bar is put in the current measure (at 676), the measure is incremented (at 678) and new measure vector is created (at 680). If the pack is not in the next measure (at 674) then it is determined whether the element is the start of a note (at 684). If so, then the note is put in a temporary vector (at 682) if not then it is determines whether "counting in" is completed (at 686). If so, then the corresponding start note in the temporary array is located (at 688), the note length is calculated (at 690) and the note is inserted into the current measure (at 692). Once all the MIDI events for all the tracks have been evaluated, the END MEASURE routine is executed (at 694) which conducts a manner of housekeeping. Then an ending bar is added (at 696) and text elements from the file (i.e. fingering, dynamics, chords, etc.) are parsed (at 698). Finally, the track lengths are adjusted to make them equal and leading or trailing blank measures are removed (at 700). Finally, the routine returns to the calling routine (at 702).

Figure 17:
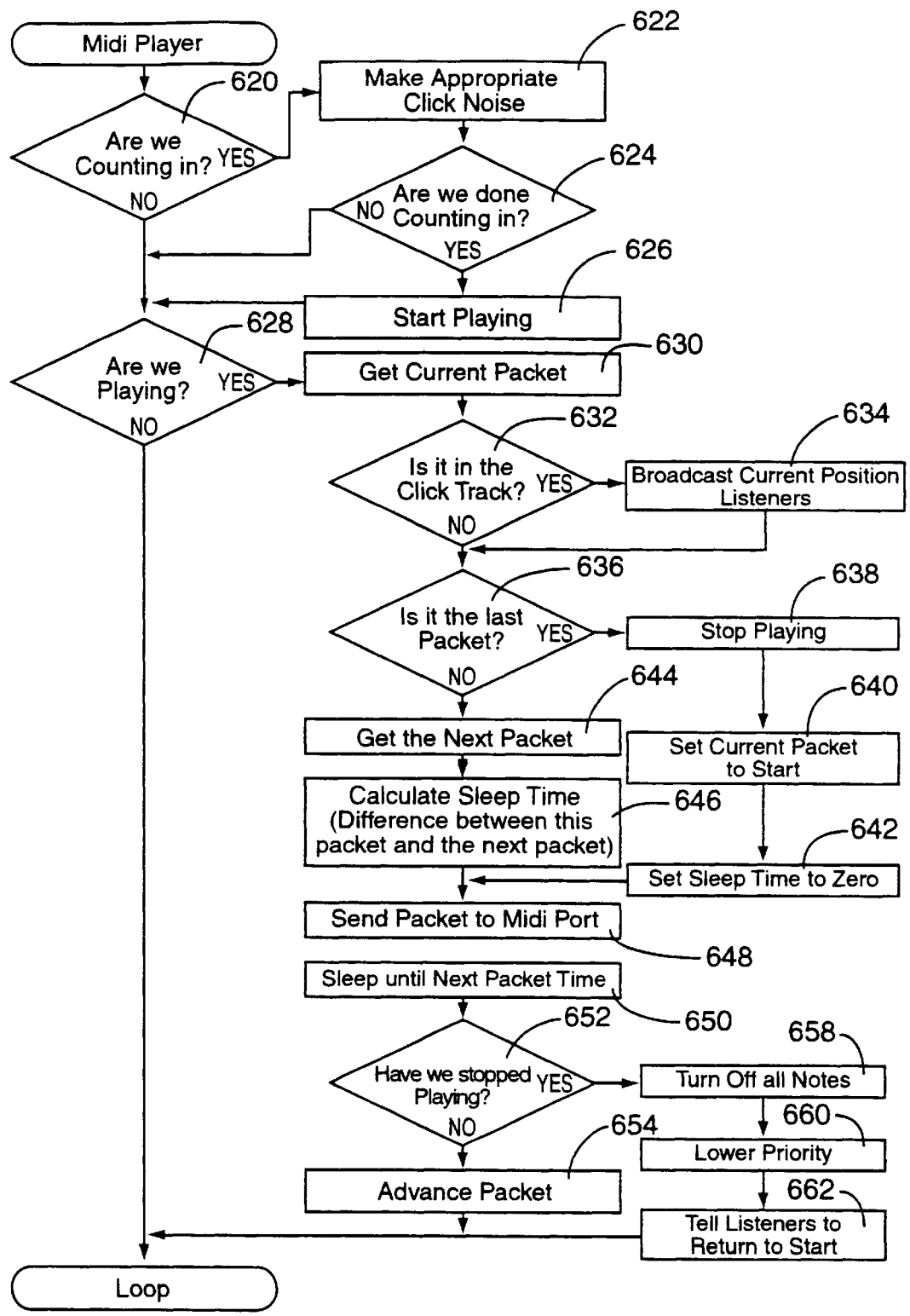

FIGS. 16 and 17 show the two sequencer routines which control playing and recording, namely MIDI INPUT (i.e. playing) and MIDI PLAYER (i.e. recording) routines. As previously discussed, both of these routines are always running in the background.

Playing a MIDI song requires the MIDI PLAYER routine (FIG. 17). The MIDI PLAYER routine is also used to play the song to the Student when recording the Student's notes. The priority of MIDI PLAYER routine is set to the highest level when a song is detected. During playing, the MIDI PLAYER routine also tells any related display programs what position and measure the current note is being played in. If a "count in" (i.e. advance auditory rhythm in advance of the song) has been selected by the Student then the MIDI PLAYER routine determines this (at 620) and makes the appropriate "click noise" (e.g. a "wood block" click) (at 622) while the "count in" period is still active by checking the status (at 624).

The MIDI PLAYER routine plays the song by sending the packet information parse from the song to the MIDI port. This information includes what event to play and how long before the next event is played. Once "count in" is finished, it is determined whether the song is playing (at 628). If so, then packet information parsed from the song is sent to the MIDI port for audio play (at 648) and the routine sleeps until the next packet time (at 650). The pack information includes what note to play and how long before the next note is played. Specifically, if the packet is in the "click track" (i.e. at a rhythm point) (at 632) then the position and measure that the current note is being played in is provided to any related display programs (at 634). If not, then until the packet is the "last packer" in the song (determined at 636), the next packet is obtained (at 644) and the sleep time (i.e. the time difference between the current packet and the next packet) is calculated (at 646).

When the song ends, the MIDI PLAYER routine turns off all the notes being sent through the MIDI port, lowers the priority level of the MIDI PLAYER routine and tells any related displays to return to the starting position of the song. Specifically, if the packet is the last packet then CPU 5 stops playing the song (at 638), the current packet is set to start (i.e. returns the marker to the start of the song), and sleep time is set to zero (at 642). In both cases (whether the packet is the last one or not), the current packet is sent to the MIDI port for audio play (at 648) as discussed above. In the case where the current packet is the last packet, sleep time is zero (at 650) (i.e. no sleep on the last packet). If playing has stopped (at 652) then all notes are turned off (at 658) and the priority level of MIDI PLAYER is reduced (at 660) and any related displays are told to return to the starting position of the song (at 662). Finally, the loop (at 656) remains operative until either another "count in" or "playing" event occurs.

The MIDI PLAYER routine is constantly being executed in the background. This routine controls the play of a selected original song to the Student and the MIDI INPUT routine is executed to control the receiving and playing of the notes that the Student plays. The MIDI INPUT routine waits for a MIDI Event (i.e. Note On, Note Off, Sequence command) (at 600). If there is a hot key event (i.e. a PLAY, STOP or RECORD button pressed) (at 502) then the appropriate button event is executed (at 604a, 604b, 604c, 604d). If not, then it is determined whether recording is proceeding (at 606). If so, then the note is converted into the appropriate MIDI channel to reflect the proper sound and hand (at 608). Information associated With the Student's played note (i.e. being recorded) is then stored in a vector (at 610) to be Used later in the END RECORDING (i.e. evaluation) routine. This includes the note's pitch, timing and expression (or volume). If the Student has stopped playing (at 612) then the recording is stopped (at 614). If not, then the MIDI Event is written out to the MIDI port for playback and throughputting (at 616) and the loop (at 618) is repeated.

Recording a song requires both the MIDI INPUT and MIDI PLAYER routines. The MIDI PLAYER thread controls the original music the Student hears and the MIDI INPUT thread controls the receiving and playing of the notes that the Student plays. The MIDI INPUT routine (FIG. 16) receives the events played by the Student and converts the events to packets with the appropriate MIDI channel to reflect the proper sound and hand. MIDI INPUT routine also converts Student packets into notes and stores the Student played note in a vector to be used later in evaluation. This includes the note's pitch, timing and expression. Finally, the MIDI INPUT routine writes the event out to the MIDI port for playback and throughputting.

Specifically, MIDI INPUT routine calls a number of "hot key" routines which operate the display and performance features of EVALUATION SEQUENCER. These include printing, print reviewing, displaying score and performance views, displaying the mixer, zooming in performance view, turning sound on/off for the metronome, changing the display of the metronome, turning on/off selection of measures in performance view, changing the count-in of a song, as well as the hot keys for recording, playing, stopping a song, and displaying help and company information for the program.

Figure 18:
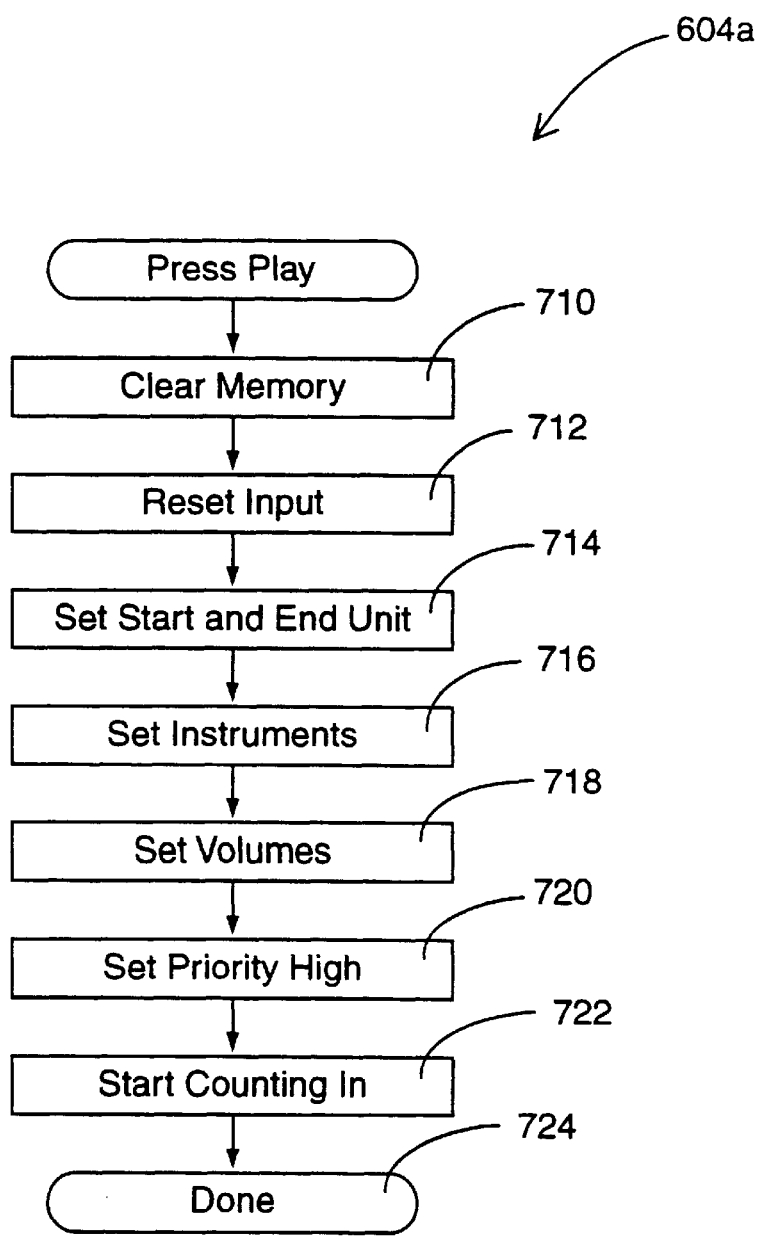

For illustrative purposes, FIG. 18 shows the PRESS PLAY routine. After the Student presses the PLAY button, CPU 5 clears the memory (at 710), resets the input (at 712), sets the start and end units (at 714), sets the instruments (at 716), sets the volumes (at 718), sets the priority high (at 720), starts the "counting in" (at 722), and returns (at 724).

Figure 19:
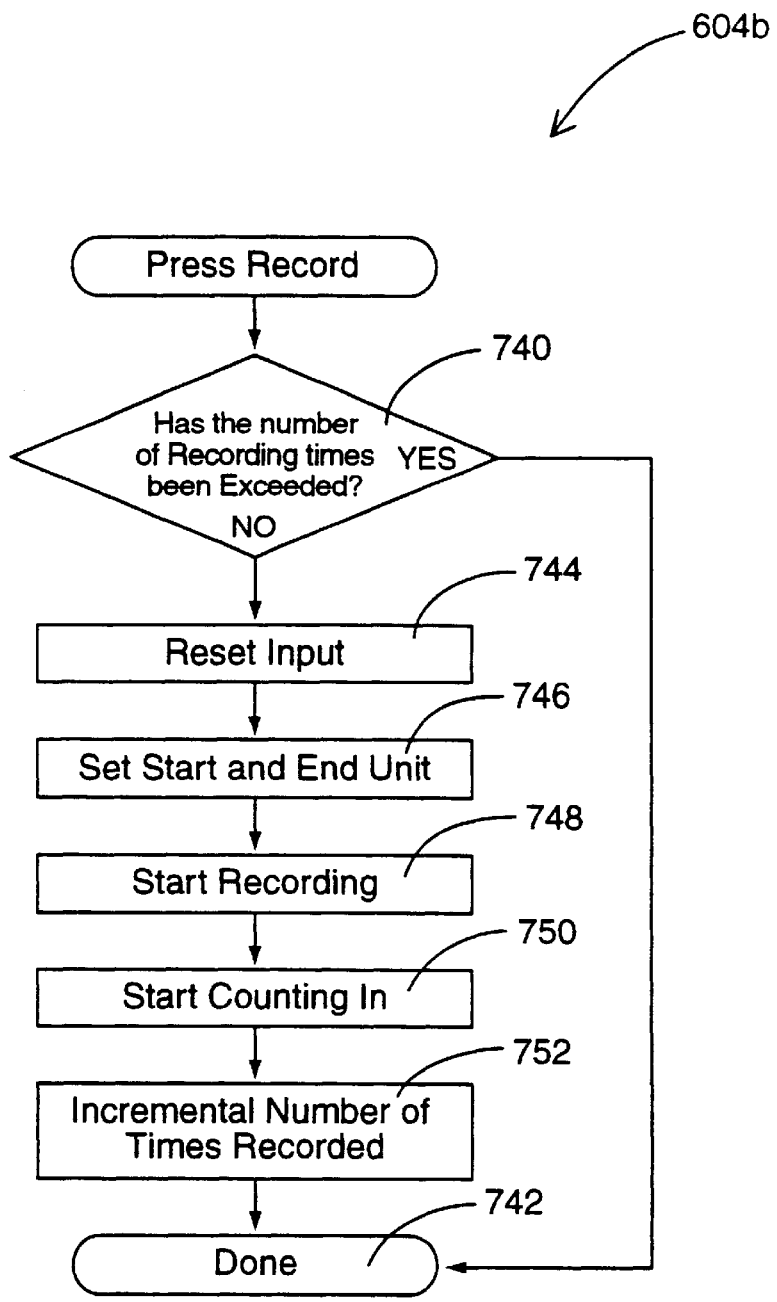

Similarly, FIG. 19 shows the PRESS RECORD routine which checks and establishes a number of settings that relate to the recording function of EVALUATION SEQUENCER. After the Student presses the RECORD button, the routine determines whether the number of recording times has been exceeded (at 740). That is, if the Student is in the process of completing the "best of three" recording activity then the number of recording times permitted would be three. If the Student is merely performing a solo performance then the number of recording times would simply be one. If the Student has exceeded the number of allowable recording times, then the routine is completed and returned (at 742). If not, then the input is reset (at 744). Also, CPU 5 sets the start and end units (at 746) which establishes the measures of the MIDI recording that the Student wants to attempt recording for, and CPU 5 tells the MIDI port that a recording is being started (at 748), "counting in" is started (at 750), and the number of times records is incremented (at 752). Finally, the routine returns (at 742).

Figure 20:
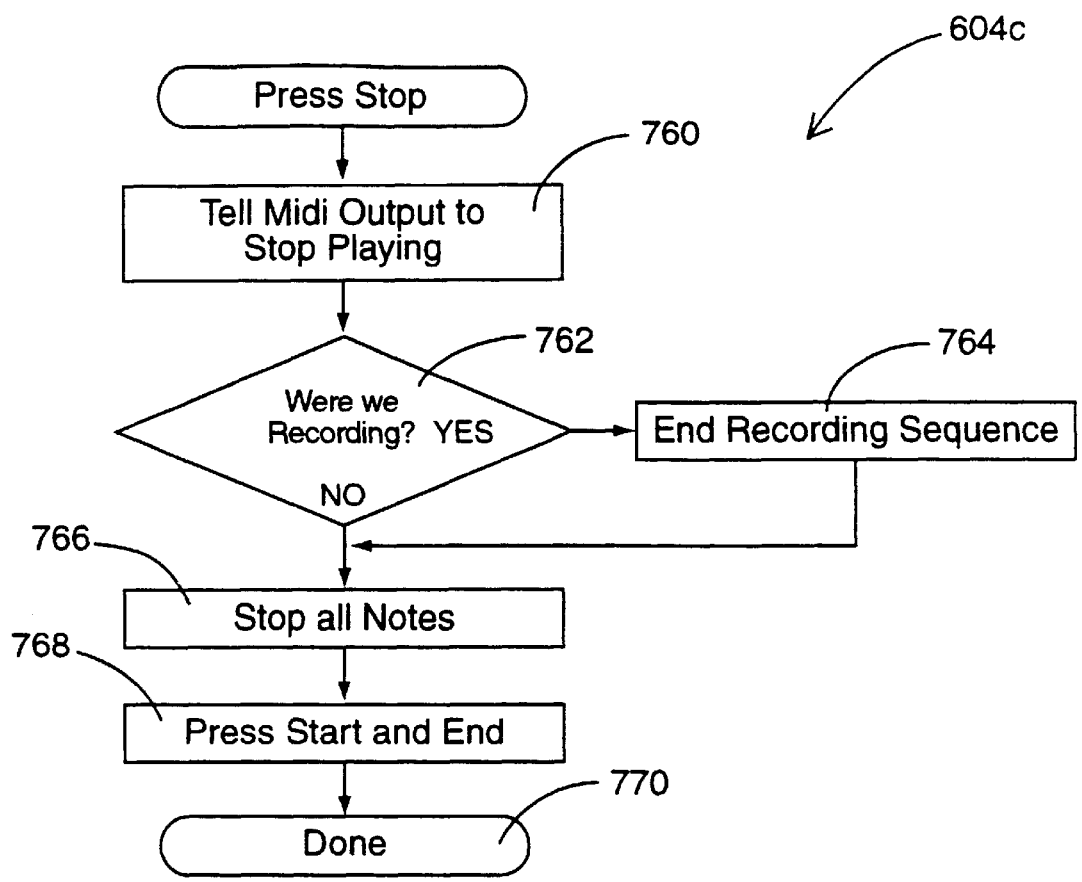

FIG. 20 shows the PRESS STOP routine which stops the playing of MIDI files. After the user presses the STOP button, CPU 5 signals the MIDI output to stop playing (at 760). Then it is determined whether EVALUATION SEQUENCER 56 was recording (at 762). If so, then the END RECORDING SEQUENCE routine is executed (at 764). If not, then all notes are stopped (at 766) and the start and the end are reset (at 768). Finally, the routine returns (at 770).

Figure 21:
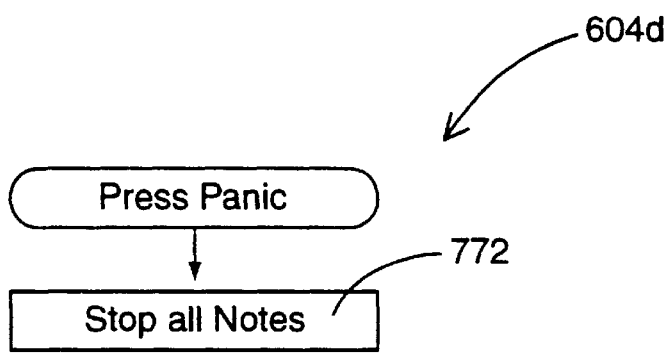

FIG. 21 shows the PRESS PANIC routine which allows the user to clear the MIDI note on/off events. In the case where a MIDI note gets stuck (i.e. hangs) or locks up (or freezes). Specifically, when the user presses the PANIC button, all notes are stopped (at 772).

Figure 22:
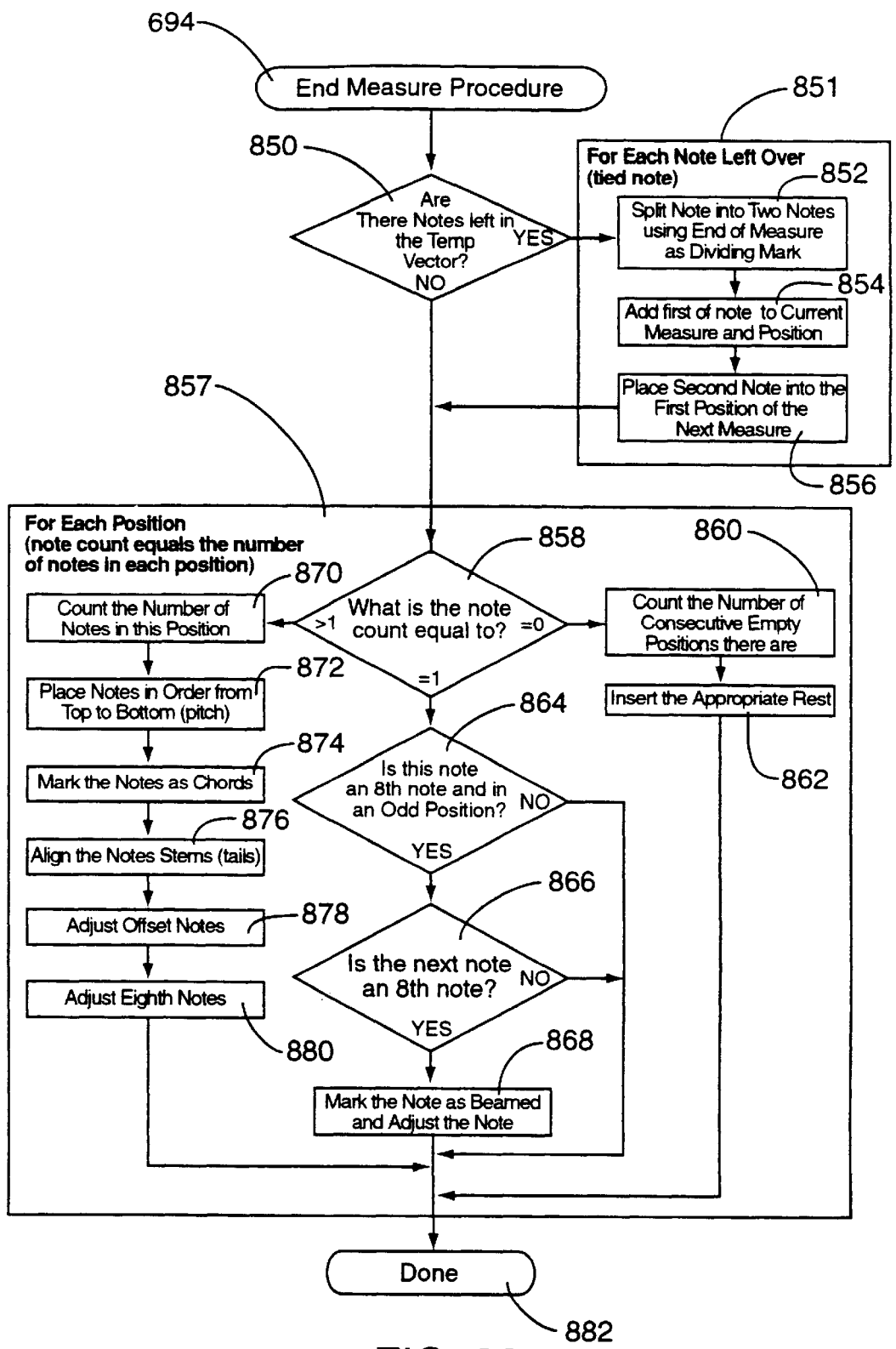

FIG. 22 shows the routine steps for the END MEASURE routine which is called within the TURN PACKETS TO NOTES routine, discussed above. First, the temporary vector is checked to see whether there are any notes left (at 850). If so, then (within for loop 851) each note left over (i.e. a tied note), the note is split into two notes using the end of measure dividing mark (at 852). The first part of the note is added to the current measure and position (at 854) and the second note is placed into the first position of the next measure (at 856).

Then for each position (i.e. within for loop 857), the value of the note count (i.e. the number of notes in each position) is determined (at 858). If it is zero then the number of consecutive empty positions are counted (at 860) and the appropriate rest is inserted (at 862). If the note count is one then it is determined whether the note is an 8th note and in an odd position (at 864) or next to a measure staff. If not, then the next position is examined. If the note is in an odd position and the next note is an 8th note (at 866) then the note is "beamed" (i.e. the 8th note is connected to the next note in the next position) and the note is appropriately adjusted (at 868). If the note count is greater than one then the number of notes in the position being evaluated is counted (at 870). Then, the notes are placed in order from the top to the bottom (at 872) and the notes are marked as chords (at 874). Finally, the note stems (i.e. the tails) are aligned (at 876), the offset notes (i.e. those notes that are too close together and must be "offset" from each other vertically) are adjusted (at 878) and the eighth notes are adjusted (at 880). Finally, the routine returns to the TURN PACKETS TO NOTES routine (at 882).

Figure 23:
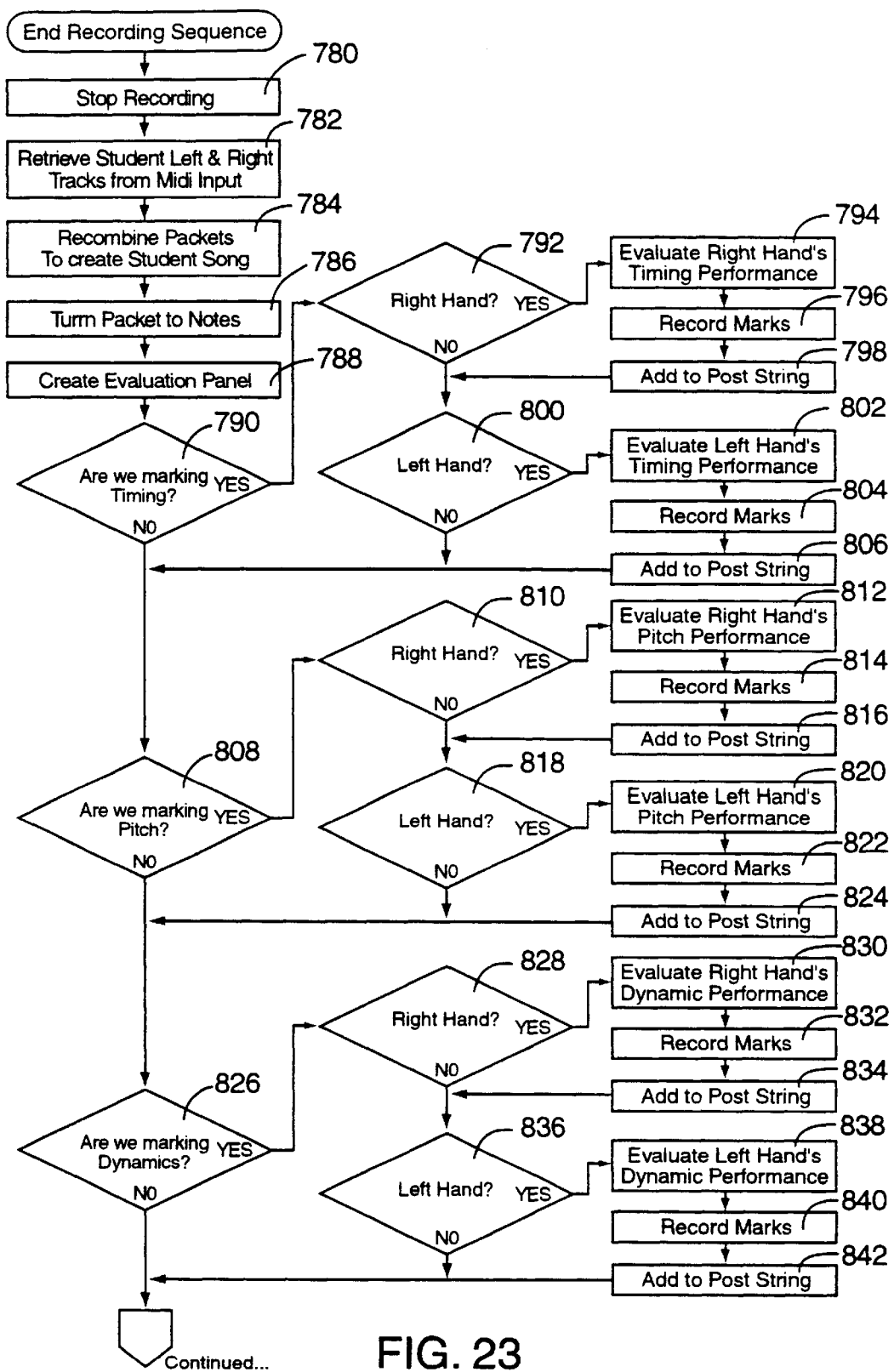
Figure 24:
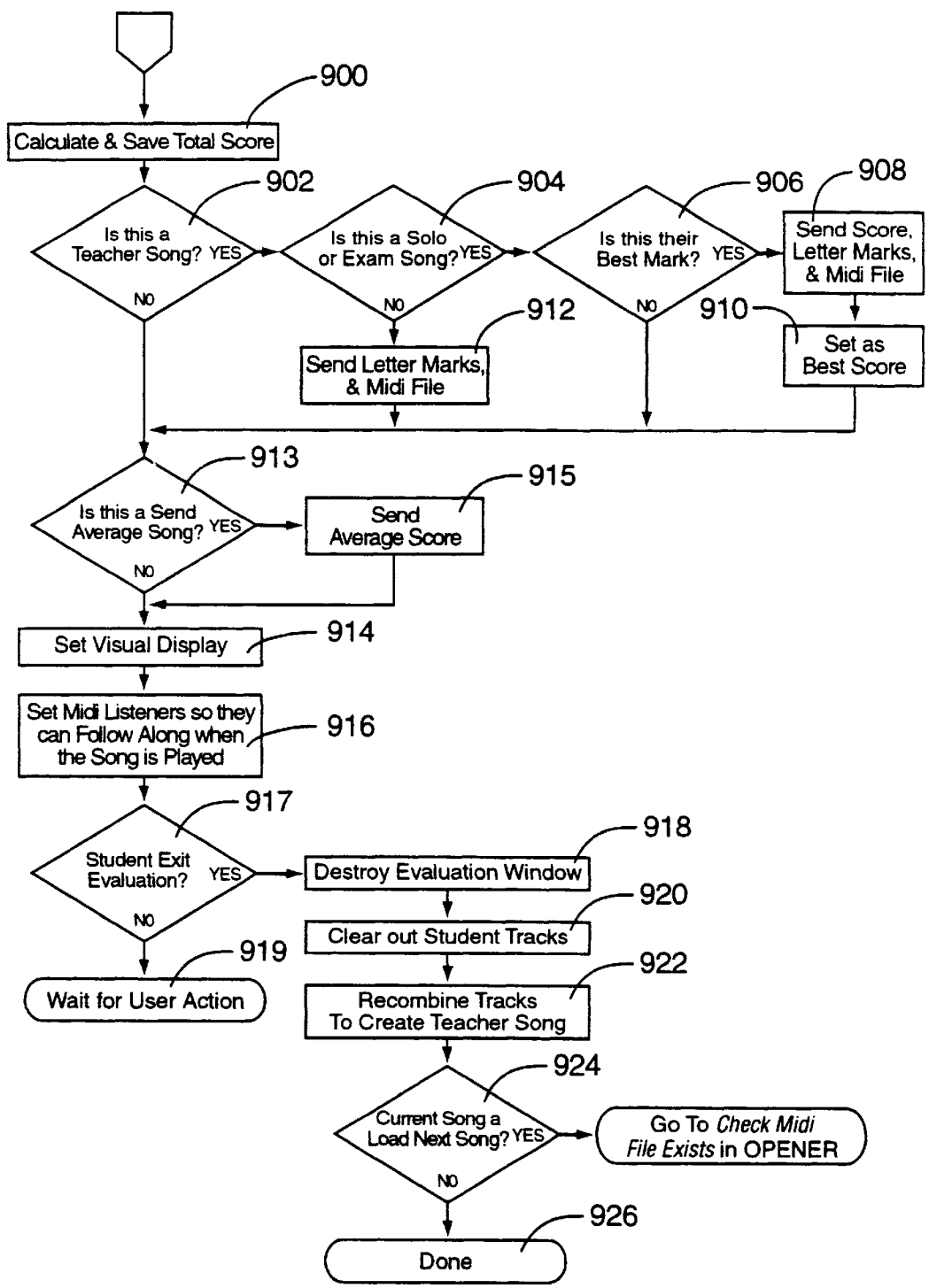

FIGS. 23 and 24 show the processing steps of the END RECORDING routine. The END RECORDING routine illustrates how MUSIC COURSE evaluates what a student has played during a recording. Each of the evaluation processes are handed the Student Track and which hand is being evaluated. The process then selects the appropriate Teacher Track for evaluation purposes and the information for the Student and Teacher notes are stored in arrays that are indexed by the hand being evaluated. When evaluation is being performed, the marking is stored in vectors corresponding to the hand and evaluation type.

These evaluation vectors are comprised of a number of positions per measure reflected by the song's time signature. Each beat gets two positions in the marking vector which corresponds to each 8th note. Each position is either right or wrong (i.e. binary) and the mark for each evaluation type is calculated as a percentage of correct positions over the number of positions in total. The specific evaluation steps will be discussed specifically in relation to the TIMING, PITCH and EXPRESSION routines (FIGS. 26, 27A, 27B, and 28).

Specifically, when a user has finished recording notes or when the user presses the STOP button (and enters into the PRESS STOP routine), CPU 5 executes the END RECORDING routine which evaluates the notes the Student played against the original songs notes and displays the evaluation result. Recording is stopped (at 780) and the Students Left and Right Tracks are retrieved from the MIDI input (at 782). The packets are recombined (at 784) and the packets are converted into notes by calling the TURN PACKETS INTO NOTES routine (at 786). A standard template display of the evaluation (i.e. in a "panel" format) is then created (at 788) and various evaluations (i.e. pitch, timing and expression) are conducted.

First, it is determined whether timing is being marked (at 790). If so, then it is determined whether it is the right hand (at 792). If it is the right hand being marked for timing then the right hand's timing performance is evaluated (at 794) by calling the TIMING routine with the song and the hand being evaluated. The marks are recorded (at 796) and added to the post string (at 798). If it is determined (at 800) that the left hand's timing is being marked then the left hand's timing performance (at 802) is evaluated, the marks are recorded (at 804) and the marks are added to the post sting (at 806).

It is then determined whether pitch is being marked (at 808). If so, then it is determined whether it is the right hand (at 810). If it is the right hand being marked for pitch then the right hand's pitch performance is evaluated (at 812) by calling the PITCH routine with the song and the hand being evaluated. The marks are recorded (at 814) and added to the post string (at 816). If it is determined (at 818) that the left hand's pitch is being marked then the left hand's timing performance (at 820) is evaluated, the marks are recorded (at 822) and the marks are added to the post string (at 824).

It is then determined whether expression (i.e. dynamics) is being marked (at 826). If so, then it is determined whether it is the right hand (at 828). If it is the right hand being marked for pitch then the right hand's expression performance is evaluated (at 830), by calling the EXPRESSION routine with the song and the hand being evaluated. The marks are recorded (at 832) and added to the post string (at 834). If it is determined (at 836) that the left hand's pitch is being marked then the left hand's timing performance (at 838) is evaluated, the marks are recorded (at 840) and the marks are added to the post string (at 842). Finally, the routine (at 844).

The total score is then calculated (at 900) as shown in FIG. 24. It is determined whether the song is a Teacher song (at 902) (i.e. a song that the Student can listen to while recording). If so, then it is determined if it is a solo piece (at 904), in which case the Student has had three times to record and takes the "best of three" recordings. If so, then it is determined whether the total score is their best mark (at 906). If so, then the total score, letter marks and MIDI file is sent to MIDI port for audio play (at 908) and the total score is set as the best score (at 910). If it is not a solo piece, then the Student only had one chance to record notes and the letter marks and MIDI file are sent to the MIDI port for audio play (at 912). It is then determined whether an average of songs is to be sent (at 913) and if so then the average score is sent (at 915).

Then, the visual display is set (at 914) and the MIDI is set to listen so that the user can follow along when the song is played (at 916). It is determined whether the student wants to exit the evaluation (at step 917). If not, then user action is awaited (at 919). If so then, the evaluation window is then destroyed (at 918) and the Student Tracks are cleared out (at 920). It should be understood that if the Student presses the PLAY after the evaluation it is possible for the Student to hear the song that the Student has recorded. Once the student clicks an the Performance View button the song information will be removed from memory. Finally, different packets from different tracks are recombined into one MIDI track (at 922). It is then determined whether a next song should be played (at 924) and if so then the CHECK MIDI FILE EXISTS step (574) of OPENER routine (see FIG. 13) is entered. Finally, the END RECORDING routine returns (at 926).

FIG. 25A is a schematic representation of the general data structure of the Student and Teacher Tracks utilized by MUSIC COURSE. As shown, each Track (or song as indicated in FIG. 25A) is composed of an array of Tracks (i.e. Teacher Left, Teacher Right, Student Left, and Student Right) and a vector of Measures (e.g. Measure 1, Measure 2, Measure 3, etc.) Each measure has a vector of notes (e.g. Note 1, Note 2, Note 3, etc.) Each note can be an actual note or can be a chord symbol, or a fingering symbol (i.e. anything that needs to be displayed on a staff).

FIG. 25B is a schematic representation of the general data structure of the marking vectors which are used to evaluate the Student Track against the Teaching Track on the basis of timing, pitch and where appropriate, expression. Specifically, each "song" contains an array of Evaluations (i.e. Pitch Left, Pitch Right, Timing Left, Timing Right, Expression Left, Expression Right). Each Evaluation contains a vector of Marks (e.g. Marks for Measure 1, Marks for Measure 2, etc.) Each set of Marks contains an array of positions (e.g. Position 1, Position 2, Position 3, etc.), each of which can be "correct or incorrect". There are functions which can be used to add up the number of "correct" and "incorrect" in a measure to provide total marks for a particular indicia.

FIGS. 26, 27A, 27B, and 28 show the TIMING, PITCH, and EXPRESSION routines, respectively. These routines are used to evaluate the corresponding aspect of the Student Track. Generally, each individual evaluation routine is provided with the song to be evaluated (i.e. Student Track) and the hand (i.e. LH or RH) that is being evaluated. Also, each individual evaluation routine then selects the appropriate Teacher track(s) (i.e. Teacher Right/Left or Track X) against which the Student Track will be evaluated. It should be noted that the usual scheme is to show the Student the Teacher Track and then mark the Student's performance according to the Teacher Track. In the case where it is desired to show the Student one thing and mark the Student's performance based on another set of data the "Track X" is used as the holder of the data that should be shown to the Student. The information for the Student and Teacher notes played are stored in an array that is indexed by the hand being evaluated.

When an evaluation is being performed the marks are stored in vectors corresponding to the hand and evaluation type. These evaluation arrays are comprised of a number of "positions" per measure reflected by the song's time signature. Each beat gets two positions in the marking vector. This corresponds to marking every 8th note. For example, in a 4/4 time signature song, each measure has eight positions that can be marked and in 3/4 time there are six positions. Each position of the Student Track is either right or wrong (i.e. independently right or wrong in respect of various criterion such as pitch, timing or expression) and the mark for each evaluation type is calculated as a percentage of the ratio of the correct positions to the number of total positions. It should be understood that the determination that each beat gets two positions is an arbitrary choice and that the notes could be broken down into various other subparts (i.e. 16th notes).

Figure 26:
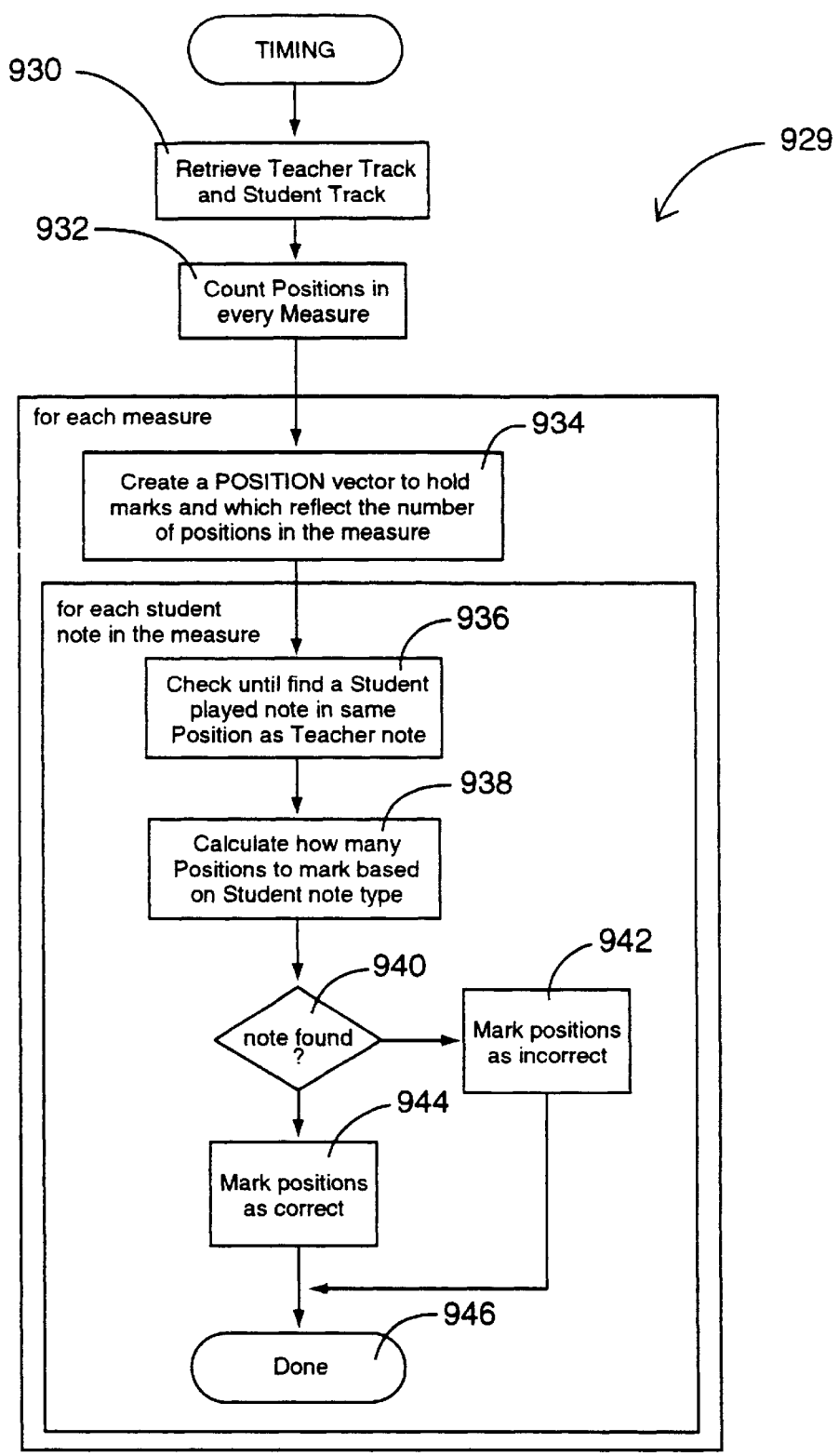
FIG. 26 is a flowchart of the process steps of the TIMING evaluation routine of the EVALUATION SEQUENCER program of the music teaching system of FIG. 1.

FIG. 26 shows the executable steps for the TIMING routine shown generally as 929 which are executed to evaluate the timing of a Student's song. Teacher Track and Student Track are retrieved from the Administrative Web Server 14 (at 930). The number of positions in every measure is determined (at 932) so that every eighth note is accorded a position (e.g. in a song with 2 4/4 measures there would be 16 positions to evaluate). For each measure (i.e. within for loop 933) a POSITION vector is created which reflects the number of positions in the measure (at 934). for each note in a measure of Student Track, each note in Teacher Track is checked for a note in the same position and of the same type as the note in Student Track (at 936).

Then, it is calculated how many positions should be designated for marking for the note at issue (at 938). For example, if the note at issue is a whole note then for a 4/4 measure all 8 positions would be marked. If an associated note in Teacher Track is not located (at 940) then the designated positions to be marked are marked "incorrect" in the POSITION vector. If the note is found then the designated positions are marked "correct" (at 944) in the POSITION vector. Once the loop is repeated for all Student notes in each measure the TIMING routine moves to the END RECORDING routine (at 946).

Figure 27A:
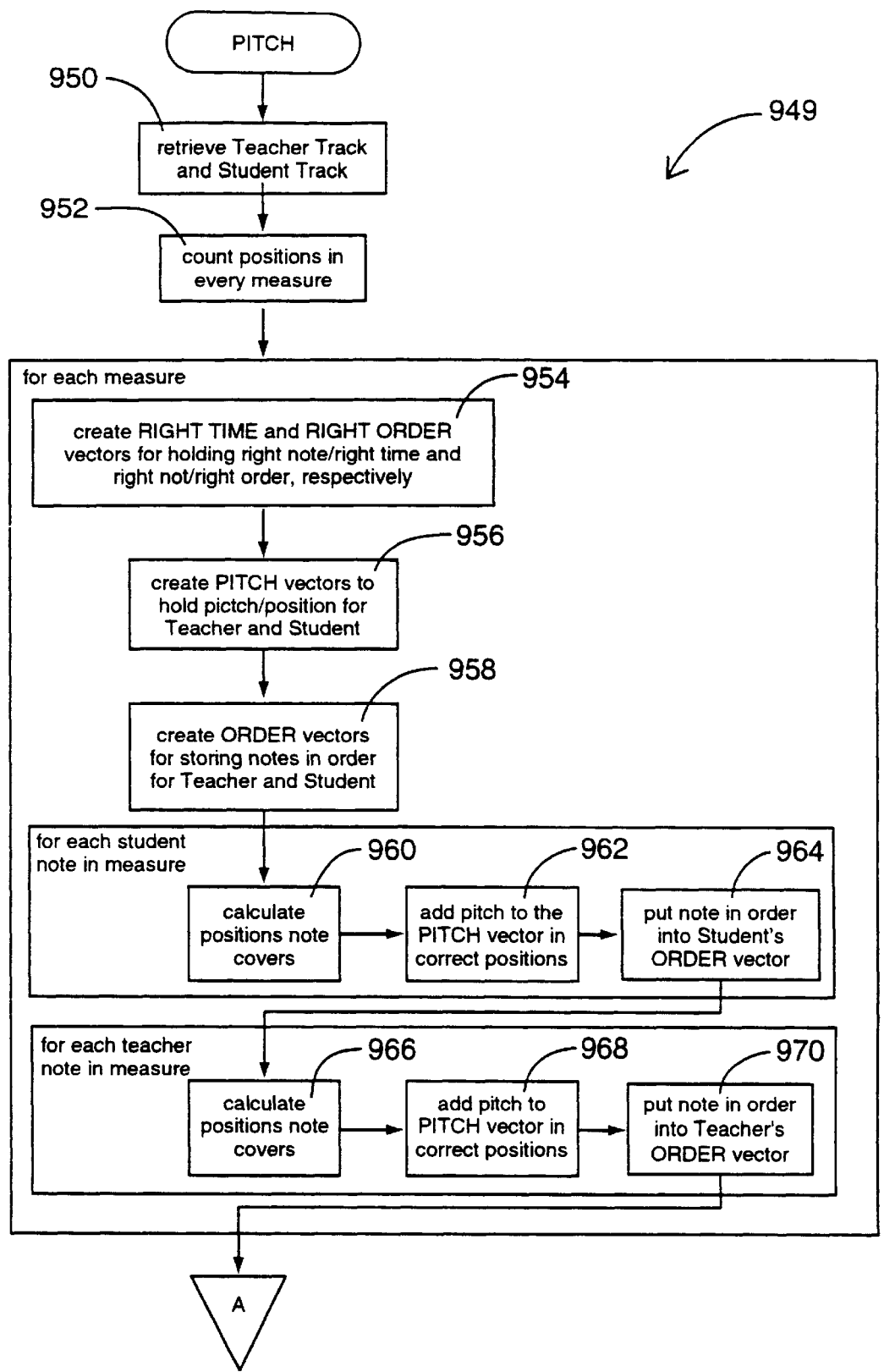
FIGS. 27A and 27B are flowcharts of the process steps of the PITCH evaluation routine of the EVALUATION SEQUENCER program of the music teaching system of FIG. 1.
Figure 27B:
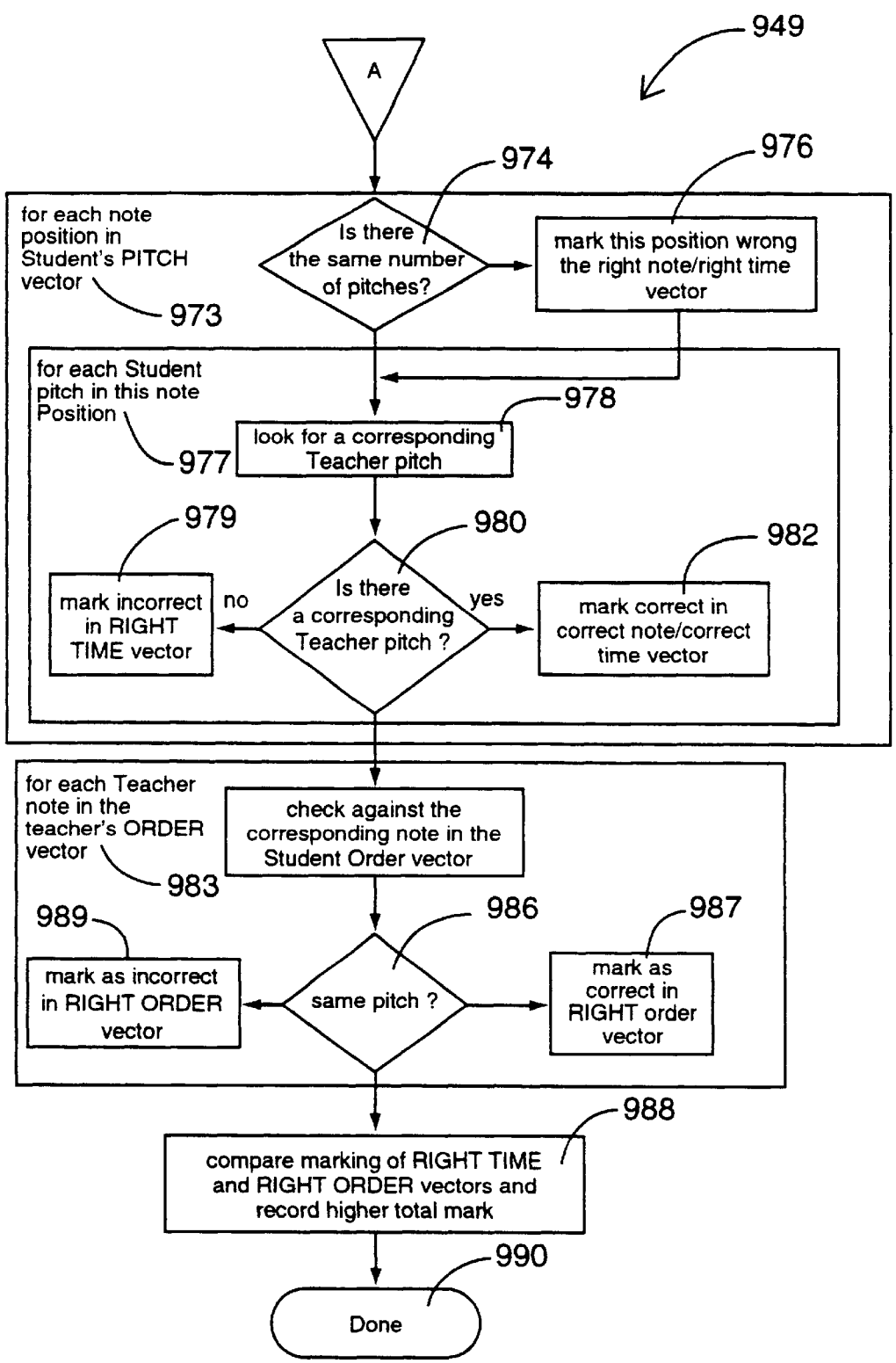

FIGS. 27A and 27B show the executable steps for the PITCH routine, shown generally as 949, that are executed to evaluate the pitch of a Student's performed song (i.e. Student Track). The Teacher Track and the Student Track are retrieved from Administrative Web Server 14 (at 950). The number of positions in every measure is determined (at 952) so that every eighth note is accorded a position. For each measure (i.e. within the loop 953) three sets of vectors are created. First, the RIGHT TIME vector is created for holding marks associated with the "right note/right time" evaluation and the RIGHT ORDER vector is created for holding marks associated with the "right note/right order" evaluation (at 954). Second, PITCH vectors are created for holding "pitch/position" information for the Student and for the Teacher (i.e. what pitch is being played at what position) (at 956). Third, ORDER vectors are created for storing notes in order for the Student and for the Teacher (at 958).

For each Student note in the measure at issue (i.e. within the (cap 959), it must be determined how many positions the Student note covers (at 960). Then the pitch of the note is added to the Student's PITCH vector in the correct position (at 962) and the note is put in order into the Student's ORDER vector (at 964). For each teacher note (i.e. within the loop 965) in the measure at issue, it must be determined how many positions it covers (at 966). Then the pitch of the note is added to the Teacher's PITCH vector in the correct position (at 968) and the note is put in order into the Teacher's ORDER vector (at 970).

FIG. 27B shows the rest of the executable steps for the PITCH routine that are executed to evaluate the pitch of a Student's performed song (i.e. Student Track). For each position in the Student's PITCH vector (i.e. within the loop 973), it is determined whether there are the same number of pitches (i.e. a chord ACD or a single note C) in both the Teacher and Student PITCH vector (at 974). If not, then this position is marked "incorrect" in the RIGHT TIME vector (at 976) and no further logic evaluation is necessary. If so, then for each Student pitch in this position (i.e. within loop 983), a corresponding Teacher pitch is searched for (at 978). If there is a corresponding Teacher's pitch (at 980) then the appropriate position in the RIGHT TIME vector is marked "correct" (at 982). If not, then the appropriate position in the RIGHT TIME vector is marked "incorrect" (at 983).

Each teacher note in the Teacher's ORDER vector, is checked against the corresponding note in the Student's ORDER vector (i.e. within loop 983) (at 984). It is determined whether the notes are the same pitch (i.e. the same note) (at 986). If so, then the appropriate position in the RIGHT TIME vector is marked "correct" (at 987). If not, then the appropriate position in the RIGHT TIME vector is marked "incorrect" (at 985).

Finally, the total mark calculated from the RIGHT ORDER vector is compared with the total mark calculated from the RIGHT TIME vector and the higher of the two is stored as the mark for the pitch evaluation (at 988). Finally, the PITCH routine returns to the END RECORDING routine (at 990).

Figure 28:
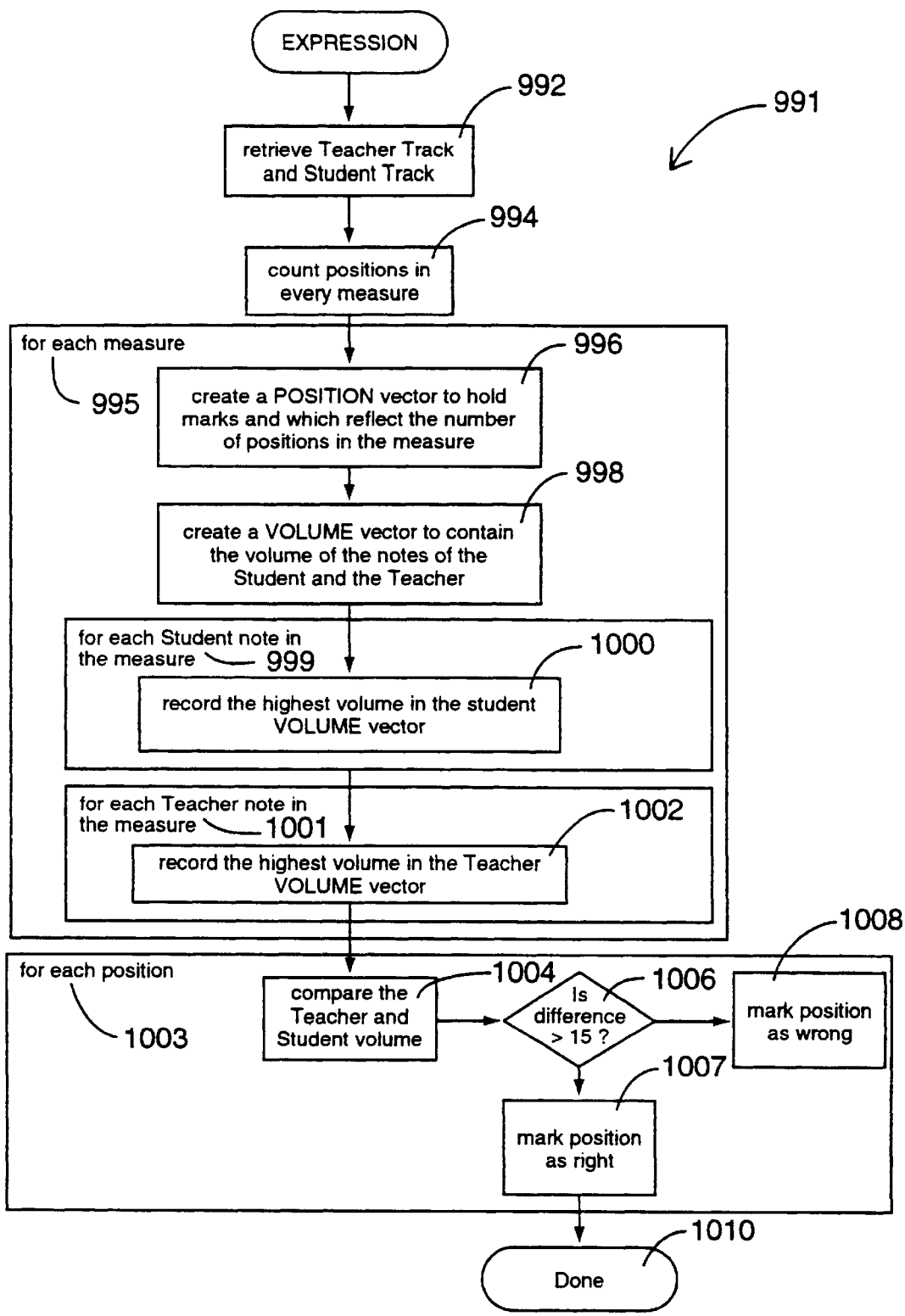
FIG. 28 is a flowchart of the process steps of the EXPRESSION evaluation routine of the EVALUATION SEQUENCER program of the music teaching system of FIG. 1.

FIG. 28 shows the executable steps for the EXPRESSION routine, generally shown as 991, that are executed to evaluate the expression (i.e. volume characteristics) of a Student's performed song. The Teacher Track and the Student Track are retrieved (at 992). The number of positions in every measure is determined (at 994) so that every eighth note is accorded a position (e.g. in a song with 2 4/4 measures there would be 16 positions to evaluate).

For each measure (i.e. within for loop 995), a POSITION vector is created which reflects the number of positions within the measure (at 996). Also, two VOLUME vectors are created to contain the volume for the Student and the Teacher notes (at 998). For each Student note in the measure (i.e. within for loop 994), the highest volume attained is recorded in the Student's VOLUME vector (at 1000). Also, for each Teacher note in the measure (i.e. within for loop 1001) d, the highest volume attained is recorded in the Teacher's VOLUME vector (at 1002).

For each position in the two VOLUME vectors (i.e. within for loop 1003), the Teacher and Student volumes are compared (at 1004) to see whether the difference between them is larger than a particular value (at 1006) (e.g. "15" units as was chosen by the developers in this particular example). If so, then the position in the Student VOLUME vector is marked "incorrect" (at 1008). If not, then the position in the Student VOLUME vector is marked "correct" (at 1007). Finally, the VOLUME routine returns to the END RECORDING routine (at 1010).

In use, the music teaching system 10 can be utilized by a Student and a Teacher where the Student and Teacher are in geographical disparate regions (i.e. distance learning). Once the Operational Module 54 and EVALUATION SEQUENCER 56 has been installed on the Student's computer 20, the Student would sit down at computer 20 which is attached to MIDI keyboard 22. The Student Would then click on a MUSIC COURSE icon on display 7 of computer 20. This action opens a Web browser that points to the login page for MUSIC COURSE, and also starts EVALUATION SEQUENCER 56 which goes into stand-by mode.

The Student would then log into the MUSIC COURSE (using the appropriate sign in screens) and the Web page would send the login and password information to Administrative Web Server 14 (i.e. database administrator) which validates the Student as a user. The Student then starts MUSIC COURSE.

The Student views and interacts with a number of "lesson" screens and then comes to an "activity" screen which allows the Student to participate in a relatively simple (and short) MIDI exercise to review what the Student has learned so far. Timing Module 62 and/or Note Finder Module 66 are loaded into the Student's browser to "trap" the MIDI notes that the Student plays on the MIDI keyboard 22. In the case of a "note" exercise, the Note Finder Module 66 sends the notes to the Operational Module 54 The Shockwave™ file sends the evaluation marks to the Administrative Web Server 14.

As the Student proceeds to a Web page that has a more challenging activity exercise (i.e. one that requires the use of EVALUATION SEQUENCER 56). Administrative Web Server 14 places the song information and the Student information into a file. EVALUATION SEQUENCER 56 has been running in the background and when it sees the file has information in it, it starts the OPENER routine (discussed above). The OPENER routine starts the EVALUATION SEQUENCER and opens a MIDI port. The EVALUATION SEQUENCER starts up MIDI INPUT and MIDI OUTPUT routines which run in the background. The EVALUATION SEQUENCER then opens the song, erases the information file, prepares the song to be played, and displays the Song to the Student within the EVALUATION SEQUENCER interface.

The Student interacts with the EVALUATION SEQUENCER interface and views the song in PERFORMANCE VIEW and in SCORE VIEW. The Student plays with ZOOM IN and ZOOM OUT buttons until he gets to the number of measures he likes. The Student listens to the song by pressing the PLAY button at which point the EVALUATION SEQUENCER tells the MIDI OUTPUT routine to start playing the song. The student plays with different sounds (e.g. can adjust the volume of each port in the mixer) using the MIXER feature which causes the associated MIDI events to be sent directly to the MIDI Port. The Student listens to the more difficult sections by going into selection, selecting those sections, and pressing the PLAY button. The tempo of the music can be adjusted by moving the TEMPO SLIDER bar. The Student previews and prints out the music.

Eventually, the Student decides that he is ready to record his own rendition of the song and presses the RECORD button. EVALUATION SEQUENCER 56 tells the MIDI INPUT routine to start recording the notes. MIDI INPUT routine stores the incoming events and echoes the notes back to the MIDI Port. When the song stops, the notes are processed into their appropriate tracks. These Tracks are saved in the Song, which is sent to END RECORDING routine (i.e. the evaluation routine).

FIG. 29A shows an example Song 1150 played by the Student and the original Teacher Track 1155. EVALUATION SEQUENCER 56 evaluates Student's Song 1150 against the original Teacher Track 1155 and displays the resulting scores 1100 to the Student as listed.

Figure 29B:
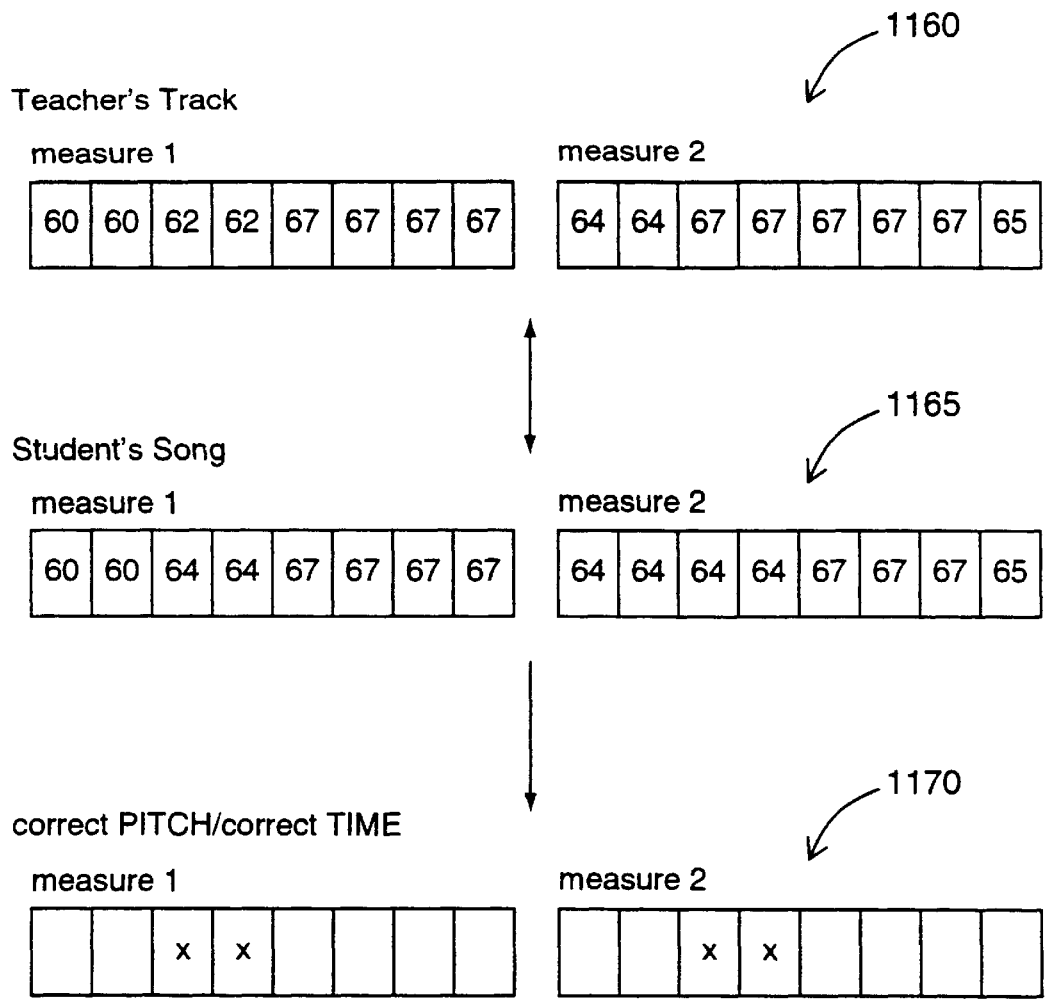
Figure 29C:
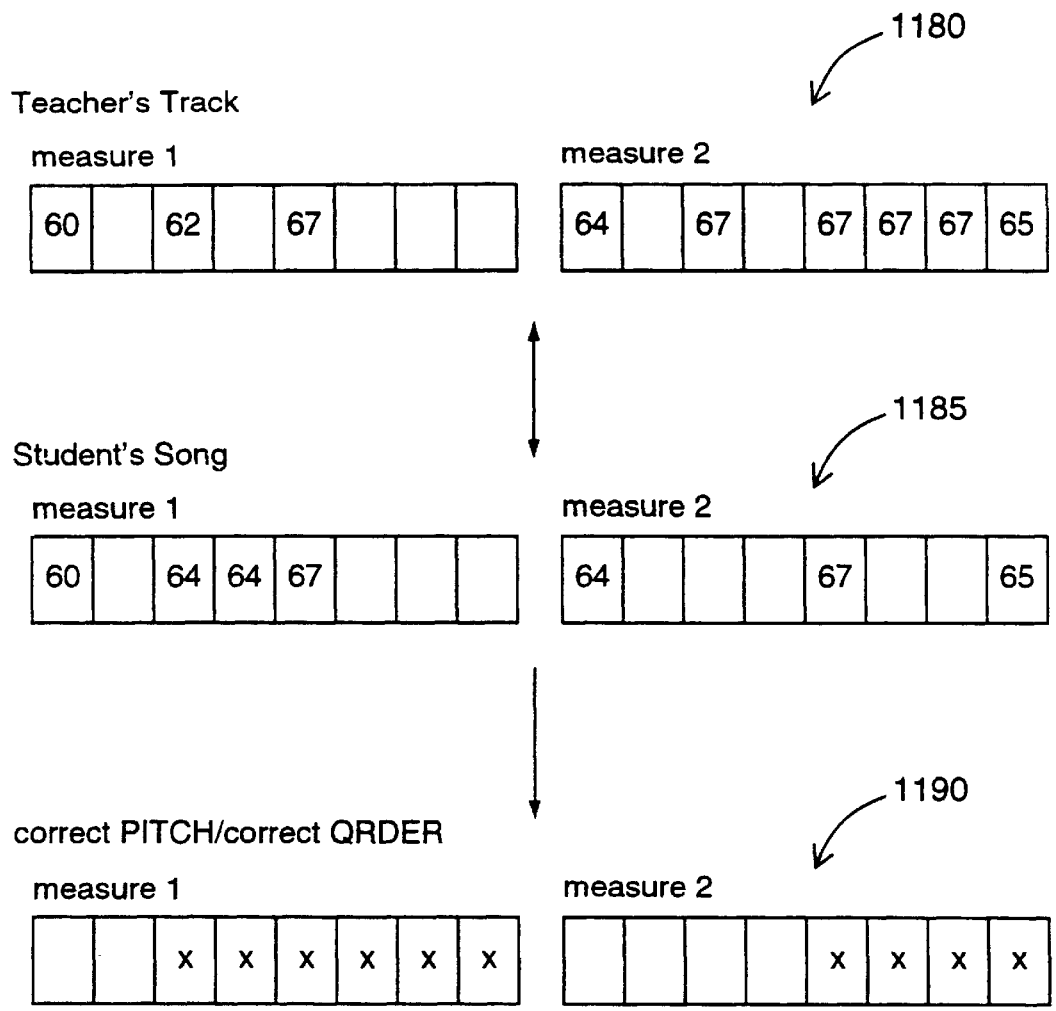

FIGS. 29B and 29C illustrate the comparison that is made by EVALUATION SEQUENCER 56 (as detailed in FIGS. 27A and 27B) in order to evaluate the pitch of the Student Track 1150 and to provide a PITCH score. Specifically, FIG. 29B shows how the Teacher Track 1150 and the Student Track 1155 are each broken down into numerical representations 1160 and 1165, respectively which reflect the tone (i.e. middle C is equal to 60, high C is equal to 72 and low C is equal to 48) and the timing of the notes (i.e. since each peat gets two positions in the marking vector, each 4/4 measure is broken down into eight time slots and each slot is filled by the particular pitch for the slot). As previously discussed, the RIGHT TIME vector shown as 1170 can be determined by comparing the pitch values and marking an "x" (i.e. a lost mark) when the pitches in a slot do not match. Accordingly, the resulting correct pitch/correct time score is 12/16 (i.e. four marks lost).

FIG. 29C shows how the Teacher Track 1150 and the Student Track 1155 are each broken down into numerical representations 1180 and 1185 which reflect the tone (i.e. middle C is equal to 60, high C is equal to 72 and low C is equal to 48) and the order of the notes (i.e. each measure broken down into four time slots and only the first applicable slot is filled by the particular pitch). As previously discussed, the RIGHT ORDER vector shown as 1170 can be determined by comparing the pitch values in the order they occur and marking an "x" (i.e. a lost mark) when the pitches are not in the same order. Accordingly, the resulting correct pitch/correct time score is 6/16 (i.e. ten marks lost). The final pitch score however, is calculated (as discussed in reference to step (988) of FIG. 27B) by recording the higher total mark, accordingly the PITCH score will be 12/16. The marks and recorded Student Track are then sent to Administrative Web Server 14. At this point the Student is finished with this song and exits EVALUATION SEQUENCER 56 EVALUATION SEQUENCER 56 goes into stand-by mode, waiting for the next song.

Figure 29D:
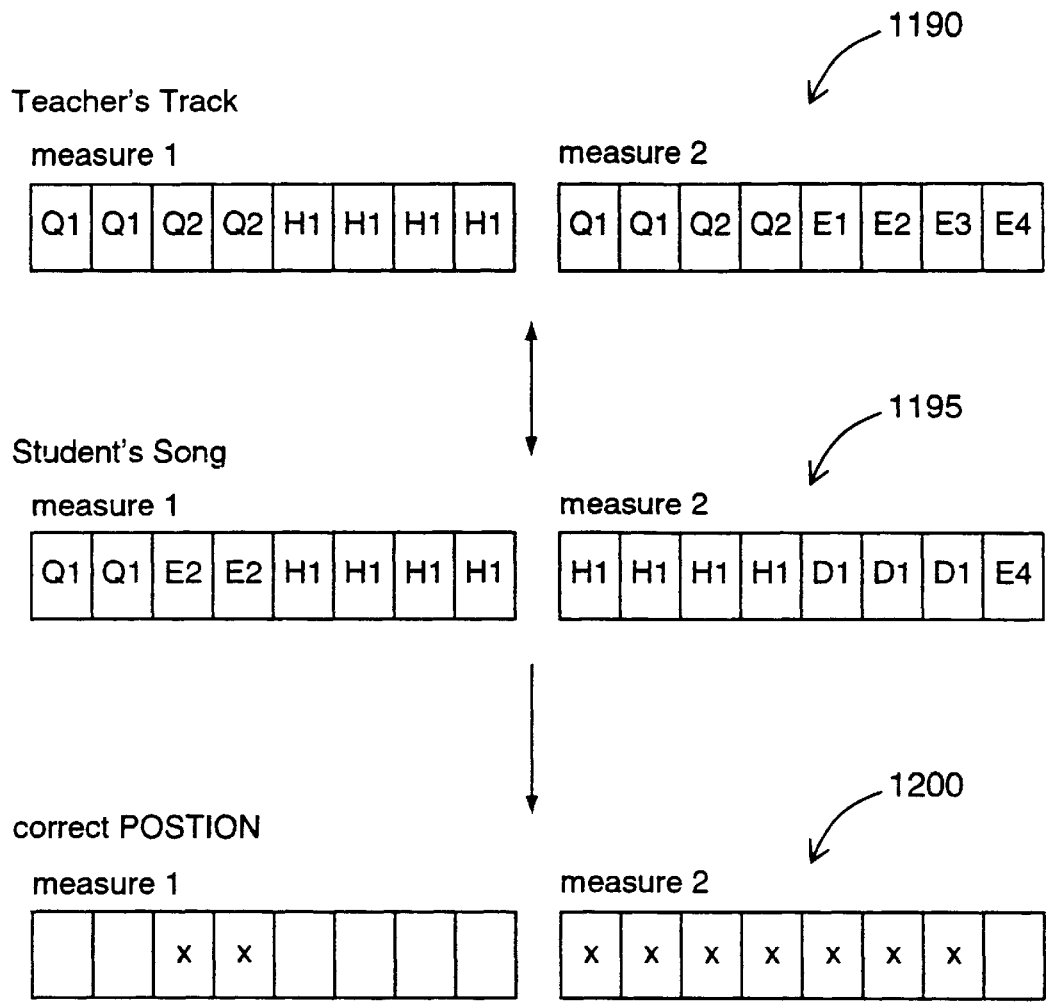

FIG. 29D illustrates the comparison that is made by EVALUATION SEQUENCER 56 (as detailed in FIG. 26) in order to evaluate the timing of the Student Track 1150 and to provide a TIMING score. Specifically, FIG. 30 shows how the Teacher Track 1150 and the Student Track 1155 are each broken down into numerical representations 1190 and 1195, respectively which reflect the type of note (i.e. letters/numbers in the measures represent the type of note played in that position—Q1 for a quarter note #1, Q2 for a quarter note #2, H1 for a half note, E1 for an eighth note, D1 for a dotted quarter note). Again, since each beat gets two positions in the marking vector, each 4/4 measure is broken down into eight time slots and each slot is filled by the applicable note for the slot. As previously discussed, the POSITION vector shown as 1200 can be determined by comparing the contents of the slots and marking an "x" (i.e. a lost mark) when the contents in a slot do not match. Accordingly, the resulting correct TIMING time score is 7/16 (i.e. 9 marks lost)

Figure 29E:
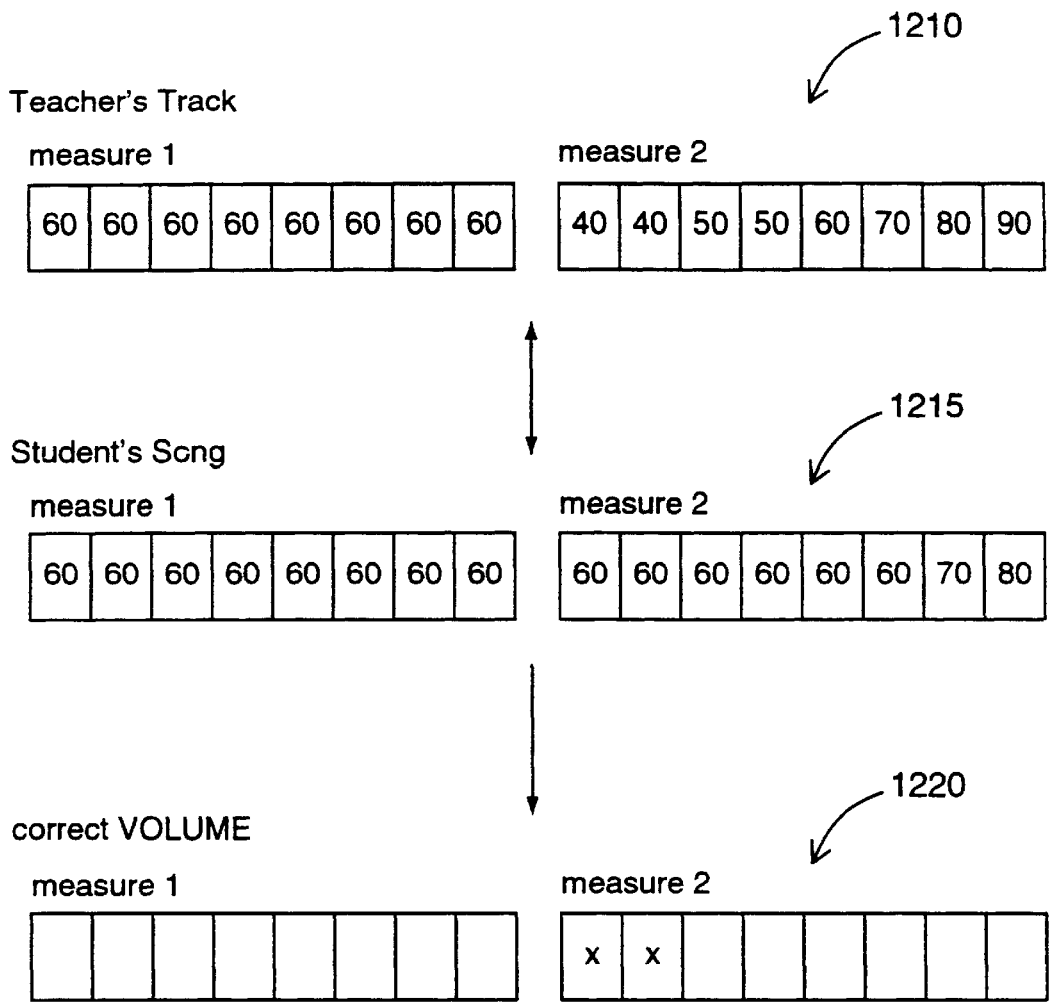

FIG. 29E illustrates the comparison that is made by EVALUATION SEQUENCER 56 (as detailed in FIG. 28) in order to evaluate the VOLUME score of the Student Track 1150. Specifically, FIG. 29E shows how the Teacher Track 1150 and the Student Track 1155 are each broken down into numerical representations 1210 and 1215, respectively which reflect the maximum volume (i.e. velocity) of the notes played in the respective positions. It should be noted that chords having notes of different velocities would be taken to have the highest volume (i.e. velocity) of the constituent notes for evaluation purposes. Again, each 4/4 measure is broken down into eight time slots and each slot is filled by the particular pitch for the slot). As previously discussed, the VOLUME vector shown as 1220 can be determined by comparing the VOLUME values and marking an "x" (i.e. a lost mark) when the VOLUME values in a slot are apart b more than 15 velocity units. Accordingly, the resulting correct pitch/correct time score is 14/16 (i.e. two marks lost).

FIG. 30 illustrates a preferred method of breaking down notes that are played by Students. Specifically, the notes that are played by a Student are measured against the bar lengths shown in FIG. 30 in order to classify the notes in a consistent manner (i.e. as quarter notes, as half notes etc.) The values shown are calculated from what a Student plays by taking the length of the note that the Student has played and dividing that measure by the number of units per beat that the song has.

As previously discussed, while the invention is described in the context of piano/keyboard training, it should be understood that it is equally applicable to other types of music training including training for a string, woodwind, brass and percussion instruments. Also, the preferred embodiment of the present invention utilizes the Internet as communication network 18, since the Internet provides a low-cost efficient manner of distributing information required to implement the present invention. However, those skilled in the art will recognize that any communication network 18 (e.g. LANs or intranets) utilizing any communication protocol may be used to practice the present invention. Finally, while the present invention utilizes the MIDI communication protocol, it should be understood that any data communication protocol could be used within MUSIC COURSE.

As will be apparent to those skilled in the art, various modifications and adaptations of the method and system described above are possible without departing from the present invention, the scope of which is defined in the appended claims.

We claim:

1. A computer based music teaching system for training a student to play a musical instrument by evaluating timing, pitch and expression, said teaching system comprising:
   (a) a database adapted to store a lesson data file having timing, pitch and expression lesson elements;
   (b) a display coupled to said database for displaying a representation of the lesson data file to the student.
   (c) a music input device to accept input from the student and to generate a student data file;
   (d) a processor coupled to said music input device and said database for comparing said student data file with said lesson data file, evaluating the student data file in respect of timing, pitch and expression and providing an evaluation data file, said evaluation data file including a plurality of graphical marks positioned in proximity to timing, pitch and expression lesson elements which have been incorrectly played by the student; and
   (e) said display also being coupled to said processor for providing a representation of the evaluation data file to the student on the display, including display of said graphical marks to indicate which timing, pitch and expression elements of the lesson data file were incorrectly played by the student.

2. The teaching system of claim 1, wherein said processing means is also adapted to store said evaluation data file in said database.

3. The teaching system of claim 1, wherein said database is coupled to said music input device over a communications network.

4. The teaching system of claim 1, wherein said student data file and said lesson data file are in MIDI data format.

5. The teaching system of claim 1, wherein said music input device is an electronic keyboard.

6. The teaching system of claim 1, wherein said music input device is an electronic guitar.

7. A method of teaching a student how to play a musical instrument using a music input device coupled to a processor, a database and a display over a communications network, said method comprising:
   (a) storing a lesson data file having timing, pitch and expression lesson elements in the database;
   (b) transmitting the lesson data file to the display over the communications network;
   (c) providing a representation of the lesson data file to the student on the display;
   (d) obtaining a student data file from the student through the music input device in response; and
   (e) evaluating said student data file by comparing said student data file with said lesson data file, evaluating the student data file in respect of timing, pitch and expression and providing an evaluation data file, said evaluation data file including a plurality of graphical marks positioned in proximity to timing, pitch and expression lesson elements which have been incorrectly played by the student; and
   (f) providing a representation of the evaluation data file to the student on the display, including display of said graphical marks to indicate which timing, pitch and expression elements of the lesson data file were incorrectly played by the student.

8. The method of claim 7, further comprising the step of providing the evaluation of the student data file to a teacher.

9. The method of claim 7, further comprising the step of storing the evaluation of the student data file in a database.

10. The method of claim 7, wherein said student data file and said lesson data file are in MIDI format.

11. The method of claim 7, wherein the step of evaluating of said student data is conducted in respect of at least one of timing, pitch and expression.

12. The method of claim 7, wherein said lesson data file contains at least one measure and wherein the step of evaluating the timing of said student data file additionally comprises:
   (a) counting the number of note positions in each measure for the lesson data file;
   (b) creating a vector to hold marks for each note position for each measure of said lesson data file;
   (c) for each vector, marking a note position correct only if there exists a note in said student data file that is in said note position and is the same note as the note in said lesson data file that is in said note position and if the same is true for adjacent notes of the same pitch in said student data file, and otherwise marking a note position incorrect;
   (d) determining the total number of note positions in each vector that have been marked as correct; and
   (e) outputting an evaluation of said student data file which corresponds to said total number of note positions.

13. The method of claim 7 wherein said lesson data file contains at least one measure and wherein the evaluation of the pitch of said student data file additionally comprises:
   (a) counting the number of note positions in each measure for the lesson data file;
   (b) creating a RIGHT TIME vector to hold marks for the correct note at a correct note position for each measure of said lesson data file;
   (c) creating a RIGHT ORDER vector to hold marks for the correct note in the correct order for each measure of said lesson data file;
   (d) marking a note position correct in the RIGHT TIME vector only if the student data file and the lesson data file contains the same number of pitches in said position and if each pitch of said student data file at said position is also present in said lesson data file at said position, otherwise marking said note position incorrect;
   (e) marking a note position correct in the RIGHT ORDER vector only if the note at said position in said student data file is identical to the note at said position in said lesson data file, otherwise marking said note position incorrect;
   (f) repeating steps (d) and (e) until all note positions have been marked;

(g) determining the number of note positions in the RIGHT TIME vector that have been marked as correct;

(h) determining the number of note positions in the RIGHT ORDER vector that have been marked as correct so that the evaluation of the pitch of said student data file is independent from the evaluation of the timing of said student data file;

(i) determining the larger value of the result in (g) or (h); and (j) outputting an evaluation of said student data file which corresponds to said larger of said larger value.

14. The method of claim 7, wherein said lesson data file contains at least one measure and wherein the evaluation of the expression of said student data file additionally comprises:

(a) counting the number of note positions in each measure for the lesson data file;

(b) creating a vector to hold marks for each note position for each measure of said lesson data file;

(c) for each vector, marking a note position correct only if the highest volume of the note in said student data file at said note position differs by less than a predetermined amount from the highest volume of the note in said lesson data file at said note position and otherwise marking said note position incorrect;

(d) determining the total number of note positions in each vector that have been marked as correct; and (e) outputting an evaluation of said student data file which corresponds to said total number of note positions.

* * * * *